US010981811B2

(12) United States Patent
Hoffman et al.

(10) Patent No.: US 10,981,811 B2
(45) Date of Patent: Apr. 20, 2021

(54) SELF-CONTAINED, PV-POWERED DOMESTIC TOILET AND WASTEWATER TREATMENT SYSTEM

(71) Applicant: The California Institute of Technology, Pasadena, CA (US)

(72) Inventors: Michael R. Hoffman, South Pasadena, CA (US); Asghar Aryanfar, Pasadena, CA (US); Kangwoo Cho, Pasadena, CA (US); Clement A. Cid, Pasadena, CA (US); Daejung Kwon, Daegu (KR); Yan Qu, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 110 days.

(21) Appl. No.: 14/048,163

(22) Filed: Oct. 8, 2013

(65) Prior Publication Data
US 2014/0209479 A1    Jul. 31, 2014

Related U.S. Application Data

(60) Provisional application No. 61/710,857, filed on Oct. 8, 2012.

(51) Int. Cl.
*C02F 1/467* (2006.01)
*C02F 1/44* (2006.01)
(Continued)

(52) U.S. Cl.
CPC ............ *C02F 1/4674* (2013.01); *C02F 1/444* (2013.01); *C02F 3/28* (2013.01); *C02F 2001/007* (2013.01);
(Continued)

(58) Field of Classification Search
CPC ..................................... C02F 1/46; C02F 3/28
(Continued)

(56) References Cited

U.S. PATENT DOCUMENTS 3,562,137 A * 2/1971 Gehring ................. B01D 61/46
204/258
3,914,164 A * 10/1975 Clark .................... C02F 1/4672
205/756
(Continued)

FOREIGN PATENT DOCUMENTS

RU        71334      3/2008
RU        88011      10/2009
(Continued)

OTHER PUBLICATIONS

Rogers, Michael. "Caltech Scientist Awarded Grant to Develop Solar-Powered Sanitation System." Press Release. Jul. 19, 2011. <http://www.caltech.edu/article/13432> Last accessed Oct. 31, 2014.*
(Continued)

*Primary Examiner* — Luan V Van
(74) *Attorney, Agent, or Firm* — Gavrilovich, Dodd & Lindsey LLP

(57) ABSTRACT

A wastewater treatment system and method for remediating wastewater and human waste that is self-contained and that has no connection to a municipal wastewater system and no connection to an electrical grid. The domestic toilet and wastewater treatment system can be powered by a photovoltaic panel as a source of electricity. The system includes an electrochemical cell that allows a waste stream to be disinfected in a few hours to a condition where no viable bacterial colonies can be cultured. The system produces a liquid stream that is suitable for system flushing or for uses in which non-potable water is acceptable. The system can generate hydrogen as a product that can be used to generate power. The system can generate nitrate, urea, ammonia and
(Continued)

phosphate for use as fertilizer. The disinfected residual organic solids are also completely disinfected for potential use as an organic soil amendment for agriculture.

22 Claims, 54 Drawing Sheets

(51) Int. Cl.

| | | |
|---|---|---|
| C02F 3/28 | (2006.01) | |
| C02F 1/461 | (2006.01) | |
| C02F 103/00 | (2006.01) | |
| C02F 1/00 | (2006.01) | |

(52) U.S. Cl.
CPC ............... *C02F 2001/46142* (2013.01); *C02F 2103/00* (2013.01); *C02F 2103/002* (2013.01); *C02F 2103/005* (2013.01); *C02F 2201/008* (2013.01); *C02F 2201/009* (2013.01); *C02F 2201/4611* (2013.01); *C02F 2201/4612* (2013.01); *C02F 2201/46165* (2013.01); *C02F 2209/005* (2013.01); *C02F 2209/29* (2013.01); *C02F 2305/10* (2013.01); *Y02A 20/211* (2018.01); *Y02A 20/212* (2018.01); *Y02W 10/33* (2015.05); *Y02W 10/37* (2015.05)

(58) Field of Classification Search
USPC ............... 204/228.1–229.7, 271, 278, 278.5; 205/743, 744, 759; 210/748.17, 748.2
See application file for complete search history.

(56) References Cited

U.S. PATENT DOCUMENTS

| | | | | |
|---|---|---|---|---|
| 4,045,314 | A * | 8/1977 | Rod et al. ................. | 210/748.17 |
| 4,115,876 | A * | 9/1978 | Cole, Jr. ................. | B63B 29/16 210/167.3 |
| 4,292,175 | A * | 9/1981 | Krause ................... | C02F 1/4674 204/237 |
| 4,565,636 | A * | 1/1986 | DeGraw et al. ........... | 210/748.2 |
| 5,447,630 | A * | 9/1995 | Rummler ........... | B01D 21/0003 110/185 |
| 6,395,181 | B1 * | 5/2002 | Mullerheim ........... | B01D 61/16 210/173 |
| 6,719,894 | B2 * | 4/2004 | Gavrel et al. ................. | 205/744 |
| 7,371,323 | B1 * | 5/2008 | Spielman ................... | C02F 9/00 210/263 |
| 2003/0075502 | A1 * | 4/2003 | Mullerheim ........... | B01D 61/16 210/615 |
| 2003/0226766 | A1 * | 12/2003 | Orlebeke ....................... | 205/688 |
| 2005/0126927 | A1 * | 6/2005 | Lindauer et al. ............. | 205/743 |
| 2007/0054158 | A1 * | 3/2007 | Ovshinsky .............. | H01M 4/32 429/9 |
| 2010/0122913 | A1 * | 5/2010 | Matousek et al. ............ | 205/743 |
| 2010/0155328 | A1 * | 6/2010 | O'Regan, Jr. ........... | C02F 3/006 210/614 |
| 2011/0198300 | A1 * | 8/2011 | Sadolin et al. ............. | 210/748.2 |
| 2011/0226704 | A1 * | 9/2011 | Matousek et al. ........ | 210/748.17 |
| 2011/0229780 | A1 * | 9/2011 | Kershaw ....................... | 429/422 |
| 2012/0055871 | A1 * | 3/2012 | Fresnel ................. | C02F 1/4674 210/630 |
| 2013/0075335 | A1 * | 3/2013 | Prakash et al. ................ | 210/640 |
| 2014/0209479 | A1 * | 7/2014 | Hoffmann et al. ........... | 205/743 |

FOREIGN PATENT DOCUMENTS

| | | | |
|---|---|---|---|
| SU | 1039813 | 9/1983 | |
| WO | 2007022844 A1 | 3/2007 | |
| WO | 2009154753 A2 | 12/2009 | |
| WO | WO 2010102418 A2 * | 9/2010 | ............ C02F 1/4674 |

OTHER PUBLICATIONS

Lemley, A.T. and Wagenet, L.P. "Water treatment notes: Terminology for onsite sewage treatment systems" Fact Sheet 9. Cornell Cooperative Extension, College of Human Ecology. Dec. 2005. Retrieved from <http://waterquality.cce.cornell.edu/publications/CCEWQ-09-TerminologyOnsiteSewage.pdf> on Jan. 6, 2016.*

X. Xu, Q. Liu, Y. Zuo. "A Study on All-Weather Flexible Auto-Tracking Control Strategy of High-Efficiency Solar Concentrating Photovoltaic Power Generation System" 2010 Second WRI Global Congress on Intelligent Systems. vol. 3. Institute of Electrical and Electronics Engineers (IEEE). Dec. 2010. pp. 375-378.*

Minden Gardnersville Sanitation District. "Glossary of Wastewater Terms" <http://www.mgsdistrict.org/wp-content/uploads/2011/11/Glossary-of-Wastewater-Terms.pdf> retrieved Sep. 22, 2017 (Year: 2017).*

Brain, Marshall. "How Toilets Work" Apr. 1, 2000. HowStuffWorks.com <http://home.howstuffworks.com/toilet.htm> (Year: 2000).*

Choi, J; Qu, Y.; Hoffmann M.R. "SnO2, IrO2, Ta2O5, Bi2O3, and TiO2 nanoparticle anodes: electrochemical oxidation coupled with the cathodic reduction of water to yield molecular H2" Journal of Nanoparticle Research. vol. 14, Article 983. 12 pages. (Year: 2012).*

Park, H.; Vecitis, C.D.; Choi, W.; Weres, O.; Hoffmann, M.R. "Solar-powered production of molecular hydrogen from water." Journal of Physical Chemistry Letters C. Jan. 4, 2008. vol. 112, Issue 4. pp. 885-889 (Year: 2008).*

Park, H.; Vecitis, C.D.; Hoffmann, M.R. "Solar-powered electrochemical oxidation of organic compounds coupled with the cathodic production of molecular hydrogen" Jul. 26, 2008. Journal of Physical Chemistry A. vol. 112, Issue 33. pp. 7616-7626 (Year: 2008).*

Park, H.; Vecitis, C.D.; Hoffmann, M.R. "Electrochemical water splitting coupled with organic compound oxidation: The role of active chlorine species" Journal of Physical Chemistry C. Apr. 13, 2009. vol. 113, Issue 18. pp. 7935-7945 (Year: 2009).*

Hoffmann, Michael Robert, Self-Contained, Photovoltaic Powered Domestic Toilet, Division of Engineering and Applied Science, Aug. 15, 2012.

Stecker et al., "Build a Better Toilet to Get Rich and Popular", Scientific American, Aug. 22, 2012.

Woo, Marcus, "Caltech Wins Toilet Challenge", Caltech, Aug. 15, 2012.

Kihwan Moon, International Preliminary Report on Patentability, PCT/US2013/063790, dated Apr. 16, 2015.

M. Erova, International Search Report and Written Opinion, PCT/US2013/063790, dated Mar. 27, 2014.

Hendricks, Keith D., International Preliminary Report on Patentability, PCT/US2013/063790, dated Oct. 24, 2014.

Hoffmann, Michael, "Self-Contained, PV-Powered Domestic Toilet and Wastewater Treatment System", Aug. 8, 2012, www.youtube.com/watch?v=eVQaMsvBLb8.

* cited by examiner

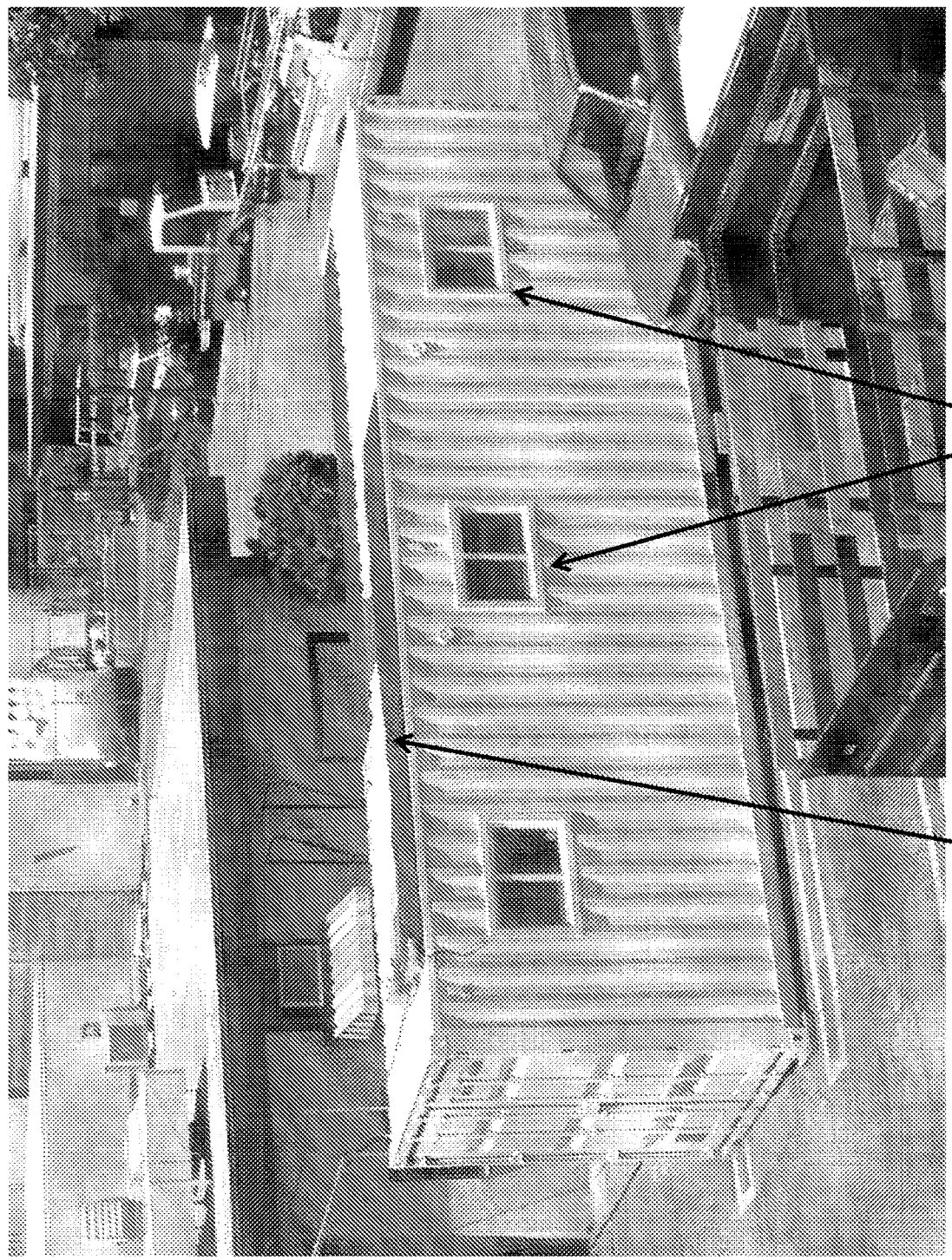

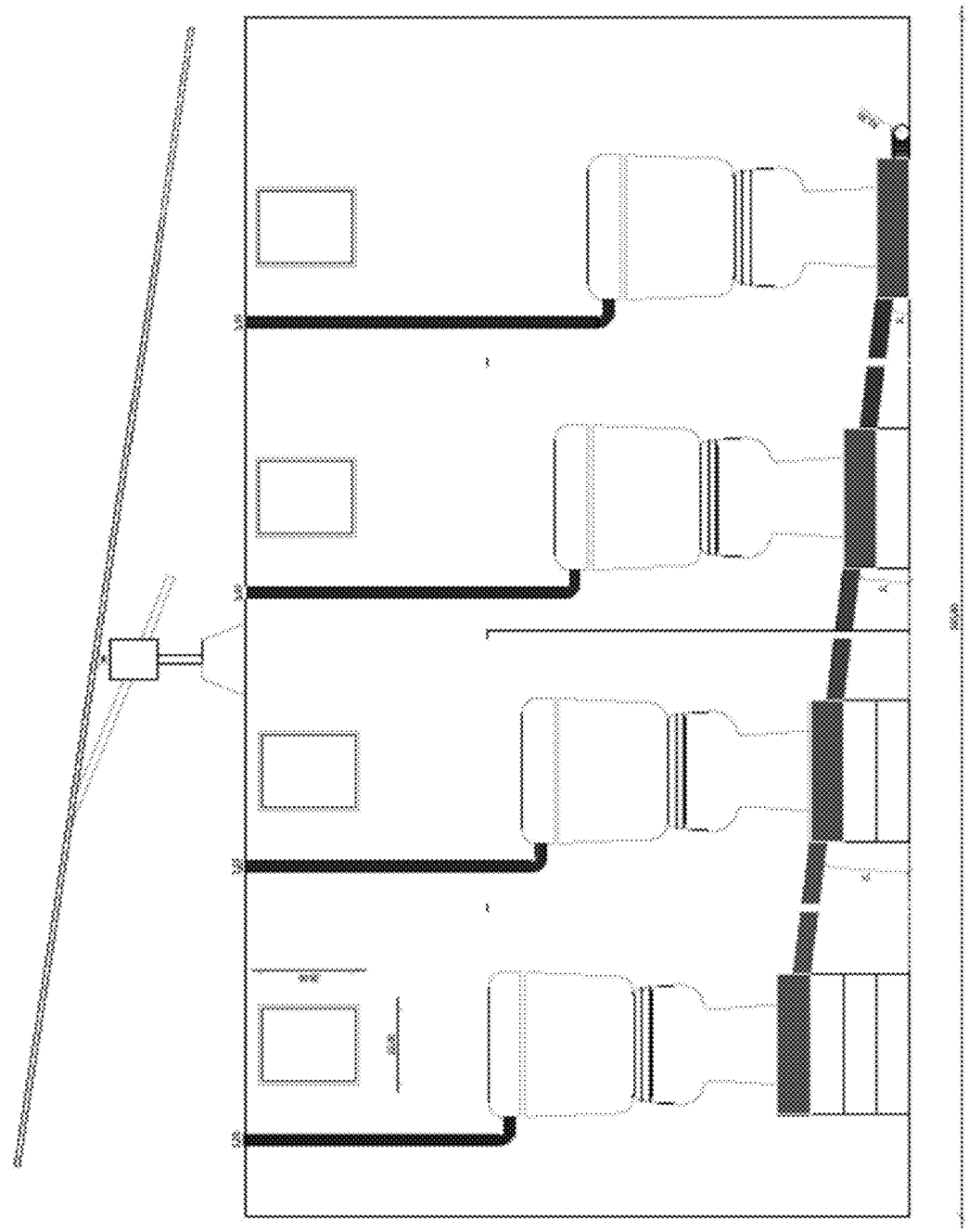

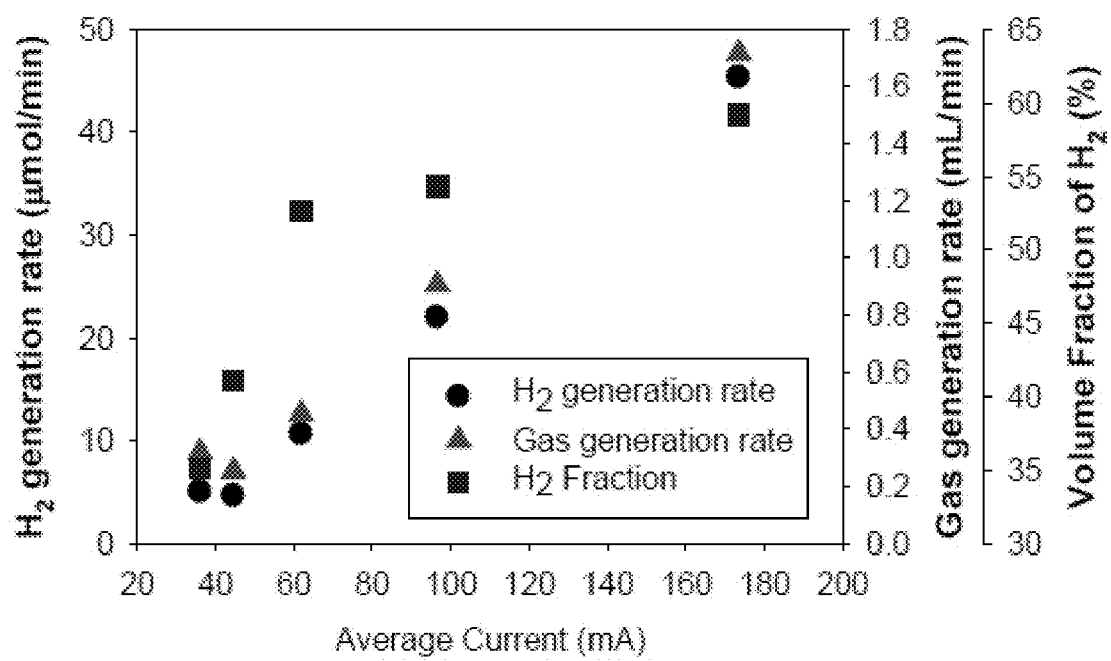
FIG. 16
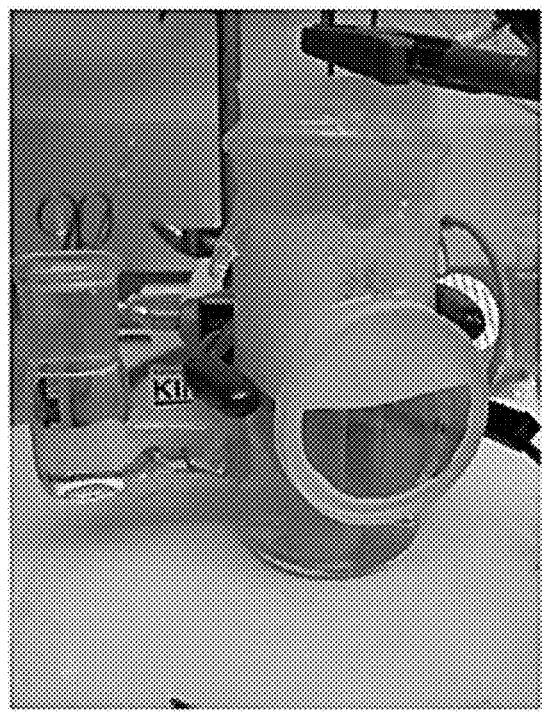 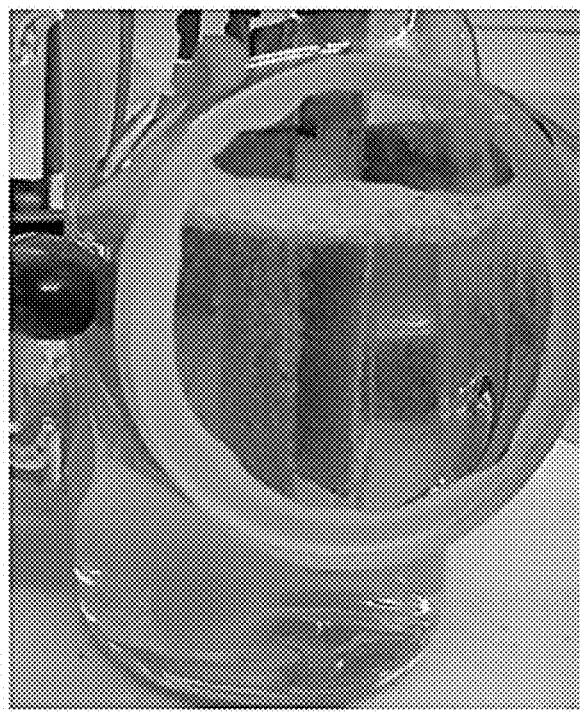
FIG. 17A  FIG. 17B

FIG. 22E
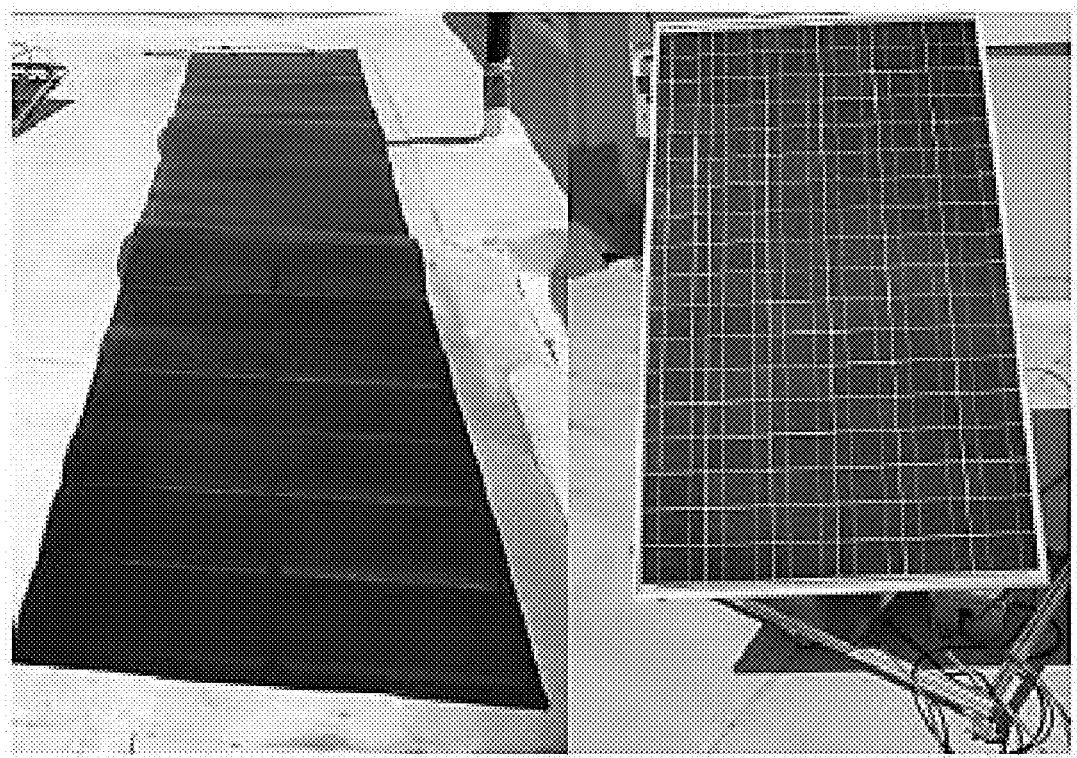
FIG. 23A  FIG. 23B

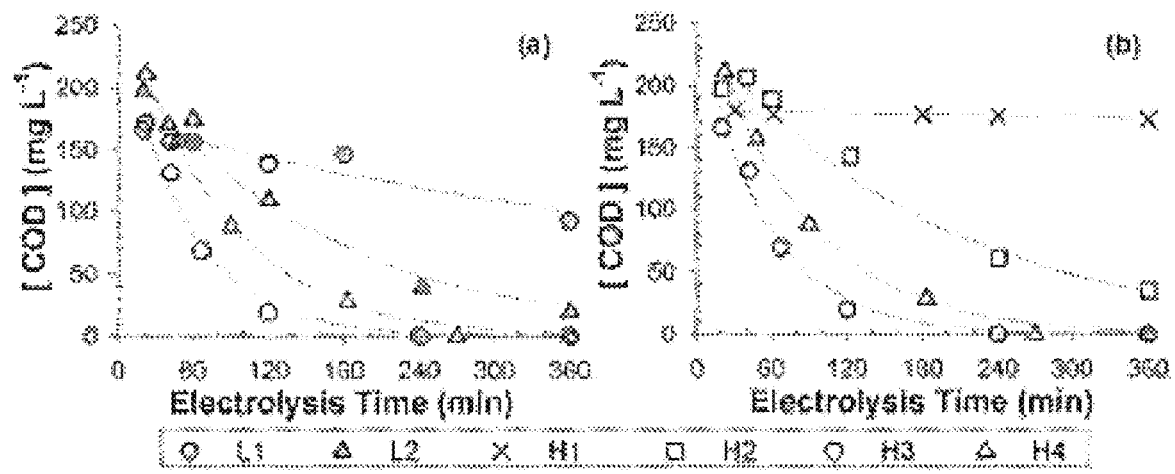
FIG. 27A  FIG. 27B
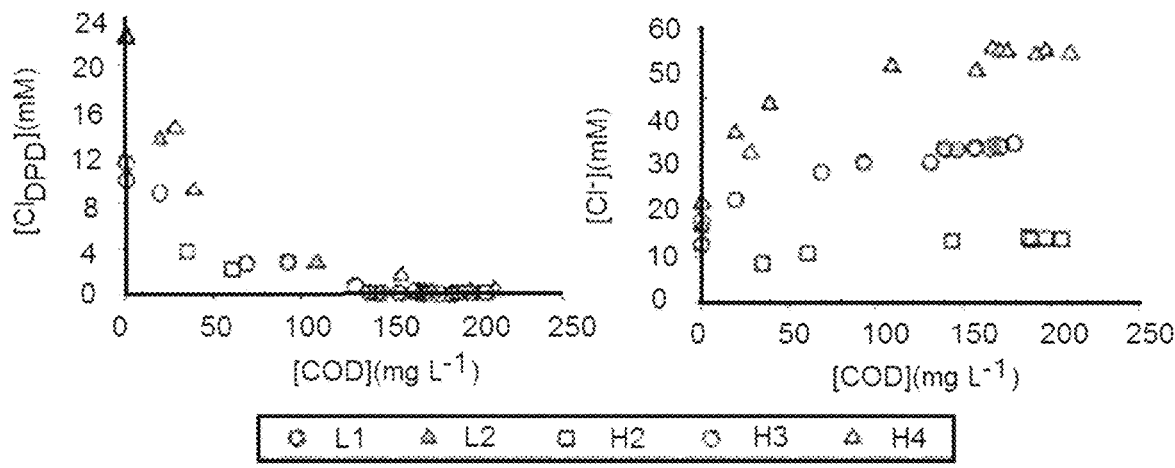
FIG. 28A  FIG. 28B

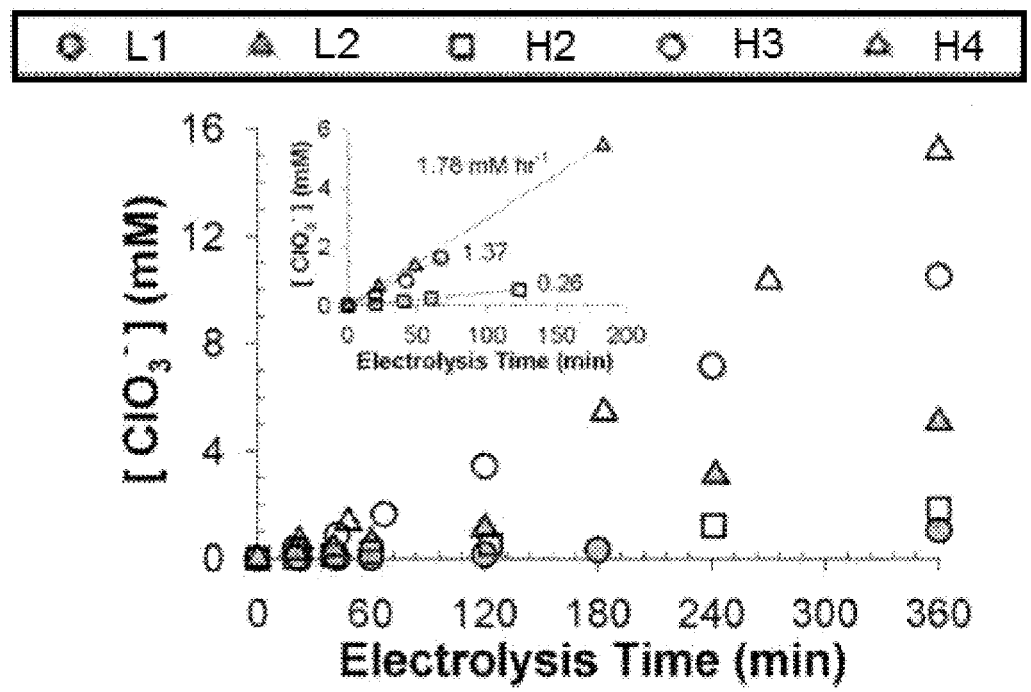
FIG. 29
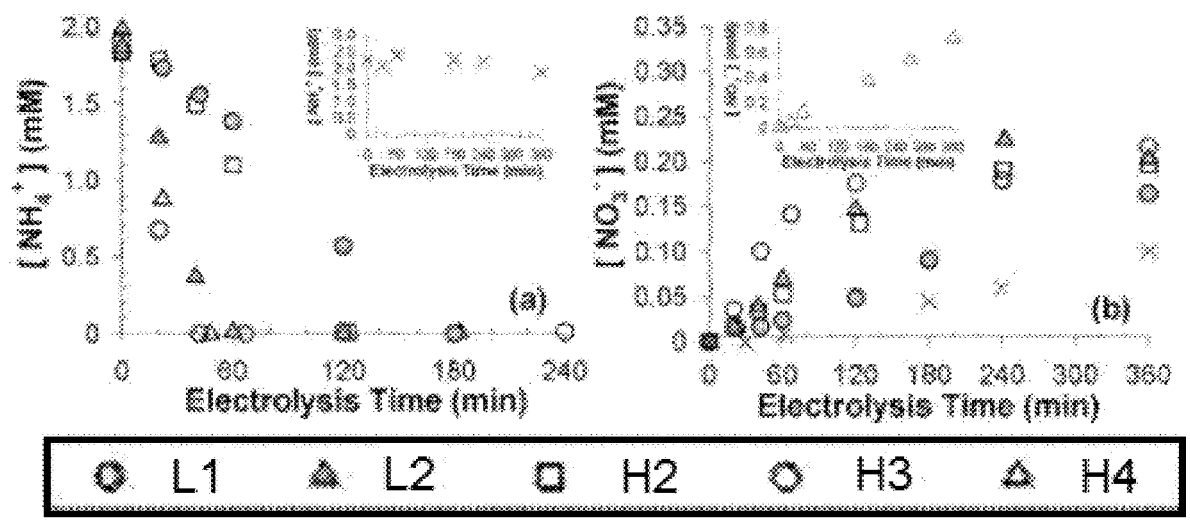
FIG. 30A  FIG. 30B

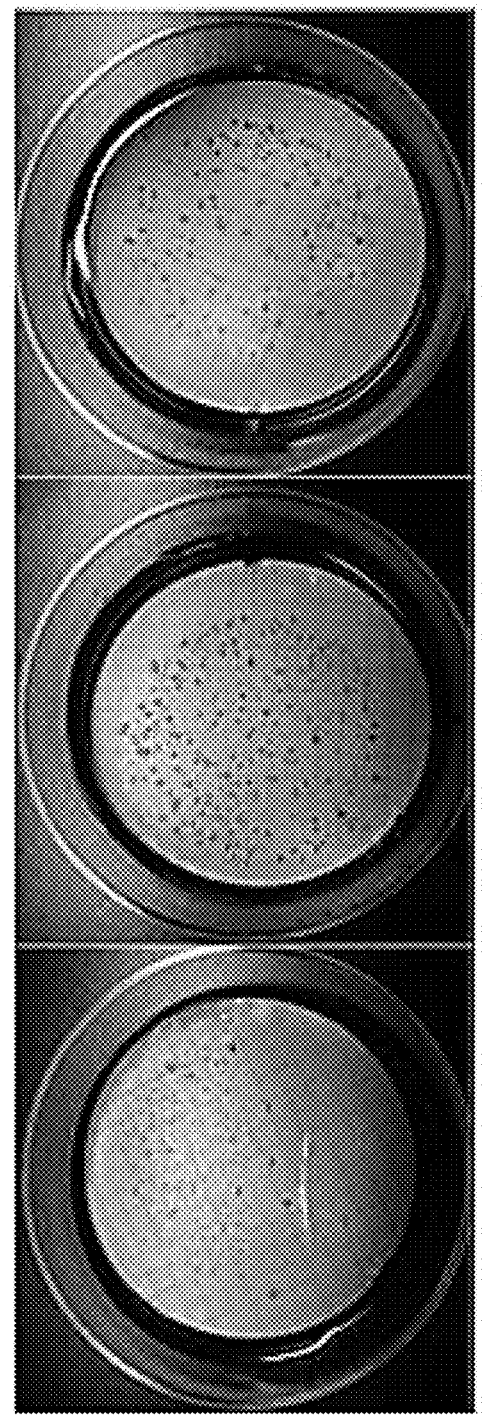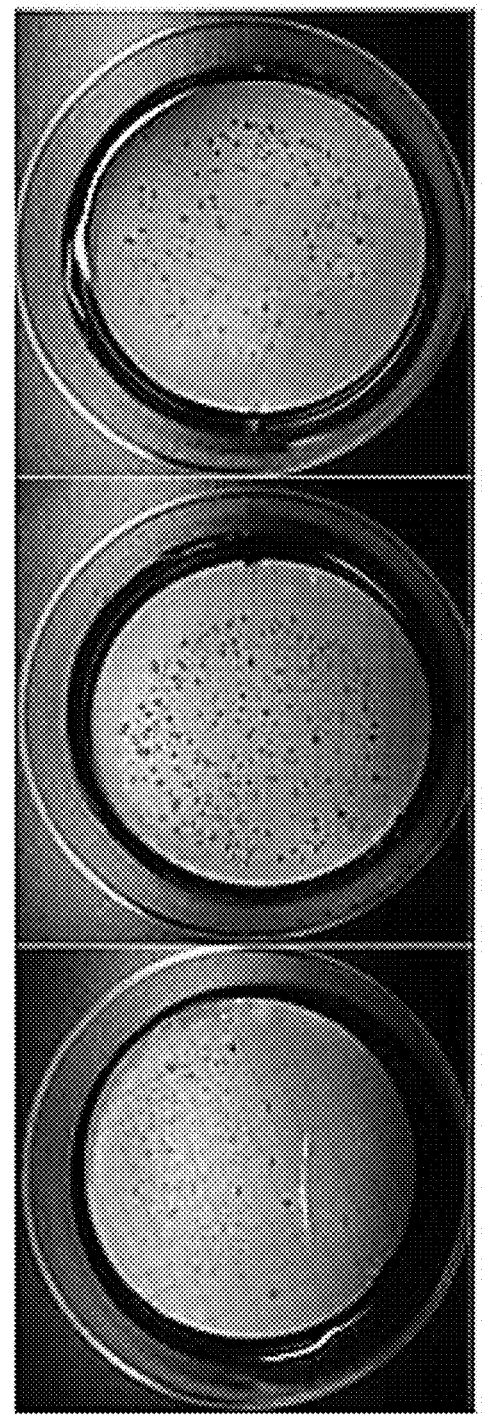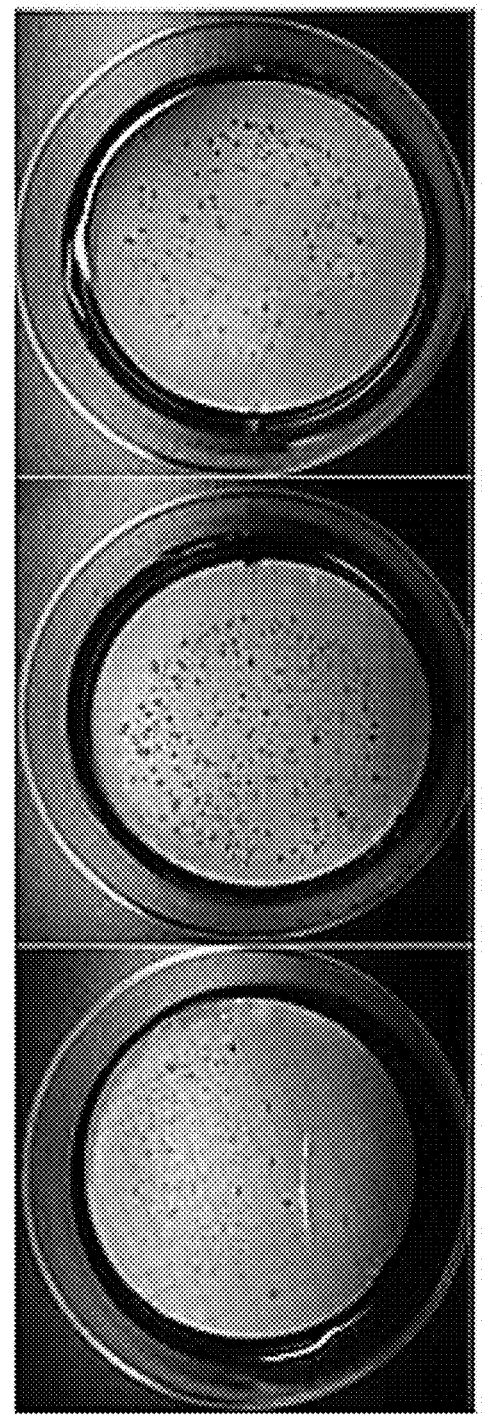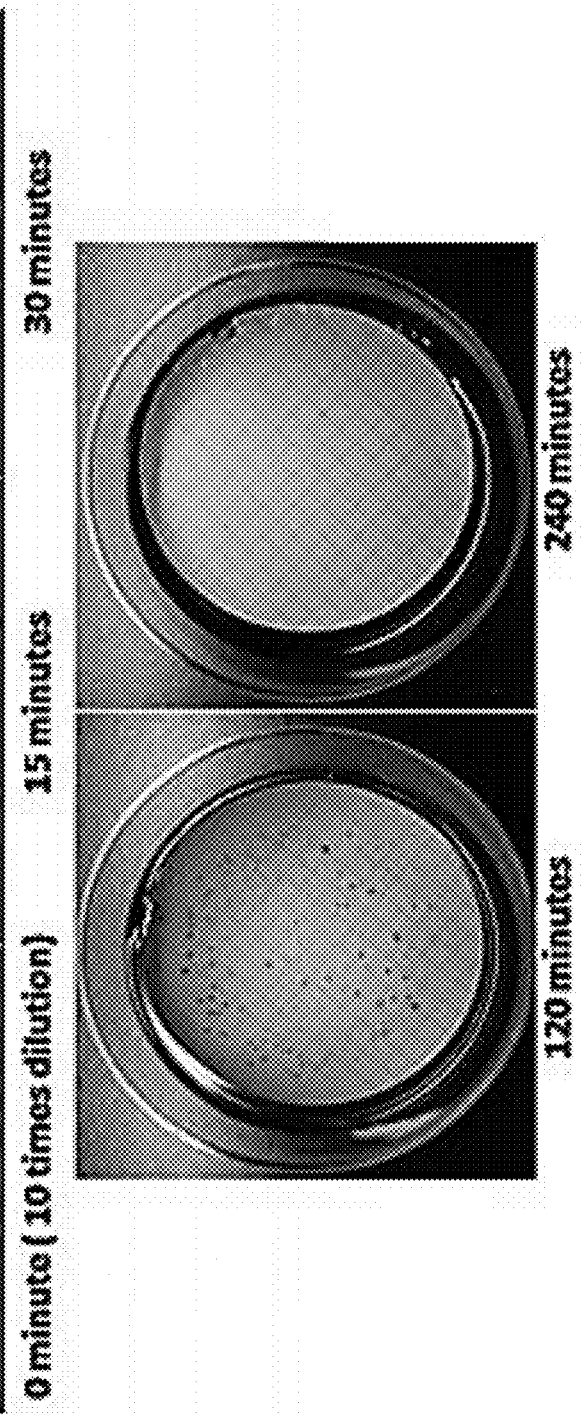

SELF-CONTAINED, PV-POWERED DOMESTIC TOILET AND WASTEWATER TREATMENT SYSTEM

CROSS-REFERENCE TO RELATED APPLICATIONS

This application claims priority to and the benefit of co-pending U.S. provisional patent application Ser. No. 61/710,857, filed Oct. 8, 2012, which application is incorporated herein by reference in its entirety.

STATEMENT REGARDING FEDERALLY FUNDED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

FIELD OF THE INVENTION

The invention relates to sewage treatment in general and particularly to a human waste treatment system and method that is disconnected from a conventional central sewage treatment system.

BACKGROUND OF THE INVENTION

The conventional sewage treatment system that is disconnected from a conventional central sewage treatment system is an open sewer or a flowing or stationary body of water into which waste, including human waste, is deposited. In many such sewage treatment systems in the third world, no deliberate treatment is applied in addition to those processes that occur in nature. Some of the problems with such sewage treatment systems are that diseases are easily transferred to anyone who comes in contact with such a body of water, and the sewage can and often does contaminate ground water supplies that are used in daily life.

In recent years, there has been growing challenge of sanitation dominantly in emerging countries, with a manifestation that more than 1.8 million children under five years old die from waterborne diseases every year (Corcoran et al., 2010). In developing countries, a deficit of social infrastructure including electric grid and sewer connection requires sanitation facilities for water management to be fossil-fuel independent and self-contained. In addition, global water models projecting an increase in water stress underscores the importance of a water management strategy towards increasing the water use efficiency (Alcamo et al., 2007). In urban area of developed world, water treatment criteria has become more stringent in order to enhance livability in cities, while a local augmentation in population density often causes wastewater flow exceeding the treatment capacity of a centralized sewage treatment facility.

Also known in the prior art is Weres et al., U.S. Pat. No. 5,364,508, issued Nov. 15, 1994, which is said to disclose electrochemical methods for producing hydroxyl free radicals and decomposing by oxidation chemical substances dissolved in water. The method utilizes a novel electrode which is capable of operation at sufficiently positive anodic potential to produce hydroxyl radicals. A complete device for oxidizing chemical substances dissolved in water is described, and operating conditions favorable to the method are discussed. Examples of oxidation reactions are presented, including oxidation of an herbicide, an insecticide, toluene, cresol, and a fluoroalkyl surfactant.

Also known in the prior art is Weres et al., U.S. Pat. No. 5,419,824, issued May 30, 1995, which is said to disclose a novel electrode which is capable of operation at sufficiently positive anodic potential to produce hydroxyl free radicals and release them into solution, and a process for producing these electrodes. It also provides electrochemical cells utilizing these electrodes, and a novel material included in these electrodes. The electrode consists of titanium metal or a titanium alloy, with an oxide coating that includes titanium dioxide and also includes niobium(IV) oxide or tantalum (IV) oxide, sufficient to impart adequate electrical conductivity to the titanium dioxide under the necessary anodic polarization. An electrode preparation process is described, which allows niobium or tantalum in the oxide coating to be reduced to the +4 valence state, and causes the coating to assume a very stable and insoluble crystal structure. A process for manufacturing ammonium niobate, which is the preferred source compound for niobium in the electrode manufacturing process, is also provided.

Also known in the prior art is Weres et al., U.S. Pat. No. 5,439,577, issued Aug. 8, 1995, which is said to disclose an electrochemical water treatment device for producing hydroxyl free radicals and decomposing by oxidation chemical substances dissolved in water. It utilizes a novel electrode which is capable of operation at sufficiently positive anodic potential to produce hydroxyl radicals.

Also known in the prior art is Weres, U.S. Pat. No. 7,494,583, issued Feb. 24, 2009, which is said to disclose an electrode having a valve metal substrate and an electrocatalytic surface composition comprising titanium dioxide doped with bismuth, and an electrolytic water purification process utilizing this electrode, wherein organic substances dissolved or dispersed in water are oxidized and degraded in a nonselective manner with good current efficiency.

There is a need for wastewater and solid human waste treatment facilities that are useful without connection to a conventional central sewage treatment system.

SUMMARY OF THE INVENTION

According to one aspect, the invention features a self-contained wastewater treatment system lacking a connection to a municipal wastewater treatment system. The self-contained wastewater treatment system comprises an electrochemical cell having at least one anode and at least one cathode, the electrochemical cell having a liquid input port configured to receive input in liquid form, a liquid output port configured to deliver output in liquid form and a gas output port configured to deliver output in a gaseous form, the electrochemical cell having an anode electrical terminal and a cathode electrical terminal; a gas accumulation device configured to receive and to store gaseous output from the electrochemical cell; a liquid accumulation device configured to receive and to store liquid output from the electrochemical cell; an electrical power source lacking a connection to an electrical grid, the electrical power source configured to provide electrical power to the electrochemical cell by way of the anode electrical terminal and the cathode electrical terminal, the electrical power source having at least one input terminal configured to receive control signals; at least one input port configured to receive as an input stream manmade waste in the form of one or more of urine, feces, and wastewater; a holding tank having a controlled output connection to the liquid input port of the electrochemical cell, the holding tank configured to receive the input stream from the at least one input port, to hold material in the received input stream and to transfer a portion of the material so held for treatment in the electrochemical cell by way of the liquid input port; and a controller having at least one controller input port configured to receive input signals representing one or more of data and instructions, the controller having at least one controller output port configured to provide control signals as output, the controller in communication with and configured to control the electrochemical cell, the gas accumulation device, the liquid accumulation device, the electrical power source and the holding tank.

In one embodiment, the electrochemical cell is an photoelectrochemical cell.

In another embodiment, the electrical power source comprises a photovoltaic panel.

In yet another embodiment, the electrical power source comprises a storage battery.

In still another embodiment, the gas accumulation device is configured to store hydrogen gas.

In a further embodiment, the self-contained wastewater treatment system further comprises a hydrogen-air fuel cell configured to receive hydrogen gas from the gas accumulation device and to supply electricity to the electrical power source.

In yet a further embodiment, the controller is a general purpose programmable computer operating under a set of instructions recorded on a machine-readable medium.

In an additional embodiment, the system further comprises measurement apparatus configured to measure operational parameters of the self-contained wastewater treatment system or of its components.

According to another aspect, the invention relates to a wastewater treatment process. The process comprises the step of providing an self-contained wastewater treatment system lacking a connection to a municipal wastewater treatment system, comprising: an electrochemical cell having at least one anode and at least one cathode, the electrochemical cell having a liquid input port configured to receive input in liquid form, a liquid output port configured to deliver output in liquid form and a gas output port configured to deliver output in a gaseous form, the electrochemical cell having an anode electrical terminal and a cathode electrical terminal; a gas accumulation device configured to receive and to store gaseous output from the electrochemical cell; a liquid accumulation device configured to receive and to store liquid output from the electrochemical cell; an electrical power source lacking a connection to an electrical grid, the electrical power source configured to provide electrical power to the electrochemical cell by way of the anode electrical terminal and the cathode electrical terminal, the electrical power source having at least one input terminal configured to receive control signals; at least one input port configured to receive as an input stream manmade waste in the form of one or more of urine, feces, and wastewater; a holding tank having a controlled output connection to the liquid input port of the electrochemical cell, the holding tank configured to receive the input stream from the at least one input port, to hold material in the received input stream and to transfer a portion of the material so held for treatment in the electrochemical cell by way of the liquid input port; and a controller having at least one controller input port configured to receive input signals representing one or more of data and instructions, the controller having at least one controller output port configured to provide control signals as output, the controller in communication with and configured to control the electrochemical cell, the gas accumulation device, the liquid accumulation device, the electrical power source and the holding tank. The process includes the steps of receiving manmade waste in the form of one or more of urine, feces, and wastewater; transferring a portion of the received manmade waste to the electrochemical cell; operating the electrochemical cell to electrochemically treat the manmade waste; and recovering from the electrochemically treated manmade waste at least one of a disinfected liquid waste, a gaseous product and an agricultural fertilizer product, thereby remediating the received manmade waste.

In one embodiment, the wastewater comprises one or more of effluent from bathing and hygiene, food preparation, washing clothing, and washing other possessions.

In still another embodiment, a chlorine concentration is controlled in the received manmade waste in the electrochemical cell.

In another embodiment, the electrochemical cell disinfects the received manmade waste by generating reactive chlorine species that reacts with the received manmade waste.

In yet another embodiment, the reactive chlorine species is one or more of $Cl_2$, HOCl, $ClO^-$, chlorine radical Cl., and chlorine radical $Cl_2$..

In a further embodiment, the step of operating the electrochemical cell to electrochemically treat the manmade waste results in the generation of hydrogen gas.

In yet a further embodiment, the hydrogen gas is stored in the gas accumulation device.

In still a further embodiment, the hydrogen gas is consumed in a hydrogen-air fuel cell configured to supply electricity to the electrical power source.

In an additional embodiment, the electrochemical cell further comprises a reference electrode.

In one more embodiment, an operating voltage of the electrochemical cell is controlled.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1I is a schematic process flow diagram of an embodiment of a solar toilet system that uses additional electrochemical reactors in series.

FIG. 3C is another view of the shipping container, showing photovoltaic solar cells situated on the top surface (effectively the roof) of the shipping container, and showing windows in the rear wall of each compartment.

FIG. 4B is an elevation plan for a four toilet system along section A-A.

FIG. 9A is an image of a single Ti metal plate coated on both sides with a series of semiconductors with a top layer of BiOx-TiO$_2$ with an average particle size of 15 nm.

FIG. 9B is an image of a 10-anode/11 cathode array viewed edge-on.

FIG. 9C is an image of the array viewed on in perspective.

FIG. 16 is a graph that illustrates the hydrogen generation rate, gas generation rate, and volume fraction of hydrogen as a function of average current in wastewater electrolysis using an effective electrode area=5.4 cm$^2$.

FIG. 17A is an image of an electrolysis cell during the oxidation of undiluted fresh human urine.

FIG. 17B is an image of electrolysis in the same cell when the original sample was diluted by a factor of 4 in the bench-top electrochemical cell.

FIG. 20C is a graph that shows urea degradation rates and ammonium ion production levels as a function of the metal cathode composition.

FIG. 20D is a graph that shows H$_2$ gas production rates as a function of metal cathode composition as measured in the head space of the reactor by quadrupole mass spectrometry.

FIG. 22B, FIG. 22C, FIG. 22D and FIG. 22E are different views of the photoelectrochemical reaction chamber.

FIG. 23A is an image of a higher efficiency, increased power output encased plastic laminated triple junction crystalline silicon solar panel that can be used as roofing material or siding for the prototype solar toilet.

FIG. 23B is an image of a polycrystalline convention PV-panel solar cell array that operates at lower solar collection efficiency.

FIG. 27A is a graph that shows the effects of applied anodic potential on time profiles of COD concentration regressed with pseudo-first-order kinetic equations for potentiostatic wastewater electrolysis cell experiments with domestic wastewater.

FIG. 27B is a graph that shows the effects of external chloride concentration on time profiles of COD concentration regressed with pseudo-first-order kinetic equations for potentiostatic wastewater electrolysis cell experiments with domestic wastewater.

FIG. 28A is a graph that shows the evolution of reactive chlorine species with variation in COD concentration for potentiostatic wastewater electrolysis cell experiments with domestic wastewater as a function of time.

FIG. 28B is a graph that shows the evolution of chloride concentration variation in COD concentration for potentiostatic wastewater electrolysis cell experiments with domestic wastewater as a function of time.

FIG. 29 is a graph showing a time profile of chlorate concentration for potentiostatic wastewater electrolysis cell experiments with domestic wastewater. The inset figure shows linearly increasing regions of chlorate concentration with zero order rate constants for H2, H3 and H4.

FIG. 30A is a graph of the time profile of ammonium ion concentration for potentiostatic wastewater electrolysis cell experiments with domestic wastewater.

FIG. 30B is a graph of the time profile of nitrate concentration for potentiostatic wastewater electrolysis cell experiments with domestic wastewater.

FIG. 33P through FIG. 33T is a sequence of images of the *E. Coli* coliform colony formation over time.

DETAILED DESCRIPTION

Figure 1A:
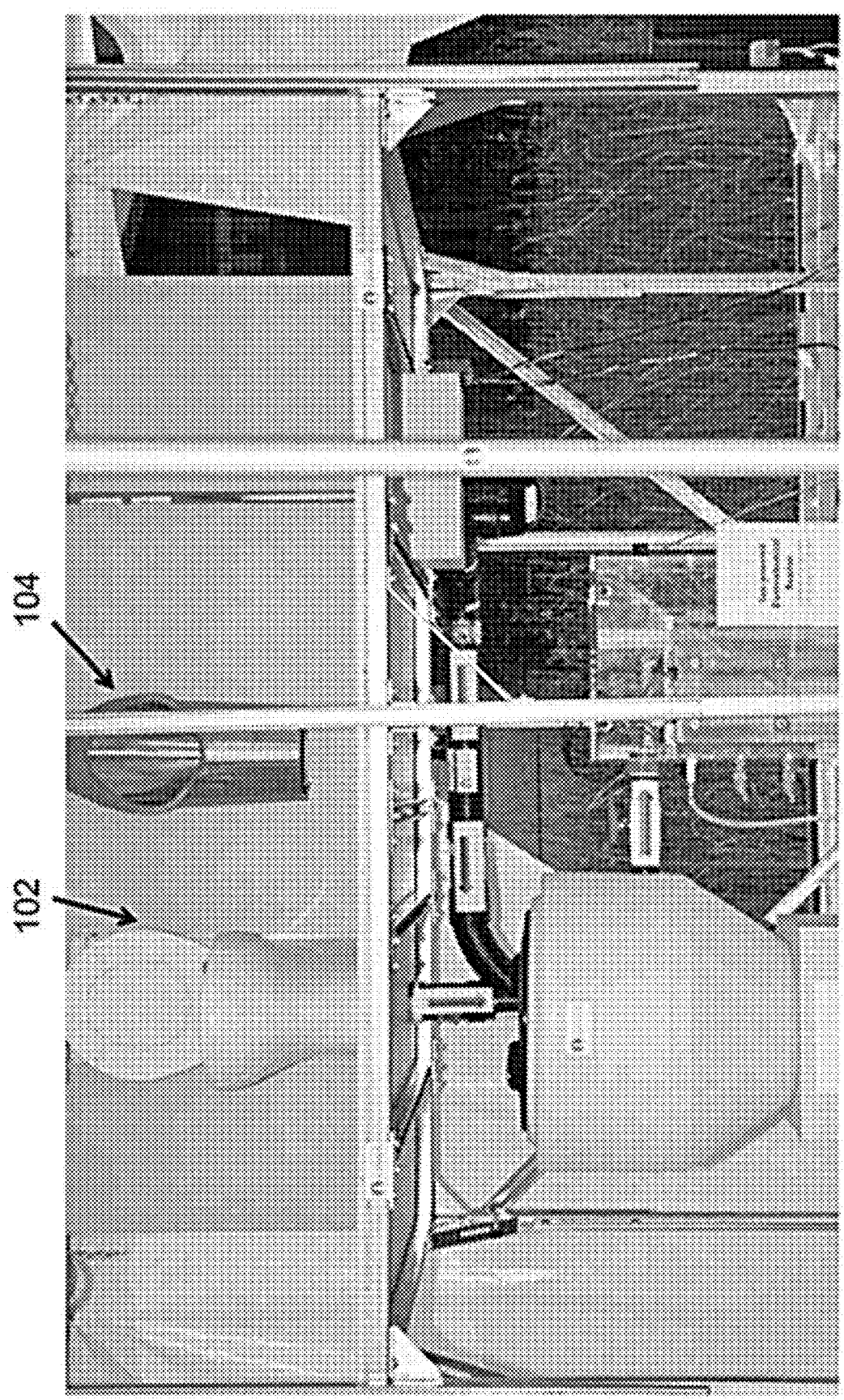
FIG. 1A is an image of a portion of a demonstration platform that shows two toilets (one western style, one squat toilet) and a waterless urinal.

The invention has as its overall purpose the prevention of disease propagation by disinfecting human waste and additionally generating hydrogen as a source of energy from the waste stream. This invention is expected to be applied in fixed locations such as villages that are disconnected from a conventional central sewage treatment system, as well as in portable systems such as portable toilets ("port potties"), recreational vehicles (RVs), airplanes, sailing ships, and other mobile conveyances so as to promote human health, and make it possible to sanitize human waste. It is believed that the novel features of the toilet unit include disinfection of the human waste, off-the-grid operation, and provision of a self-sustaining system.

The invention provides a sustainable, traditional infrastructure-free approach to the handling and processing of human sanitary waste including human fecal solids control, urine processing, and liquid wastewater treatment. The treatment scheme incorporates sludge disinfection, treatment, and volume reduction. The solar toilet system has at its core unit process photovoltaic-powered (PV) electrochemical chemical reactors that generate $H_2$ as a potentially useful by-product obtained during anoxic wastewater and fecal matter treatment including the complete disinfection of the total cultural bacteria initially present. The system has been designed to be free of an electrical grid or from subsurface urban infrastructure. In various embodiments, the wastewater that can be treated includes such wastewater streams as household wastewater, industrial wastewater, hospital wastewater, toilet wastewater, urine, mixed effluents, and similar wastewater streams.

In one embodiment the solar toilet includes a sequential wastewater process treatment stream that incorporates a western-style toilet, an Asian-style squat toilet, and a waterless urinal. In one embodiment, the treatment system is powered by a GPS-programmed automatic self-powered solar tracking system. The individual steps in waste treatment include a septic wastewater and anaerobic solids holding tank, solar-powered electrochemical reactors, a post-reactor storage tank, Li-ion or conventional battery storage systems for solar energy regulation and storage, a PV-to-battery charge controller, a membrane microfiltration unit, and a treated water storage tank. The electrochemical reactor design includes a series of titanium metal plate anodes coated with a sequential series of nano-particulate semiconductors (e.g., $SnO_2$, $IrO_2$, $Ta_2O_5$, $Bi_2O_3$ and $TiO_2$) and anodes are matched with stainless steel cathodes. The treatment scheme can be adapted for single family use as a sanitary toilet facility. It is believed that the design can be enlarged in size to handle the daily wastes of 500 people with a predicted break-even operating cost when powered by a PV array in which energy is stored for use throughout 24 hours of continuous operation. Tests have been performed at the bench-scale and at the prototype scale with synthetic feces, with urine, with domestic wastewater, and with human feces. Based on both a bench-top laboratory experiments and on a larger-scale reactor systems (20 L and 40 L process volumes), and in the prototype unit testing unit, the general concept, specific design elements, and treatment approach have proven to be viable for the treatment of raw domestic wastewater, human urine, human feces, and synthetic human waste analogues. After several hours of PV-powered electrochemical treatment, the turbid, black-water influent can be clarified with the elimination of the suspended particles along with the reduction or total elimination of the chemical oxygen demand (COD), total enteric coliform disinfection via in situ reactive chlorine species generation, and the elimination of measurable protein after 3 to 4 hours of PV-powered treatment. It is expected that additional features such as a residual sludge handling unit, a hydrogen purification and filter system, a closed water reuse cycle, and a hot-water heating system driven by resistance heating from the PV panel output can be provided.

Modest amounts of make-up water may be required due to small evaporative water losses during treatment. We have identified and quantified several useful by-products of treatment that include $H_2$ gas that can be compressed to serve either as a gaseous fuel for cooking or water heating, along with nitrate, urea, ammonia and phosphate for use as fertilizer. The disinfected residual organic solids are also completely disinfected for potential use as an organic soil amendment for agriculture.

High Level Description of the System

In other embodiments, the wastewater flow among many of the parts is driven by gravity due to an elevation difference. In some embodiments, a pump is used after the filter to raise the water to the reservoir elevation. The toilet has different parts as described below and as illustrated in one embodiment in FIG. 1A through 1H.

As illustrated in FIG. 1A, a point of entry for the human waste is provided by a toilet 102, and/or a urinal 104. The toilet 102 can be a toilet of the type usually found in the typical American bathroom, or it can be a squat toilet as may be found in other countries. Water used to flush the toilet is provided by a recirculated supply, as will be explained hereinafter.

Figure 1B:
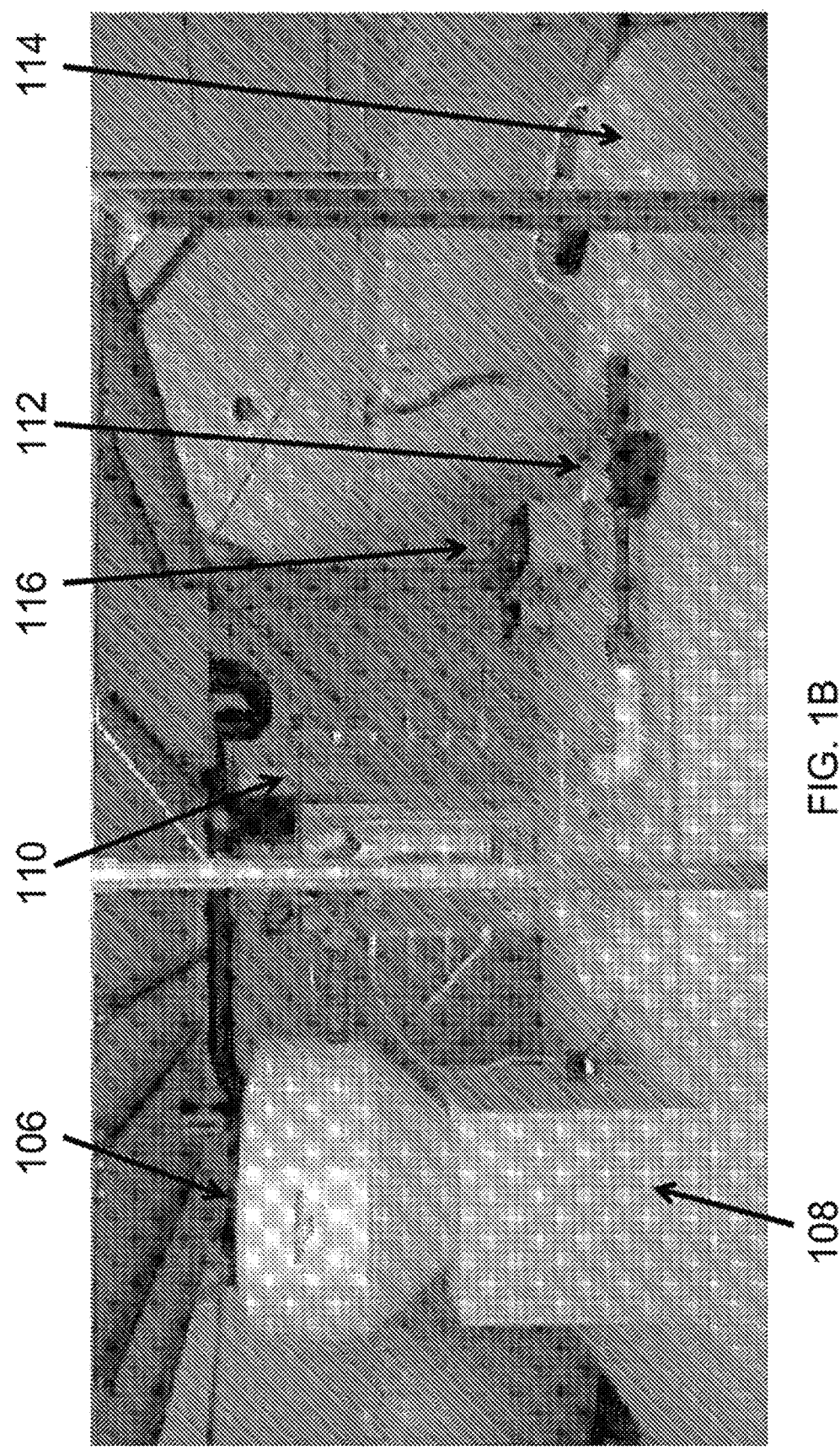
FIG. 1B shows the four unit processes and the battery pack and associated charge controller that stores and regulates the electrical output of the solar PV collectors.

Turning to FIG. 1B, the effluent from the toilet 102, or urinal 104 flows to a septic tank 106, which is a reservoir for holding, mixing and buffering the effluent. The septic tank 106 stores the effluent and can include a settling tank 108 for anaerobic digestion. The settling tank 108 has an outlet that allows material to be moved to an electrochemical reactor 110. Material in the wastewater, such as solids, that is not treatable can be precipitated in the settling tank 108. That material can be delivered from the bottom of the settling tank 108 and can be used as fertilizer.

The electrochemical reactor 110 uses electrodes powered by electricity. In some embodiments, the electrodes are believed to have novel composition. In the system described, the electricity is generated at least in part by conversion of sunlight using photovoltaic modules with associated controllers and electrical storage systems, such as batteries. The electrochemical reactor allows the electrochemical degradation and disinfection of human waste, and the generation of hydrogen gas which may be used as a fuel and the generation of phosphate and nitrate products which may be used as fertilizers or as chemical precursors.

A microfiltration unit 112 is provided as a component that provides additional purification of the effluent from the electrochemical reactor 110.

A buffer tank 114 is provided to store the treated wastewater. A pump 120 is provided to return the treated wastewater to a holding tank (or a liquid accumulation device), for example on the roof of a toilet installation, for reuse, for example as water to flush the toilet 102. Because the wastewater has been disinfected, excess treated effluent wastewater can also be used for purposes such as agricultural irrigation in which non-potable water is adequate, and in which potable water is not required.

Figures 1C, 1D, 1E, 1F, 1G:
FIG. 1C is an image of an electrochemical reactor.
FIG. 1D is an image of a 10.anode and 11 cathode electrode array.
FIG. 1E is an image of a GPS tracking photovoltaic panel with the back-up silicon triple-junction laminated solar collector, which can be integrated into the toilet facility housing.
FIG. 1F is an image of the electrochemical reactor filled with black wastewater.
FIG. 1G is an image showing the appearance of the wastewater after 4 hours of solar PV-powered electrochemical treatment.

FIG. 1C is an image of an electrochemical reactor. FIG. 1D is an image of a 10.anode and 11 cathode electrode array. These are described in greater detail hereinbelow.

FIG. 1E is an image of a GPS tracking photovoltaic panel with the back-up silicon triple-junction laminated solar collector, which can be integrated into the toilet facility housing.

FIG. 1F is an image of the electrochemical reactor filled with black wastewater.

Figure 1H:
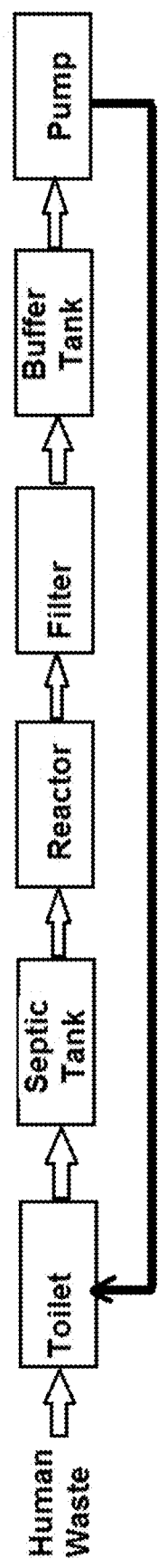
FIG. 1H is a schematic flow diagram showing the flow of material in the system.
Figure 11:
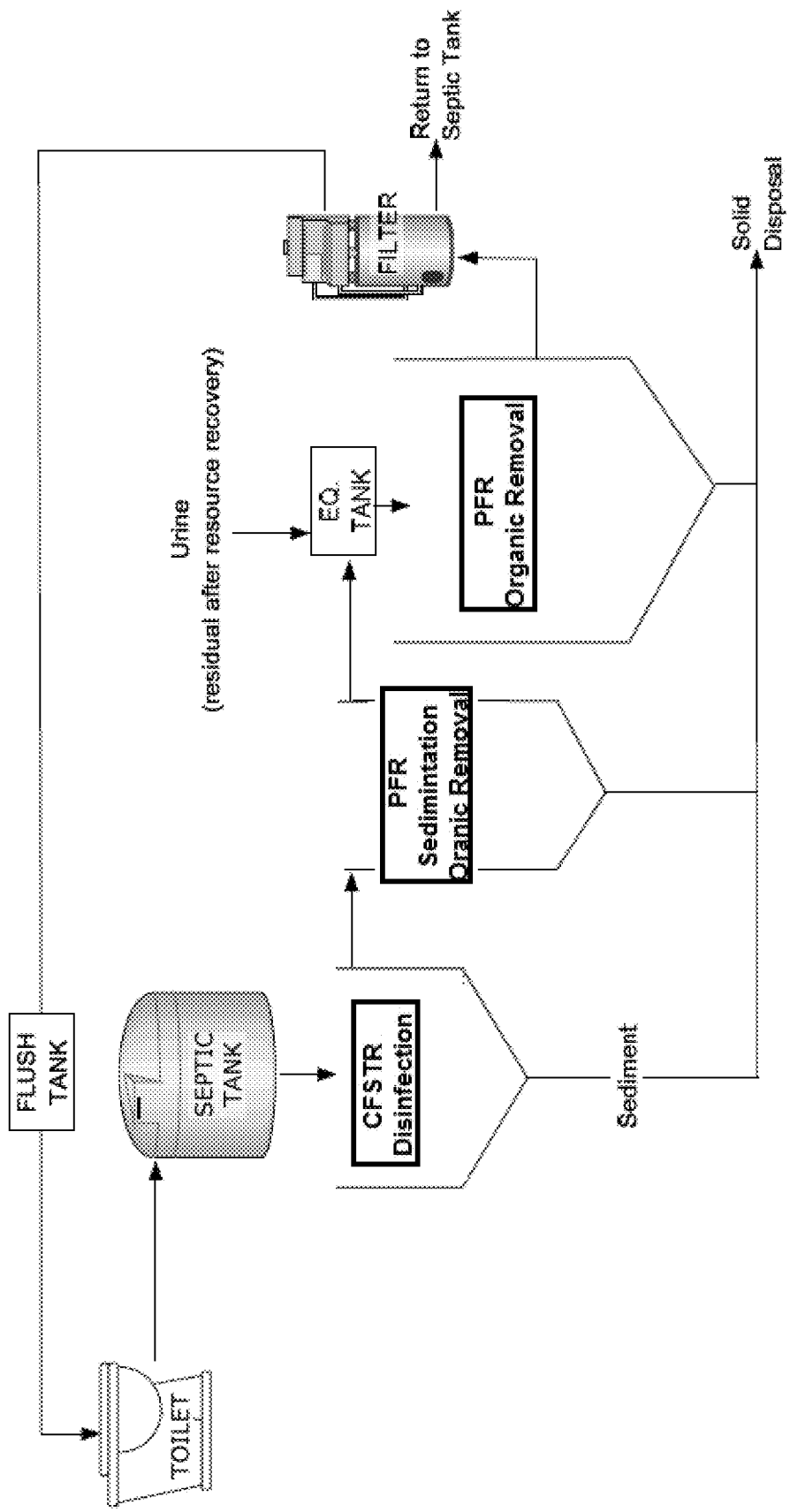
FIG. 11A is an image of TiO$_2$ nanotube anodes grown directly from Ti metal.
FIG. 11B is an image of TiO$_2$ nanowires grown on Ti wire mesh.
FIG. 11C is an image showing a nanowire with a diameter of 18.2 nm.

FIG. 1G is an image showing the appearance of the wastewater after 4 hours of solar PV-powered electrochemical treatment. In other embodiments, more or less time may be required depending on such factors as the amount of wastewater to be processed and the rate of electrical energy generation FIG. 1H is a schematic flow diagram showing the flow of wastewater in the system.

FIG. 1I is a schematic process flow diagram of an embodiment of a solar toilet system that uses additional electrochemical reactors in series. In other embodiments, the reactor arrangement can be parallel, series or a mixture of the two based on the treatment condition. This embodiment allows separate treatment pathways for urine and feces as an alternative approach to waste handling and product recovery.

Figure 1J:
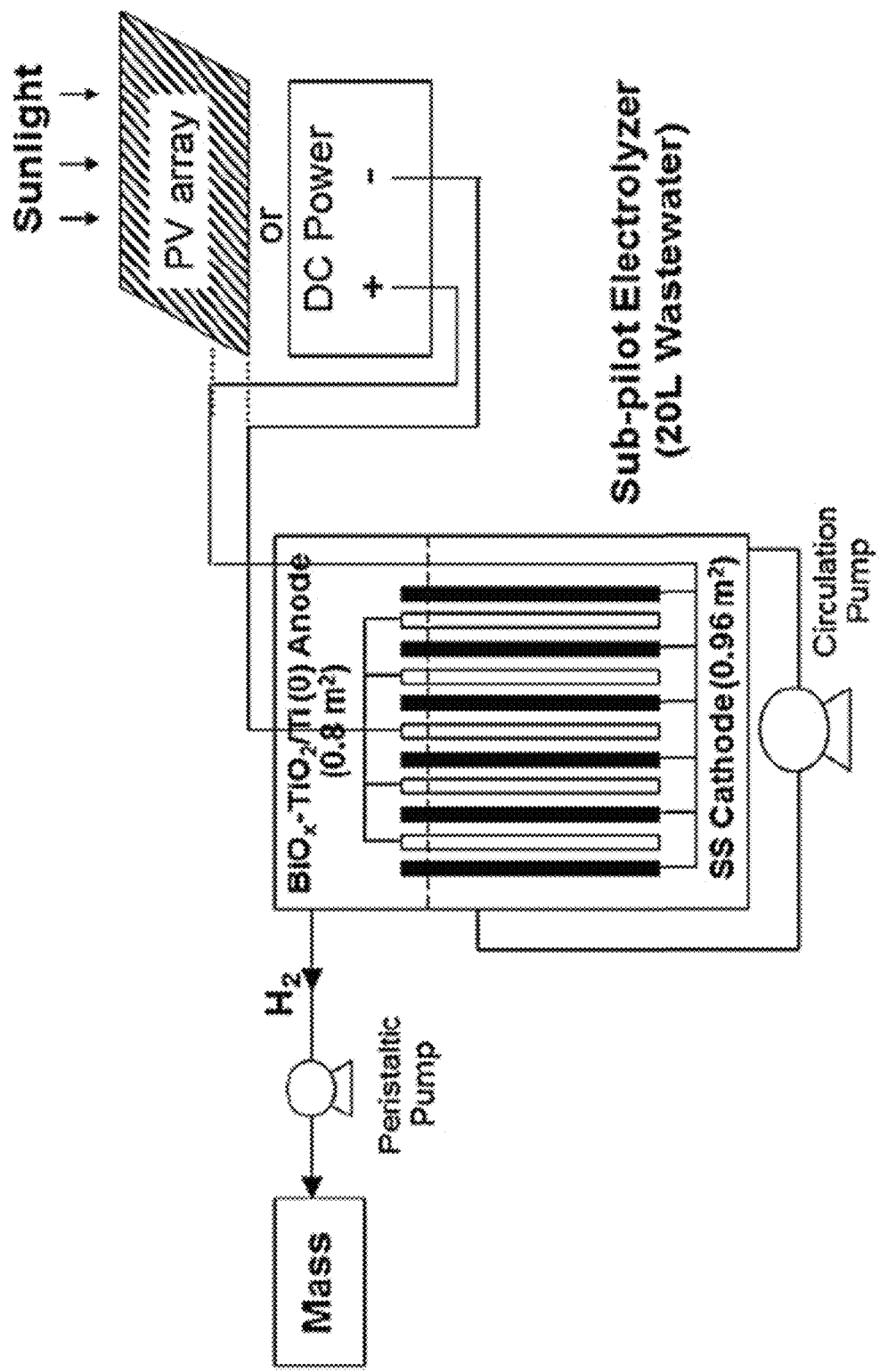
FIG. 1J is a schematic diagram of one embodiment of an electrochemical reactor.

FIG. 1J is a schematic diagram of a subpilot electrochemical reactor.

In operation of the electrochemical reactor of FIG. 1J, sample aliquots were withdrawn from the solution intermittently during electrolysis. The disappearance or bleaching of the color of the solution was monitored by measuring the absorbance with a UV/Vis spectrophotometer. The concentrations of phenol, salicylic acid, and triclosan were measured by a HPLC (Agilent 1100 series) equipped with a C18 column and a UV detector. The mobile phase of HPLC mixture contained 45% acetonitrile, 55% Milli-Q water, and 0.1 wt. % acetic acid. For actual authentic wastewater samples, the chemical oxygen demand (COD) was measured using COD reagent vials (Hach), which utilize dichromate as the oxidant in an acidic solution at 150° C. for 2 h. AgNO3 (Aldrich) was added into sample solution before measuring COD to eliminate the chloride interference when NaCl was used as the electrolyte. In addition, the COD of the other test substrates was also measured to determine the current efficiencies for the anodic oxidations.

Molecular hydrogen (H2) produced from water during electrolysis was detected by a quadruple mass spectrometer (MS, Balzers). As shown in FIG. 1J, the reactor was sealed and the headspace gas of the reactor was extracted with a peristaltic pump and pushed into a quadruple MS with 70 eV electron ionization energy via a turbo pump (Pfeiffer; 5.0 9 10-6 Torr). The production rate of H2 was calculated from the volume percent of H2 in the headspace gas, which was measured assuming that it was directly proportional to the percentage of ion current of H2 in total ion currents measured by MS.

The present invention provides a photovoltaic-powered wastewater electrolysis cell (PWEC) as a dual functioning approach to couple electrochemical remediation of environmentally relevant pollutants in domestic wastewater with simultaneous hydrogen production. The concept of PWEC allows operation free of an electrical grid or from subsurface urban infrastructure, by on-site wastewater treatment driven by photovoltaic (PV) panels. Therefore, the PWEC as an off-the-grid technology can be integrated into a water management scenario in order to reduce pollutant loads to receiving water bodies or wastewater treatment plants, while enhancing the water use efficiency by wastewater reuse and reducing water consumption for energy production.

When conventional electrolysis for water splitting employs wastewater as an electrolyte, a wastewater electrolysis cell (WEC) able to degrade environmental pollutants by direct (heterogeneous) or indirect (homogeneous) oxidation pathway. Electrochemical water oxidation on metal oxides anodes has been known to produce physisorbed hydroxyl radicals and, by further transition, active oxygen chemisorbed to a higher-oxidation-state metal (Comninellis, 1994). This surface-bound reactive oxygen species (ROS) serves as an intermediate for oxygen evolution or for heterogeneous oxidation of aqueous and particulate pollutants (Martinez-Huitle and Ferro, 2006). In addition, the ROS also reacts with chloride present in wastewater to produce reactive chlorine species (RCS), which include free chlorine species ($Cl_2$, HOCl, $ClO^-$) and chlorine radical species (Cl.,$Cl_2$.), as indirect oxidants for organic or inorganic pollutants (Panizza and Cerisola, 2009; Park et al., 2009). Consequently, organic compounds are converted primarily to carbon dioxide and lower molecular weight organic acids while complete disinfection of colony forming bacteria is expected. This green chemistry without external chemicals can be totally driven by PV panels, which makes the PWEC to be a self-sustainable practice. Relatively inexpensive polycrystalline PV panels convert solar light into a sufficiently large direct current (DC) potential across the anode-cathode pairs to oxidize water (Park et al., 2008). Anodic oxygen evolution via water oxidation is normally complemented by hydrogen production from reduction of water or protons. Consumption of ROS by pollutants and chloride circumvents the oxygen evolution resulting in non-stoichiometric water splitting (Choi et al., 2012). The gaseous hydrogen, as a primary byproduct of the PWEC, can be used to provide a backup energy source for nighttime operation of the PWEC or for other purposes.

Boron doped diamond, $SnO_2$, and $PbO_2$ are well-known non-active electrodes whose weak interaction between hydroxyl radicals and the electrode surface preferentially leads to the direct oxidation of pollutants (Costa and Olivi, 2009). Despite the excellent current efficiency for oxidation of pollutants reported in the literature, these non-active electrodes are not suitable for hydrogen production and energy storage purposes due to the lack of electrocatalytic activities in oxygen evolution (Panizza et al., 2005). On the other hand, so-called dimensionally stable anodes (DSAs) based on $RuO_2$ and $IrO_2$ have been widely used for electrolytic hydrogen production as well as electrochemical waste treatment for their high activity for oxygen evolution and indirect oxidation capability (Martinez-Huitle and Ferro, 2006). Nevertheless, a commercial application of these active electrodes has been limited by the relatively high material cost. As described herein, the components of the PWEC design include hetero junction metal oxide anodes sequentially coated with mixed semiconductors and inexpensive stainless steel (SS, Hastelloy C-22) cathodes. Domestic wastewater collected from a local wastewater treatment plant was employed under controlled laboratory conditions in small-scale WEC with direct DC potentials before carrying out scaled-up (20 L) PWEC experiments outdoors. The effects of operating parameters on removal of chemical oxygen demand (COD) were investigated based on a simple kinetic model. Effective disinfection of the liquid waste stream was achieved, showing that one can provide disinfected recycled water of acceptable quality.

Examples of Toilet and Wastewater Treatment System Designs

Figure 2A:
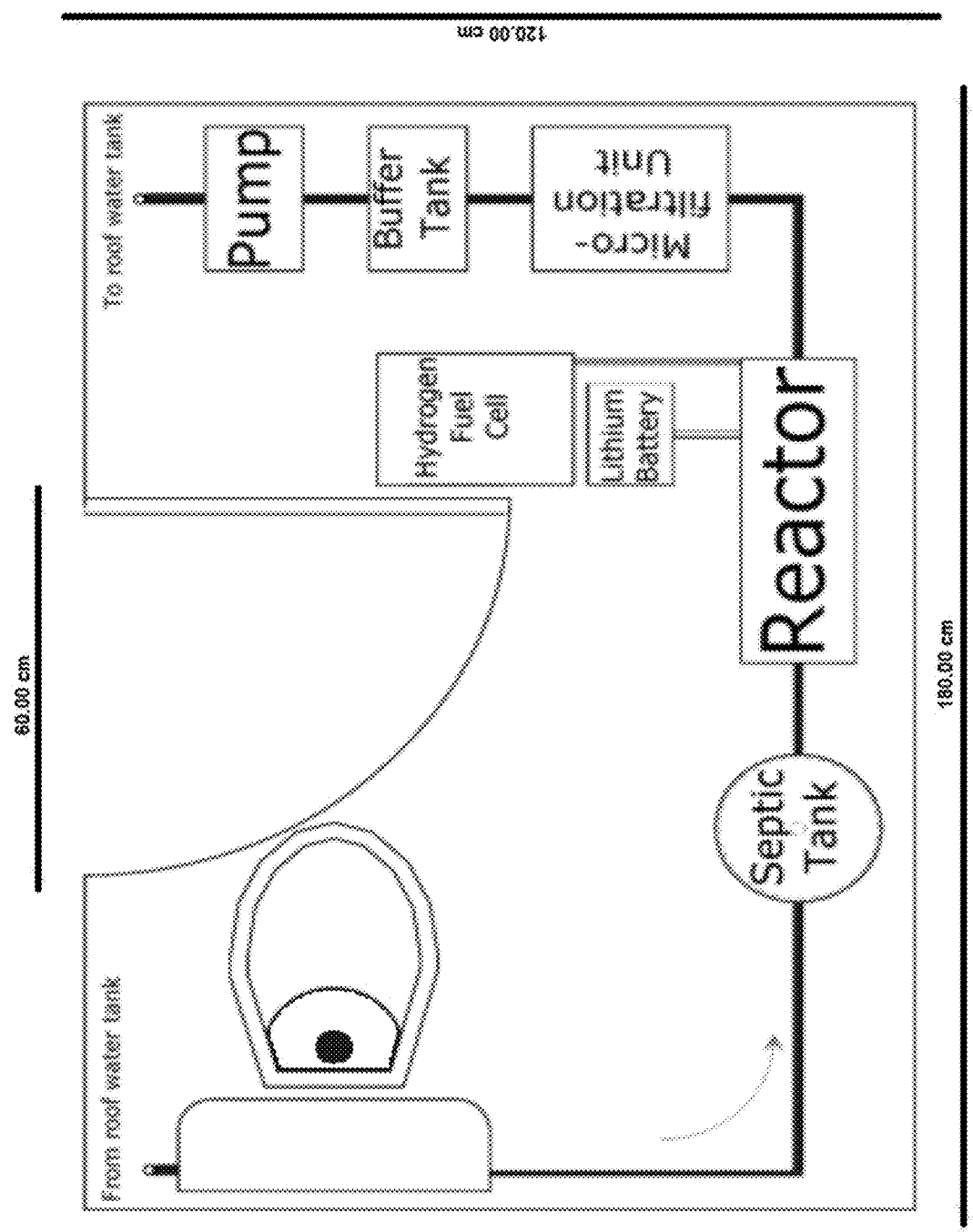
FIG. 2A is a diagram showing the floor plan for one embodiment showing the various treatment units and devices linked in sequence.

FIG. 2A is a diagram showing the floor plan for one embodiment of a toilet and wastewater treatment system showing the various treatment units and devices linked in sequence.

Figure 2B:
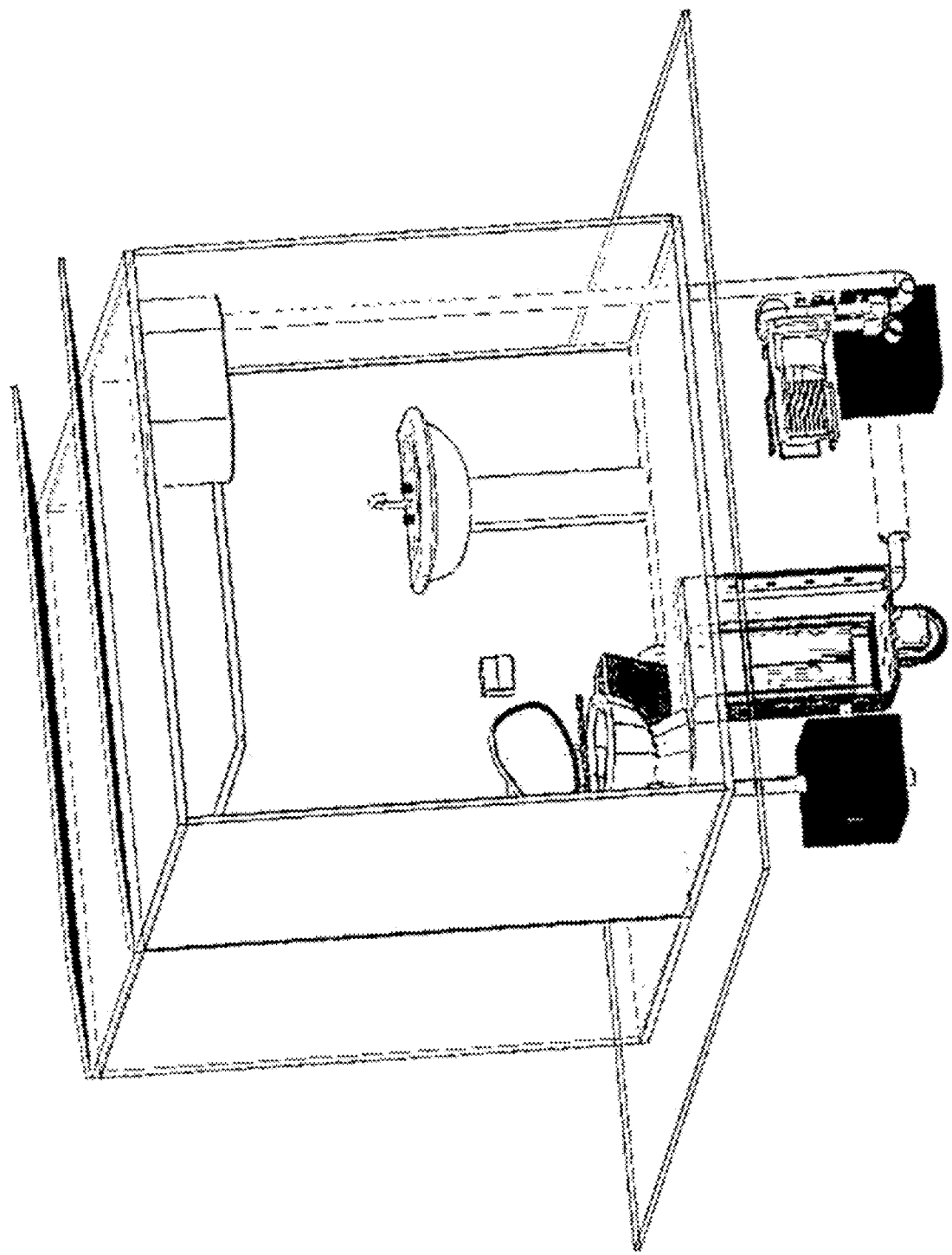
FIG. 2B is a diagram showing a three-dimensional view of one embodiment of a toilet facility where the treatment system is placed below ground level and the treated water is pumped back to the flush-water holding tank on the ceiling of a water closet.

FIG. 2B is a diagram showing a three-dimensional view of one embodiment of a toilet facility where the treatment system is placed below ground level and the treated water is pumped back to the flush-water holding tank on the ceiling of a water closet.

As illustrated in FIG. 3A, FIG. 3B, FIG. 3C, FIG. 4A and FIG. 4B, various other configurations can be used in providing a human waste treatment system according to principles of the invention.

Figure 3A:
FIG. 3A is an image of a shipping container that has been modified to accommodate the toilet and wastewater systems of the present invention.

FIG. 3A is an image of a shipping container that has been modified to accommodate the toilet and wastewater systems of the present invention. Also illustrated are a man and a woman so as to provide a scale for the embodiment.

Figure 3B:
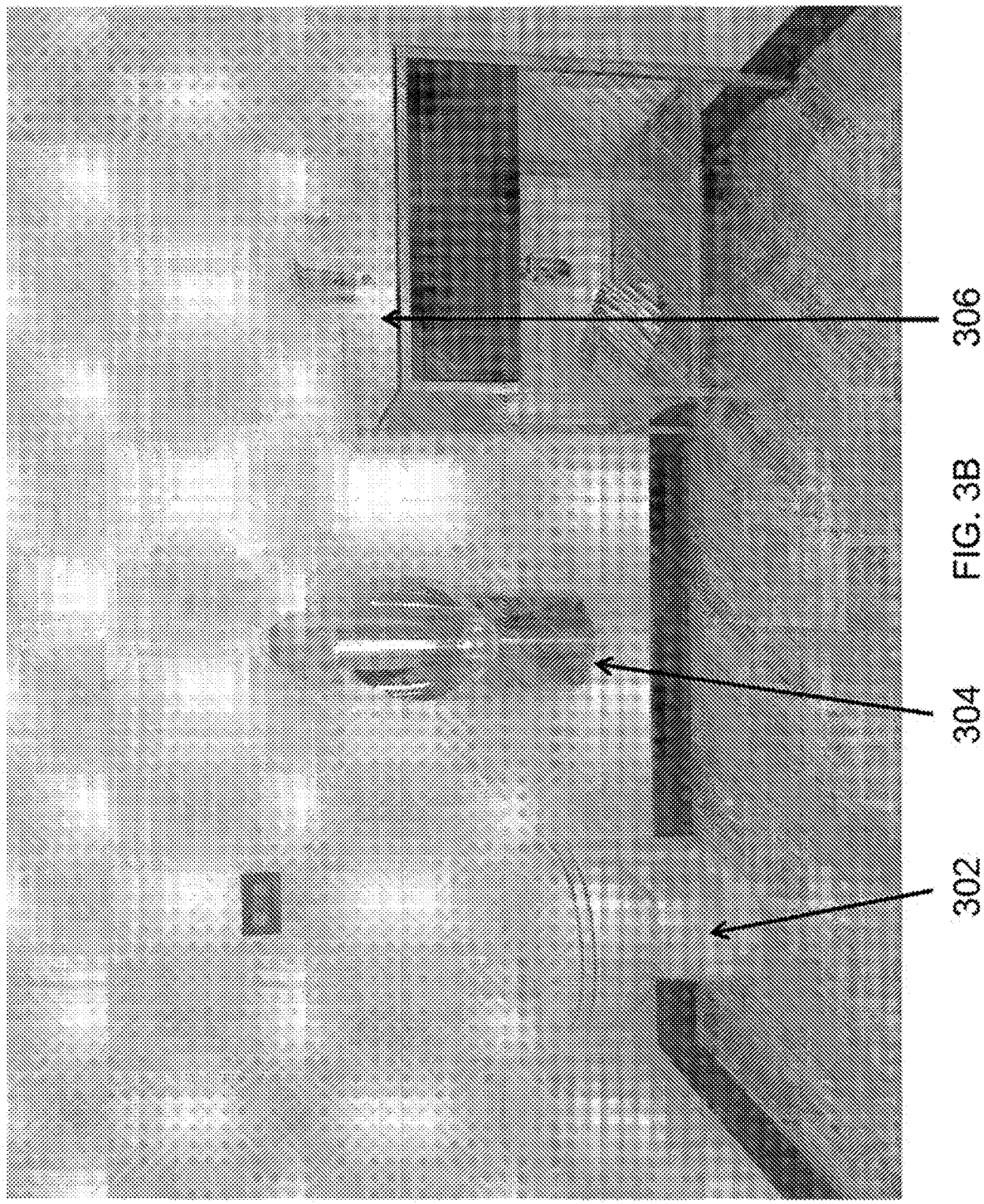
FIG. 3B is an image of an interior compartment of the shipping container sowing a toilet, a urinal and a sink.
Figure 4A:
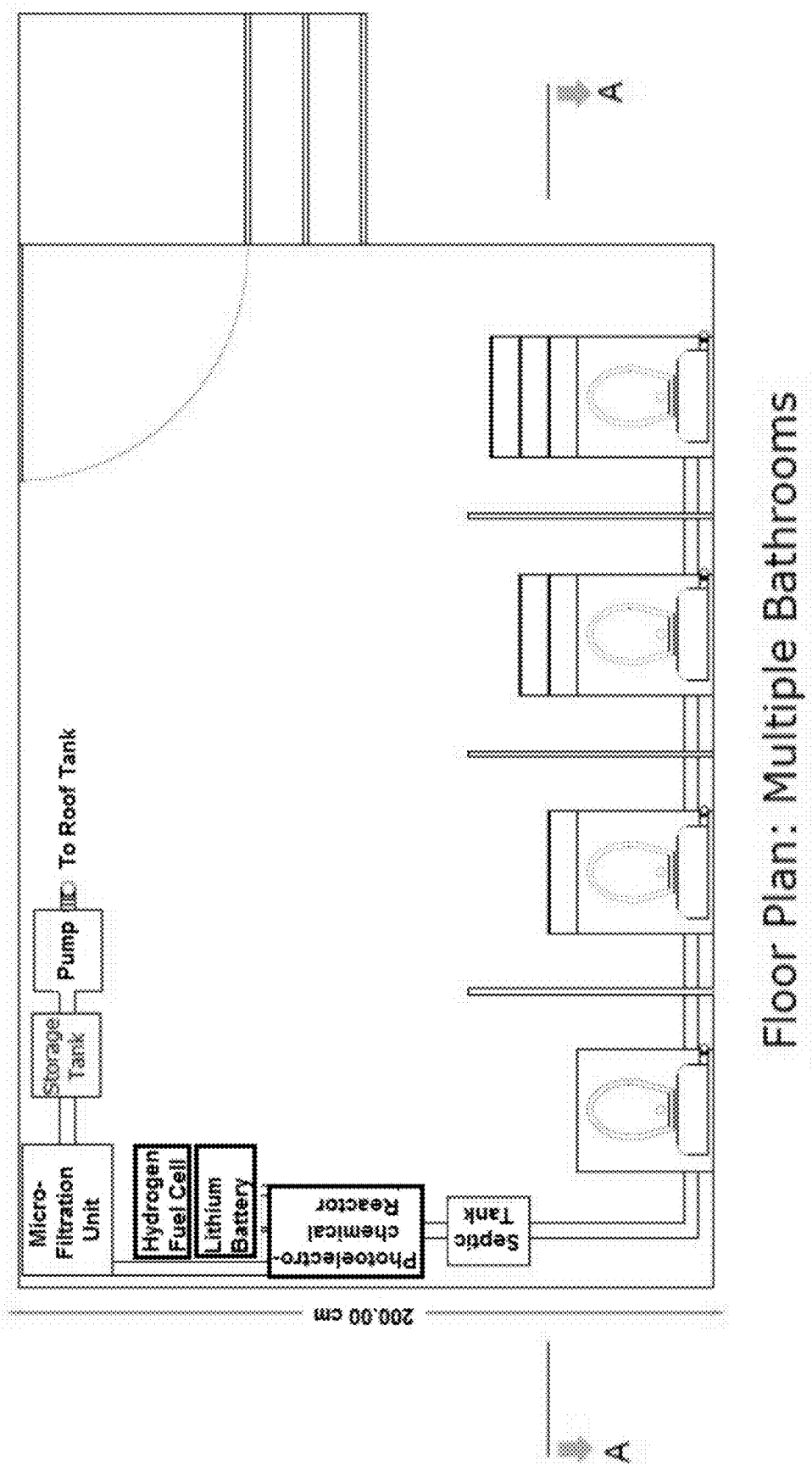
FIG. 4A is a floor plan of a four person community toilet.

FIG. 3B is an image of an interior compartment of the shipping container sowing a toilet 302, a urinal 304 and a sink 306.

FIG. 3C is another view of the shipping container, showing photovoltaic solar cells 308 situated on the top surface (effectively the roof) of the shipping container, and showing windows 310 in the rear wall of each compartment.

While the embodiment illustrated in FIG. 3A, FIG. 3B and FIG. 3C has been constructed in a shipping container, such as a 30 foot long container used to ship goods at sea, it is equally possible to use other structures that can be prefabricated and transported to the intended locations, such as structures built on a truck trailer, structures such as individual port-a-potties, or structures such as prefabricated housing units in which the rooms are only designed for toilet use, for bathing, for laundry use or for other uses that generate wastewater.

We now turn to a more detailed description of the components of the system, and to the description of results obtained in operating the system.

Electrochemical Reactor

Figure 5A:
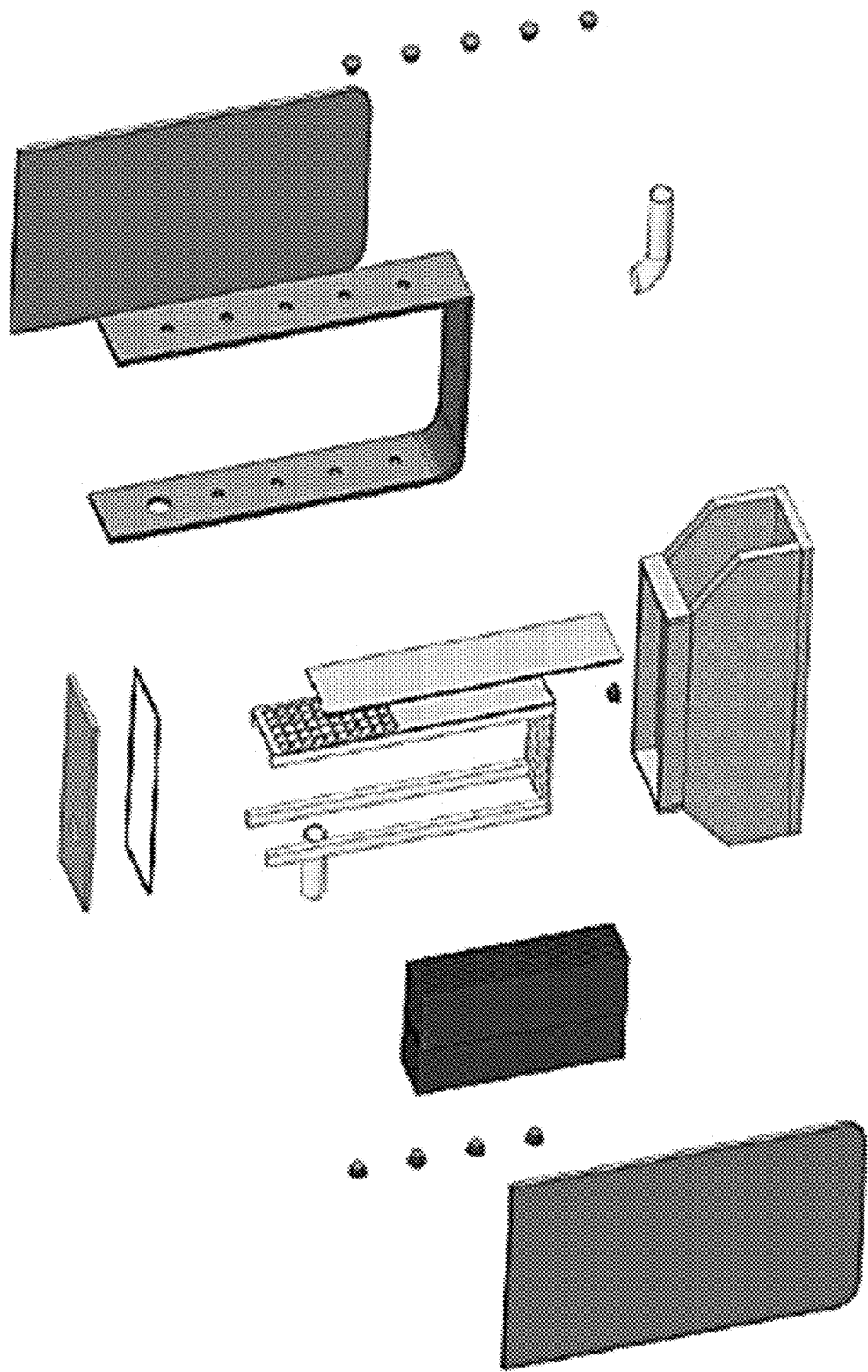
FIG. 5A is a diagram that shows a component level 40 liter reactor design in an exploded view.
Figures 5B, 5C:
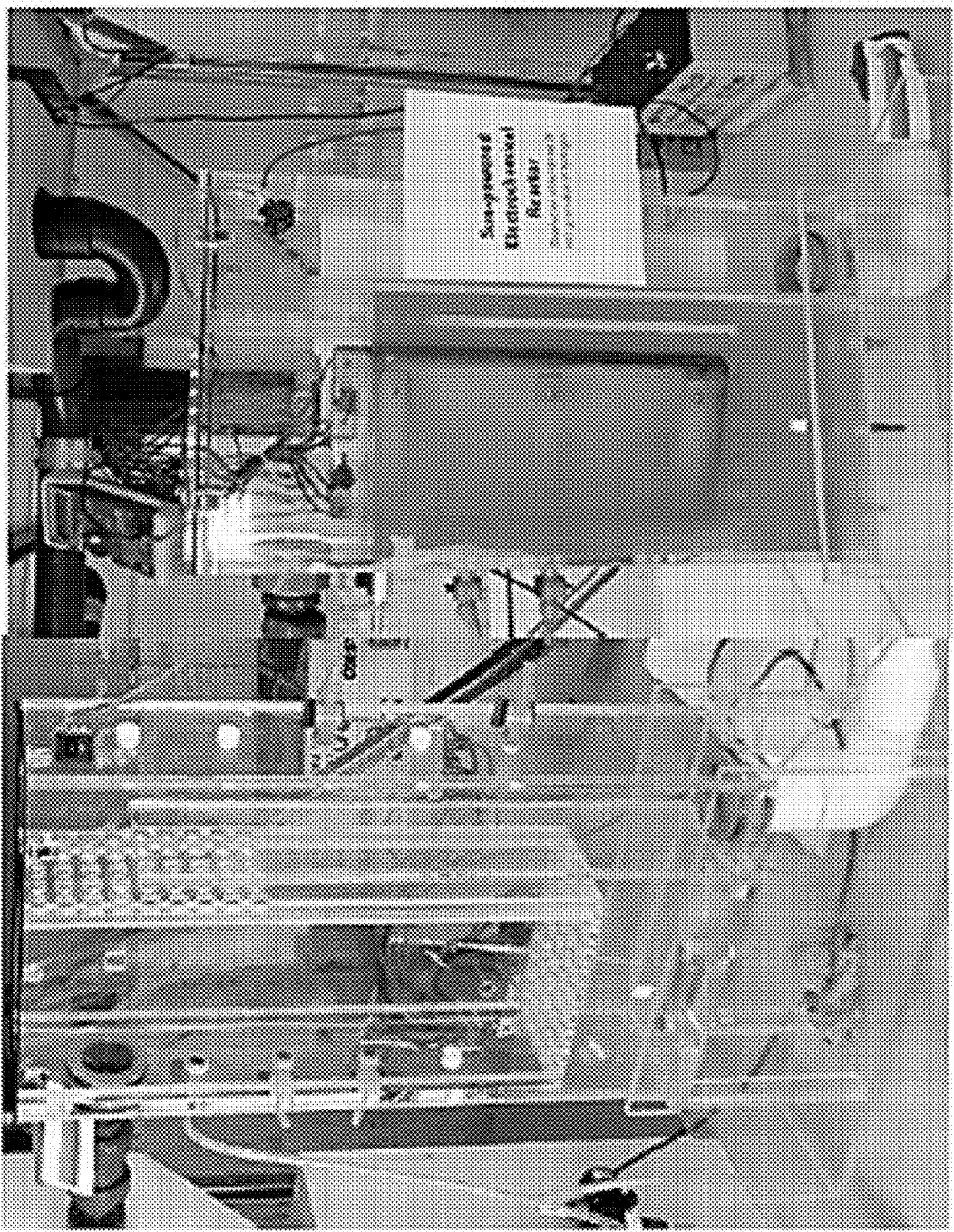
FIG. 5B is a diagram that shows the 40 liter reactor design when empty.
FIG. 5C is a diagram that shows the 40 liter reactor design when filled with wastewater and equipped with the 5-anode/6 cathode electrode array.

FIG. 5A, FIG. 5B and FIG. 5C show features of a chemical reactor that is useful in performing the photovoltaic-powered wastewater electrolysis that operates in the present system. FIG. 5A is a diagram that shows a 40 liter reactor design in an exploded view. The reactor employs stainless steel cathodes and B-doped $TiO_2$ anodes in an interleaved configuration. FIG. 5B is a diagram that shows the 40 liter reactor design when empty. FIG. 5C is a diagram that shows the 40 liter reactor design when filled with wastewater and equipped with the 5-anode/6 cathode electrode array. The reactor has an inlet situated in a bottom surface to allow liquid waste to be introduced into the cell, and an outlet for removal of treated liquids situated on a side of the cell. An outlet to convey generated $H_2$ away from the cell is situated in the top surface.

The flow regime in the reactor has been modeled. The internal-mixing fluid flow models are based on solving the Navier-Stokes Equation for 3D flow trajectories and streamlines in the 40 L reactor that trace either particles or small packets of fluid as they move through the reactor due to continuous flow of wastewater in and out of the reactor. Numerical analyses can be used to improve the design. We want to minimize the broadness of the distribution of the residence-time distribution and thus minimize short-circuiting flow out of the reactor with minimal treatment. This analysis can help to optimize the contact time of the wastewater particles and soluble components with the reactive electrode surfaces.

Figure 6C:
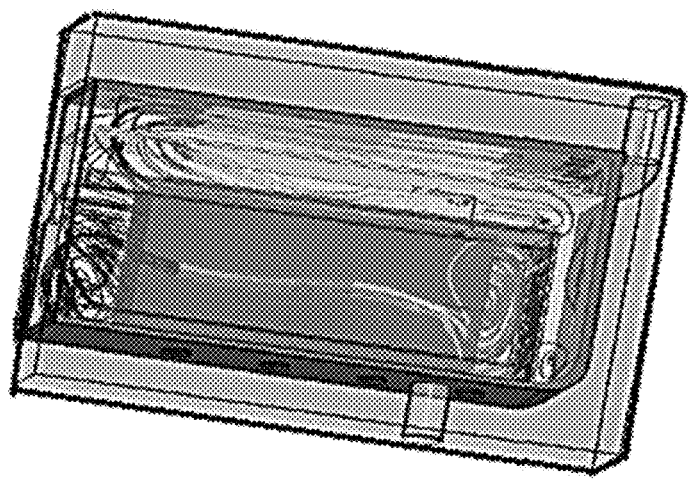
FIG. 6C is a diagram that shows a rear view of the results of numerical analyses simulating the flow characteristics in the 40 L reactor as set up in FIG. 6B.
Figure 6B:
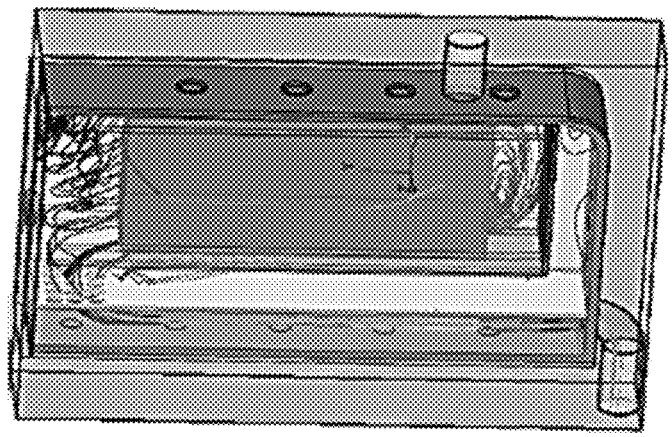
FIG. 6B is a diagram that shows a front view of the results of numerical analyses simulating the flow characteristics in the 40 L reactor when the outlet location is changed from that in FIG. 6A.
Figure 6A:
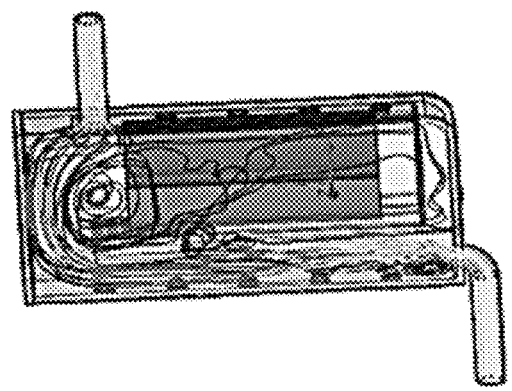
FIG. 6A is a diagram that shows the results of numerical analyses simulating the flow characteristics in the 40 L reactor.

FIG. 6A is a diagram that shows the results of numerical analyses simulating the flow characteristics in the 40 L reactor. In FIG. 6A, the inlet for liquid waste is situated in the bottom surface of the reactor and the outlet is situated on the side of the reactor close to the top. FIG. 6B is a diagram that shows a front view of the results of numerical analyses simulating the flow characteristics in the 40 L reactor when the outlet location is changed from that in FIG. 6A, namely when the outlet is located at a position lower on the side of the reactor than that in FIG. 6A. FIG. 6C is a diagram that shows a rear view of the results of numerical analyses simulating the flow characteristics in the 40 L reactor as set up in FIG. 6B.

The reactor would have limited treatment efficiency if used as a flow reactor. When the reactor is running full with the pump on (See FIG. 1B in which the inlet is at the top left of the reactor and the outlet is at the bottom right), an increase of volume $V_1$ by the inlet in the septic tank will increase the amount of liquids in the electrochemical reactor. This will induce a flush out of volume $V_1$ from the top part of the reactor (interface air-liquid) through the porous wall. Even if the pump is off when $V_1$ is added to the reactor, a non-negligible amount of contaminated water will be flushed out directly without being treated.

The location of the inlet and outlet flow can be changed to improve overall reactor performance. For example, by including rounded corners in the design, one can achieve improved mixing, fluid flow characteristics, and increase the contact time with the electrode surfaces.

Another improvement to the flow is to displace the reactor inlet to the bottom of the reactor. Thus, when a person uses the toilet the pump can be turned off for a few minutes by a switch timer. In this case $V_i$ will arrive by the bottom of the reactor and will not be mixed with the treated liquid next to the surface. So a clean volume $V_1$ of treated water is flushed out of the reactor without being in contact with the waste from the septic tank.

An improvement that has been implemented but that is not present in the flow simulations and 3-dimensional models involves placing the output of the pump at the top of the reactor. This improves the mixing and a low-energy consumption pump (12 V, 1.2 Amps vs. 110 V, 1.65 Amps) can be used.

Figure 7:
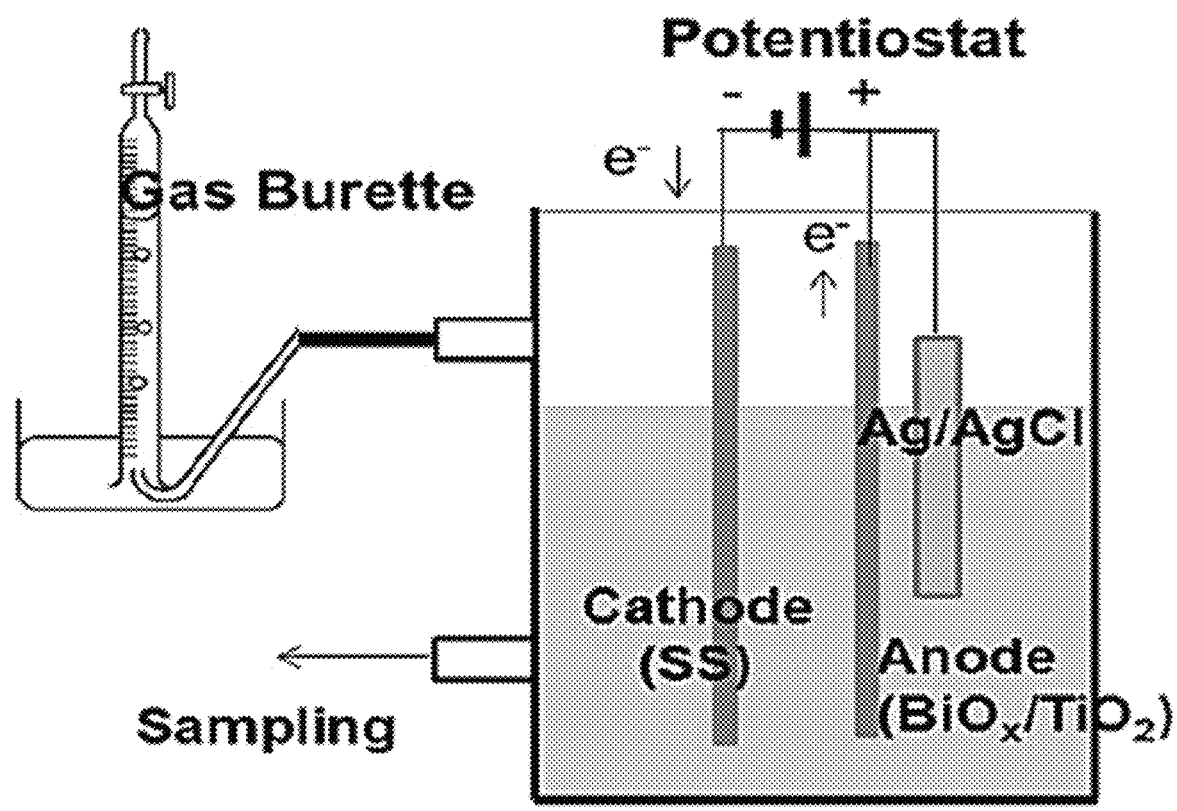
FIG. 7 is a schematic diagram of one embodiment of an electrochemical cell used in bench scale testing.

FIG. 7 is a schematic diagram of one embodiment of an electrochemical cell used in bench scale testing. The electrochemical cell of FIG. 7 has an enclosure that contains the waste water to be treated. The electrodes used include a stainless steel cathode and an anode having layers of $BiO_x$—$TiO_2$ on Ti metal. The cell is operated with a potentiostat and an Ag/AgCl (silver chloride) reference electrode. In the electrochemical cell system, the electrochemical oxidation of organic contaminants takes place at the anodes while reduction simultaneously takes place at the cathodes. Electron transfer from the cathodes to water or protons results in hydrogen production. The electrochemical cell of FIG. 7 includes a port that allows the fluid in the cell to be sampled for chemical analysis. A gas burette is hermetically connected to the cell at a location above the level of the wastewater to allow generated gas to be collected and analyzed. In operation, the gas collected is hydrogen. In the present work, we have demonstrated the complete oxidation of a variety of chemical contaminants in water with the simultaneous production of hydrogen.

Both conventional power sources and direct photovoltaic power have been used to drive the various electrochemical reactions. An advantage that is gained with semiconductor electrodes as compared to conventional metal electrodes (i.e., anodes) is due to the direct production of reaction species such as hydroxyl radical at the surface of the semiconductors. The formation of hydroxyl radical is the first step in the oxidation of water to oxygen. In addition, the oxidation of hydroxyl radical in the second oxidative step produced hydrogen peroxide, which is also a powerful oxidizing agent that can decontaminate wastewater.

Table 1 lists the constituents of domestic wastewater.

TABLE 1

| Constituent | Average | COV (%) |
|---|---|---|
| pH | 6.6~7.3 | — |
| COD (mg/L) | 180.3 | 6.02 |
| SCOD (mg/L) | 99.4 | — |
| TN (mM N) | 2.594 | 7.96 |
| $NH_4^+$ (mM) | 1.910 | 5.19 |
| $NO_3^-$ (mM) | <0.01 | — |
| $Cl^-$ (mM) | 3.880 | — |
| $ClO_3^-$ (mM) | <0.01 | — |
| Organic Acids (mM) | <0.01 | — |
| Mg (mM) | 0.6387 | 1.96 |
| Ca (mM) | 1.287 | 1.38 |
| Protein (mg/L) | 70.55 | 34.3 |
| Carbohydrate (mg/L) | 29.47 | 52.1 |

Table 2 lists a number of analytic methods for various targets.

TABLE 2

| | Target | Methods |
|---|---|---|
| C | COD | Chromic Acid Digestion (Hach, USA) |
| | Organic Acid (Formate, Oxalate, Acetate) | Ion Chromatography (IC, DIONEX, USA) |
| | Protein | Lowry Method |
| | Carbohydrate | Phenol-Sulfuric Acid Method |
| N | $NH_4^+$, $NO_2^-$, $NO_3^-$ | IC |
| | Total Nitrogen (TN) | Persulfate Digestion (Hach, USA) |
| Cl | $Cl^-$, $ClO_3^-$ | IC |
| | Total Chlorine | DPD Method (Hach, USA) |

Table 3 lists a number of electrolyte compositions that have been examined.

TABLE 3

| Electrolyte | Conductivity mS/cm | pH |
|---|---|---|
| 40 mM Urea + 50 mM $Cl^-$ | 5.58 | 7.59 |
| WW | 1.08 | 6.56 |
| WW + 10 mM $Cl^-$ | 2.22 | 7.19 |
| WW + 30 mM $Cl^-$ | 4.33 | 7.26 |
| WW + 50 mM $Cl^-$ | 6.33 | 7.23 |

Figure 34A:
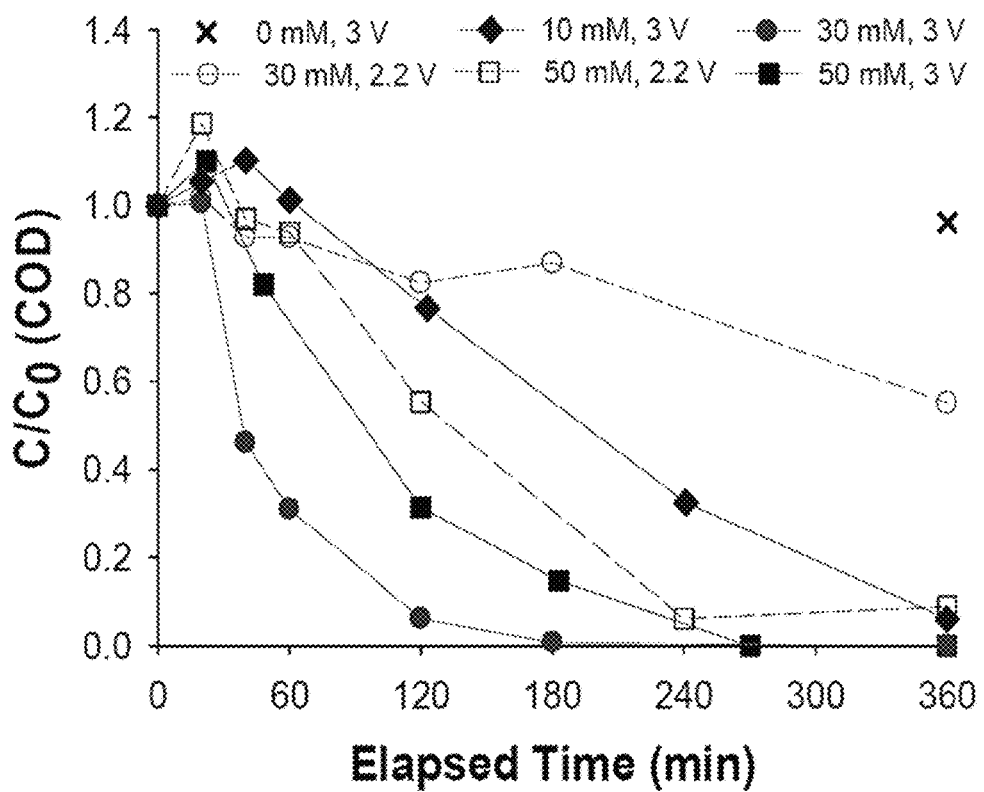
FIG. 34A is a graph of chemical oxidation demand (COD) in mixed urine and wastewater samples over 360 minutes of processing under varying chloride concentration and applied voltages using apparatus and methods according to principles of the invention.
Figures 34B, 34C, 34D, 34E, 34F, 34G:
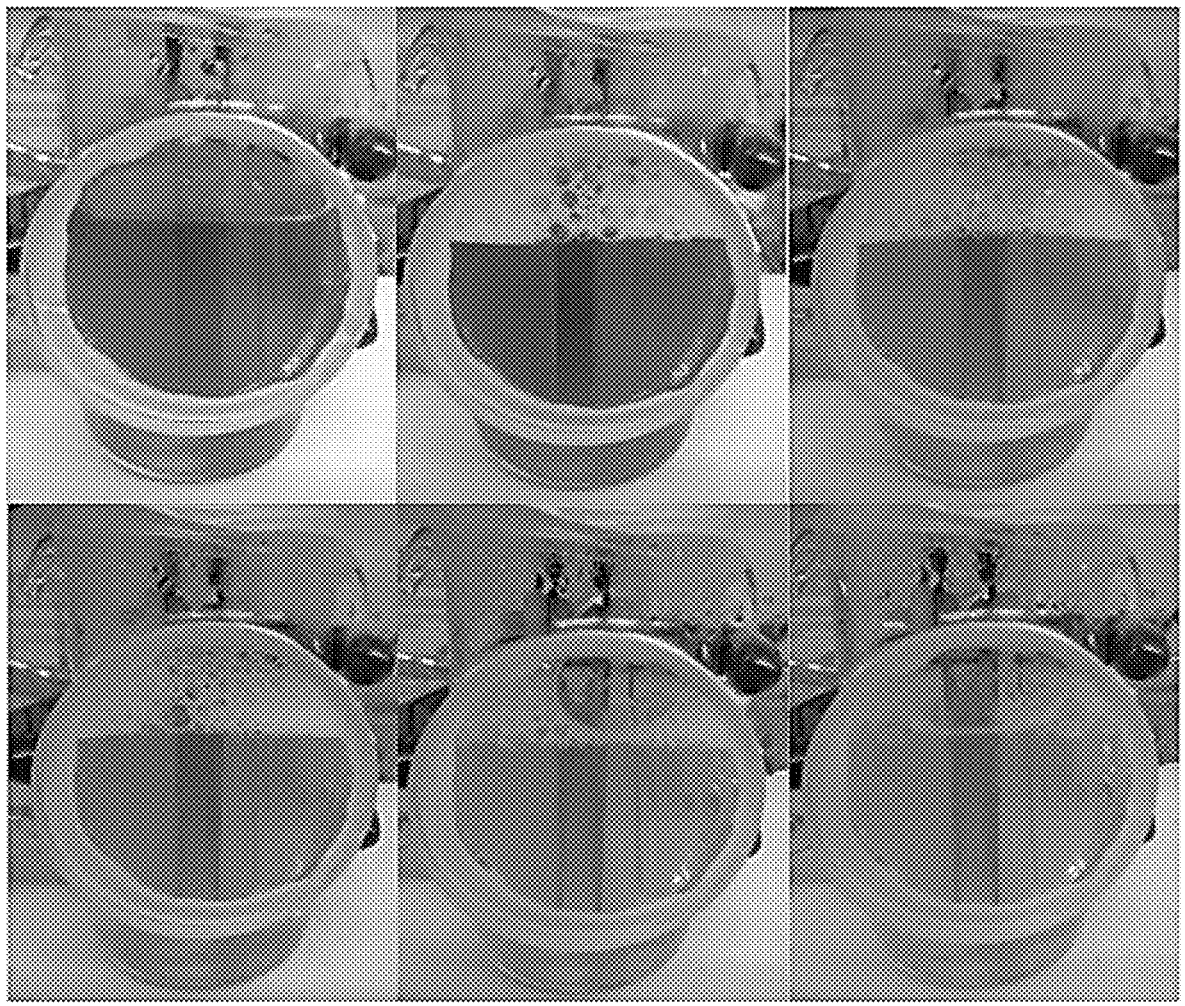
FIG. 34B through FIG. 34G is a series of images showing the optical appearance of the liquid as time passes.
Figure 35:
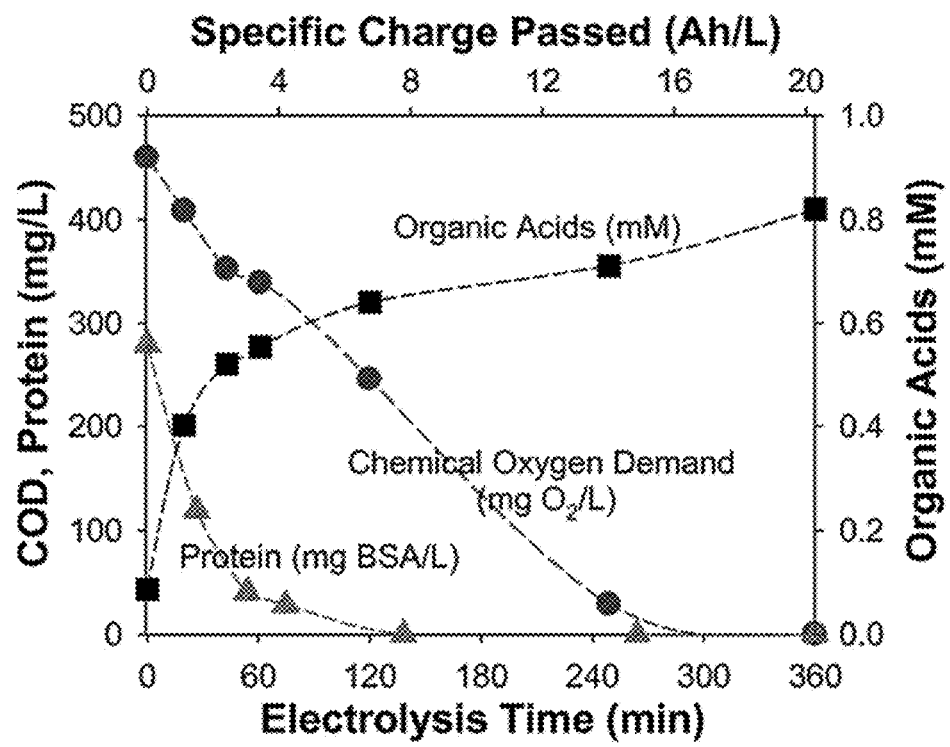
FIG. 35 shows the time evolution of organic acids, COD and proteins in simulated septic tank effluent which includes both domestic wastewater and urine.

Table 4 lists a number of operating conditions that have been used, which correspond to the data shown in FIG. 34A. The operation with 30 mM added chloride at 3V, NHE applied potential gave the highest current/power/space-time efficiency of operation.

TABLE 4

| Symbol | $[Cl^-]_{add}$ (mM) | $E_{apply}$ (V, NHE) | $E_{tot}$ (V) | J (A/m$^2$) |
|---|---|---|---|---|
| ▲ | 0 | 3 | 6.3 | 81.5 |
| ◆ | 10 | 3 | 5.6 | 122 |
| ○ | 30 | 2.2 | 4.0 | 74.1 |
| ● | 30 | 3 | 5.9 | 206 |
| □ | 50 | 2.2 | 3.9 | 88.9 |
| ■ | 50 | 3 | 5.4 | 328 |

Electrode Systems

Multi-layered $BiO_x$—$TiO_2$ electrodes can be used either for pure water splitting or for the oxidation of chemical contaminants coupled with the production of $H_2$ characterized by a synergistic enhancement. The metal-supported nanoparticle electrodes are composed of a mixed-metal oxide array involving an under layer of $TaO_x$—$IrO_x$, followed by a middle layer of $BiO_x$—$SnO_2$, and top layer of $BiO_x$—$TiO_2$ deposited in series on both sides of Ti foil. The layer thicknesses are approximately 6.5, 1.5, and 2 μm, respectively. Cyclic voltammograms show that the mixed-metal oxide $BiO_x$—$TiO_2$ has an electrocatalytic activity for oxidation of phenol in water that is enhanced by 70% under illumination with AM 1.5 light. When the $BiO_x$—$TiO_2$ anode is coupled with a stainless steel cathode in a sodium chloride electrolyte solution with phenol and irradiated with light (λ>320 nm) at an applied DC voltage, the anodic phenol oxidation rate and the cathodic $H_2$ production rates were enhanced by factors greater than four and three, respectively, as compared to the sum of each light irradiation and direct DC electrolysis. The observed synergistic effects depend on the specific electrode composition and decrease on $TaO_x$—$IrO_x$ and $BiO_x$—$TiO_2$ anodes in the absence of a top layer of $BiO_x$—$TiO_2$. These results indicate that the $BiO_x$—$TiO_2$ layer functions as an important photo-electro-catalyst. The heavy doping level of Bi (i.e., 25 mol %) in $TiO_2$ increases the electron conductivity of the parent $TiO_2$. In addition, direct illumination of the $BiO_x$—$TiO_2$ with UV-visible light at λ>320 nm generates light-induced hole-electron pairs, which further increase the measured electrical conductivity.

The composite semiconductor anodes are coupled with stainless steel (SS, Hastelloy C-22) cathodes. The anodes are prepared using sequential coating of a series of metal oxides on titanium metal plates: The anode support substrate is Ti metal which is then coated with an anti-passivation layer consisting of a mixture of $IrO_2$ and $Ta_2O_5$. After high temperature annealing an intermediated layer (i.e., sealing coat) of $SnO_2$ and $Bi_2O_3$ is deposited on the $Ti/IrO_2/Ta_2O_5$ matrix and subsequently annealed. The $SnO_2/Bi_2O_3$ layer further coated (an undercoat) with a suspension of nanoparticles of $TiO_2$ that are selectively doped with bismuth (Bi). The final top coating (an overcoat) employs a mixture of nano-particulate $TiO_2$ and $Bi_2O_3$. The undercoating layer and over-coating layers together form the electro-catalytically active outer layer of the anode and each coating step requires a specific heat treatment at different temperatures and time durations of the annealing process.

In one embodiment, a Ti foil (0.5 mm thick) was cleansed with SiC paper and coated with a sequence of layer substrates. The most bottom layer coat (first coat) containing Ir and Ta at a mole ratio of Ir:Ta=0.73:0.27 was deposited to the Ti base and sealed with $BiO_x$—$SnO_2$ mixed oxide at a mole ratio of Bi:Sn=0.1:0.9 (second coat). Then $BiO_x$—$TiO_2$ of a mole ratio of Bi:Ti=0.04:0.96 were deposited as the third coat; finally $BiO_x$—$TiO_2$ oxide layers at different mole ratios of Bi:Ti were coated (fourth coat). Each successive step of coating requires a specific heat treatment regime at different temperatures and durations (525° C. for 1 h, 425° C. for 10 min, 250° C. for 5 h, and 425° C. for 5 h for the first, second, third, and fourth coats, respectively).

Figures 8A, 8B, 8C, 8D, 8E, 8F:
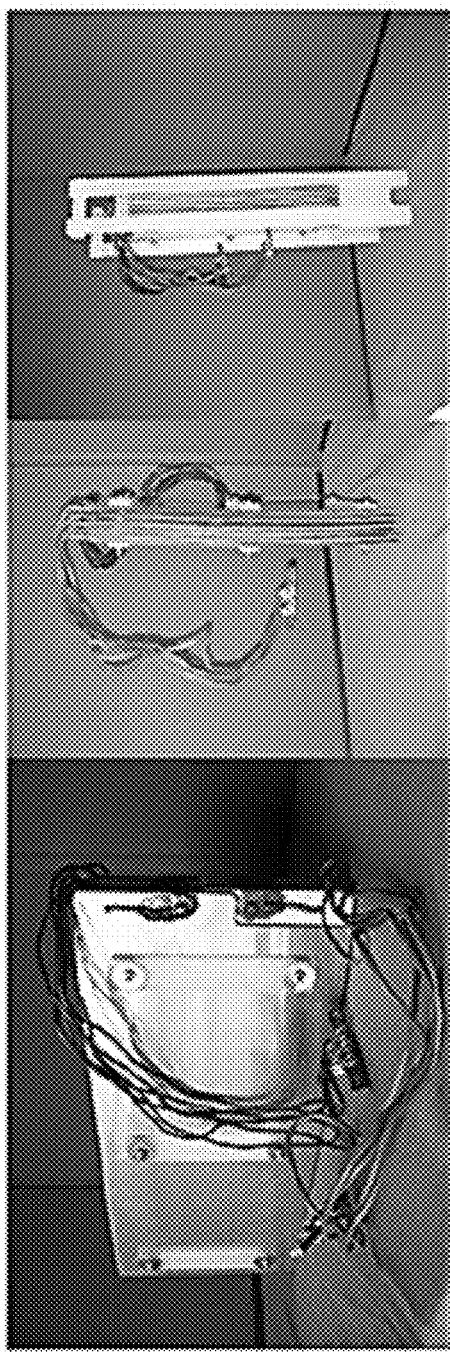
FIG. 8A, FIG. 8B and FIG. 8C are images of a 5-anode 6-cathode array of electrodes.
FIG. 8D is an image of a bench-top scale sandwich electrode combination of two cathodes and one doubly-side semiconductor coated array in disassembled form.
FIG. 8E is an image of a doubly-coated large electrode anode separated from the sandwich cathodes.
FIG. 8F is an image of the electrode array in side view.

FIG. 8A, FIG. 8B and FIG. 8C are images of a 5-anode 6-cathode array of electrodes.

FIG. 8D is an image of a bench-top scale sandwich electrode combination of two cathodes and one doubly-side semiconductor coated array in disassembled form.

FIG. 8E is an image of a doubly-coated large electrode anode separated from the sandwich cathodes.

FIG. 8F is an image of the electrode array in side view.

A second electrode array has been used in further studies. This array has 10 semiconductor coated anodes and 11 stainless steel cathodes. This array has been designed to fit larger volume reactors. The anode substrates were sequentially-coated by silk-screening to deposit a thin film of each semiconductor in sequence as described above. The average particle size of semiconductor particles is 15 nm or less.

Figures 9A, 9B, 9C:
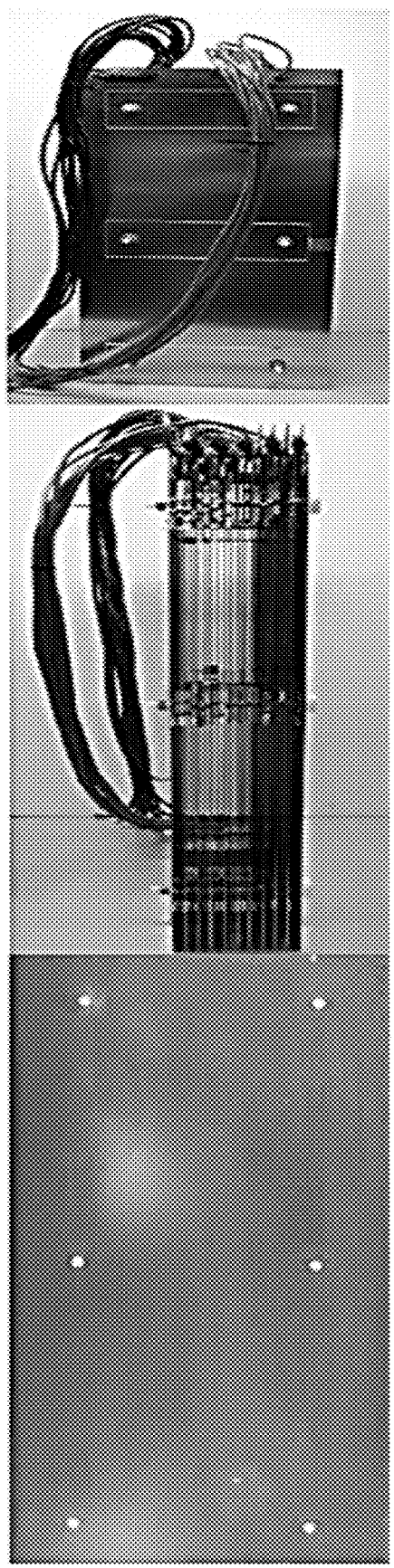

FIG. 9A is an image of a single Ti metal plate coated on both sides with a series of semiconductors with a top layer of $BiOx$-$TiO_2$ with an average particle size of 15 nm.

FIG. 9B is an image of a 10-anode/11 cathode array viewed edge-on.

FIG. 9C is an image of the array viewed on in perspective.

Figure 10:
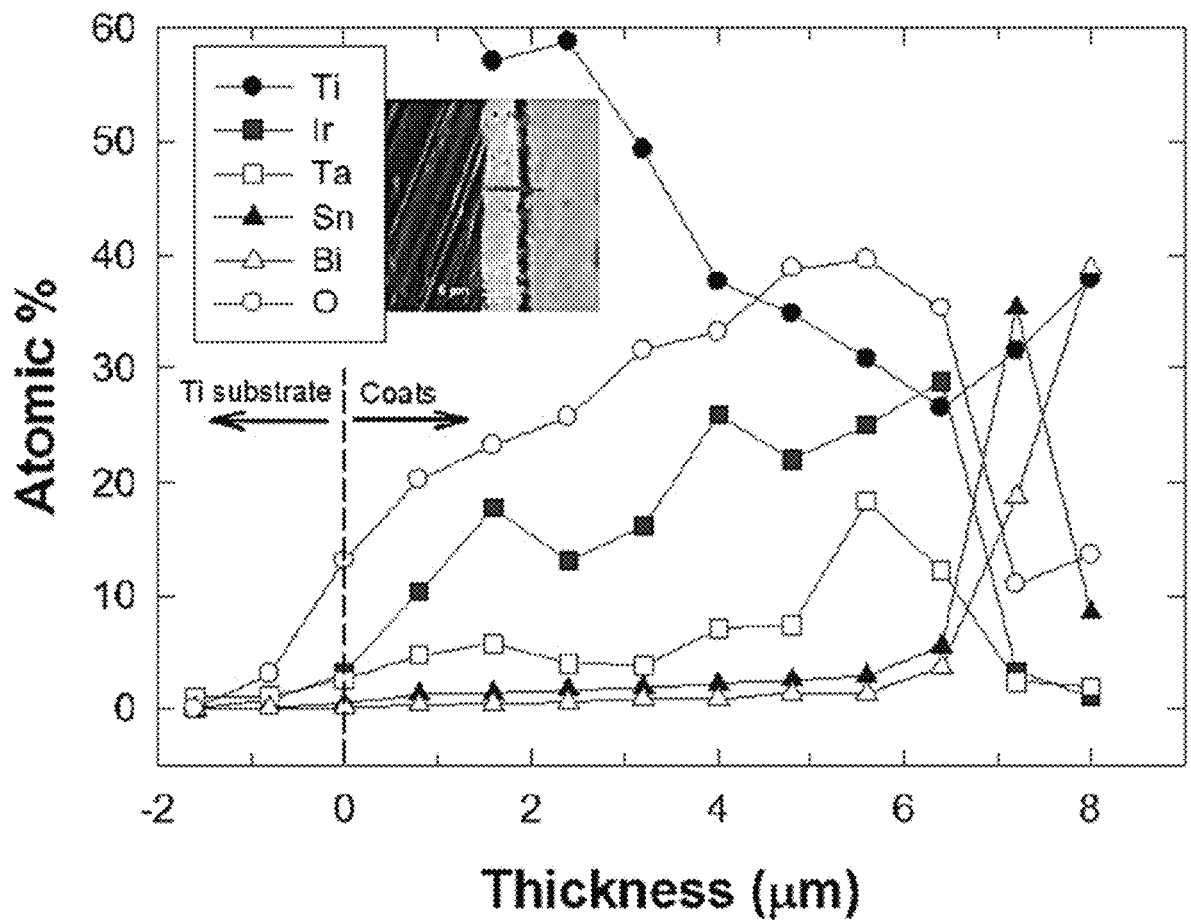
FIG. 10A is a chemical element profile as a function of depth of a single semiconductor coated electrode as shown in FIG. 8E.
FIG. 10B is a schematic representation of the sequential coating procedure including the mole ratios of each layer, the number of the deposited layer, the temperature and time of annealing for each layer in an anode prepared using a sequential coating of a series of metal oxides on a titanium metal plate.
FIG. 10C is a diagram showing the wiring sequence for a 5-anode 6-cathode array.

FIG. 10A is a chemical element profile as a function of depth of a single semiconductor coated electrode as shown in FIG. 8E. The Ti substrate constitutes 100% of the elemental composition at ~2.0 μm into the titanium substrate. The concentration of the other elements changes as the coating depth is probed outward to the actual electrode-water interface. The depth profiling was determined using a depth-probing nano-SIMS electron microscopy.

FIG. 10B is a schematic representation of the sequential coating procedure including the mole ratios of each layer, the number of deposited layer, the temperature and time of annealing for each layer in an anode prepared using a sequential coating of a series of metal oxides on a titanium metal plate.

FIG. 10C is a diagram showing the wiring sequence for a 5-anode 6-cathode array. The resulting anodes have been shown to have excellent stability and a long service life. The surface area of each electrode plate is 800 $cm^2$; the 20 L prototype pilot-scale reactor comprises 5 anodes and 6 cathodes that face each other at an inter-electrode distance of 2 mm.

Quantitative elemental micro-analyses were conducted with the JEOL 8200 electron microprobe operated at 15 kV and 10 nA in a focused beam mode using the Probe for Windows software. X-ray photoelectron microscopy (XPS) analysis was made in an M-probe surface spectrometer (VG Instruments) using monochromatic Al K-α X-rays (1486.6 eV). Scanning electron microscopy (SEM) measurements were performed by a field emission scanning electron microscope (Hitachi, S-4800) at an operating voltage of 3 kV. UV-Vis diffuse reflectance absorption spectra of electrode samples were recorded with respect to a $BaSO_4$ pellet or pure Ti foil (uncoated) with UV-visible absorption spectrometer (Shimadzu-2450).

Cyclic voltammograms of $BiO_x$—$TiO_2$ electrode were obtained with a potentiostat (Versastat 3-400) that was connected to saturated calomel electrode (SCE, reference electrode) and Pt-gauze (counter electrode) in 0.1 M NaCl with or without 1 mM phenol. For illumination of the $BiO_x$—$TiO_2$ electrode, a 150-W Xe-Arc lamp (Ushio 150-MO) equipped with AM 1.5 air mass filter was employed. Phenol and its reaction intermediates were analyzed by a high performance liquid chromatography (HPLC, Agilent 1100 series) using a C18 column for separation. The eluent was composed of 55% Milli-Q water (0.1 wt % acetic acid) and 45% acetonitrile at flow rate of 0.7 mL/min. The amount of $H_2$ evolved during photolysis was analyzed by GC/TCD (HP 5890, $N_2$ carrier) with a molecular sieve column (30 m×0.32 mm×12.00 um).

Figure 11A:
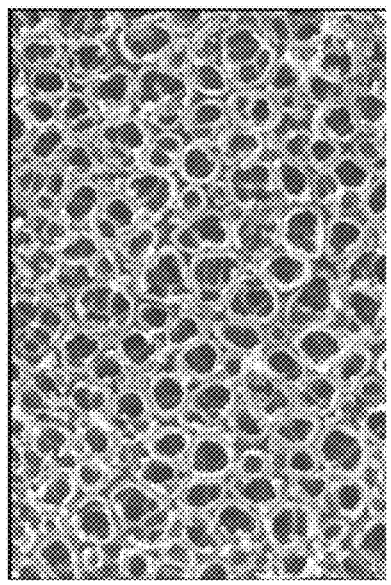
Figure 11B:
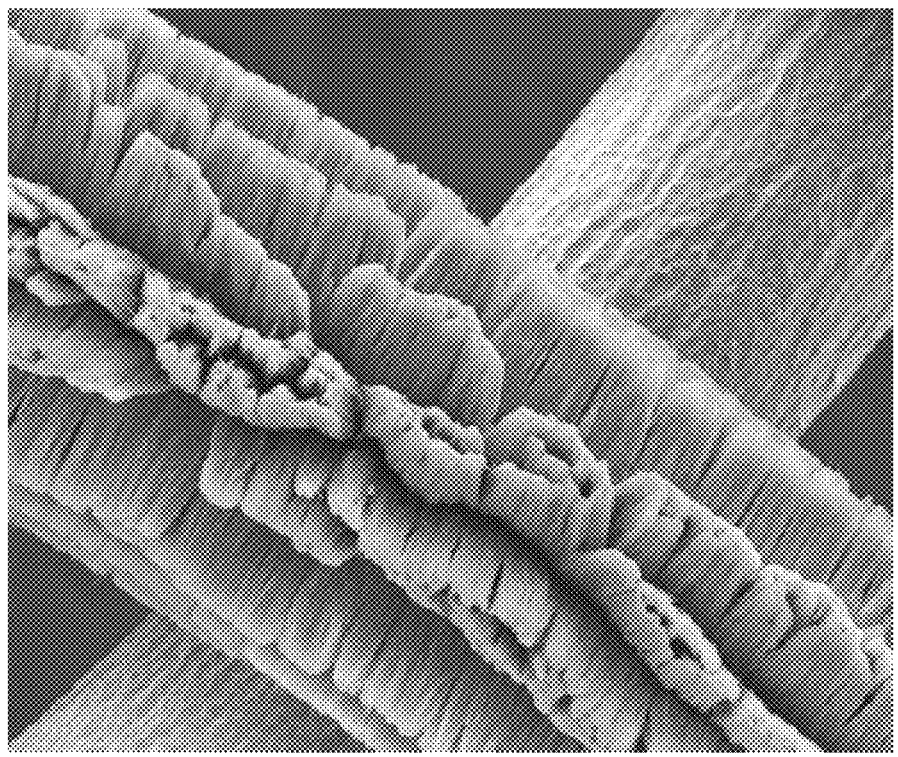
Figure 11C:
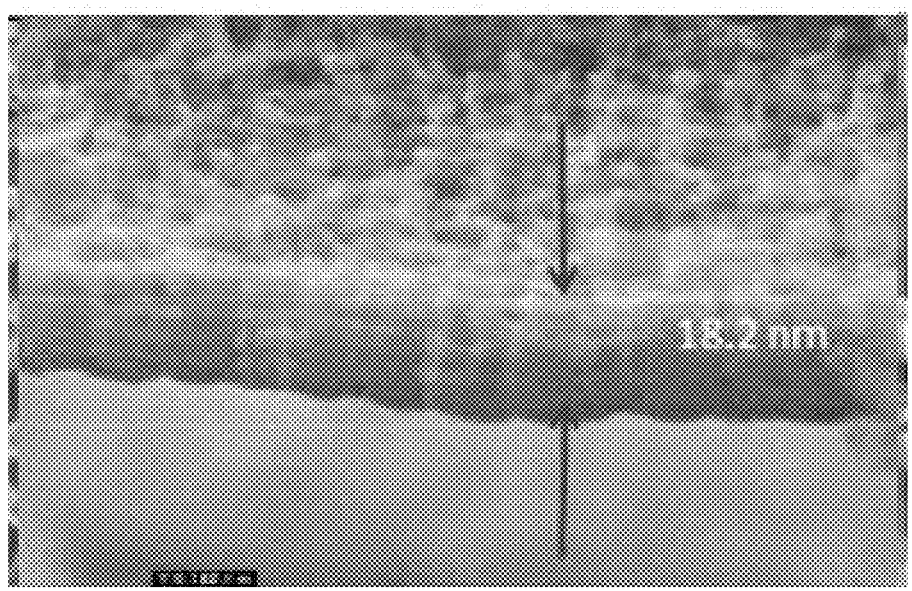

We have developed smaller-scale electrodes grown by high potential oxidation to Ti metal plates and Ti metal mesh. Two examples are shown in FIG. 11A and FIG. 11B. FIG. 11A is an image of $TiO_2$ nanotube anodes grown directly from Ti metal. FIG. 11B is an image of $TiO_2$ nanowires grown on Ti wire mesh. FIG. 11C is an image showing a nanowire with a diameter of 18.2 nm (defined by the distance between the arrows). It is expected that an array of semiconductor nanotubes or nanowires will increase the total reactive surface area for direct contact of the waste components to be oxidized and thus increase overall conversion and reactor efficiency.

We have seen improved reactivity in specific cases when we substitute brass, bronze, copper or other metals for stainless steel. However, the long term stability of these metals has yet to be evaluated.

Electrode Composition/Electrochemistry

Figure 12A:
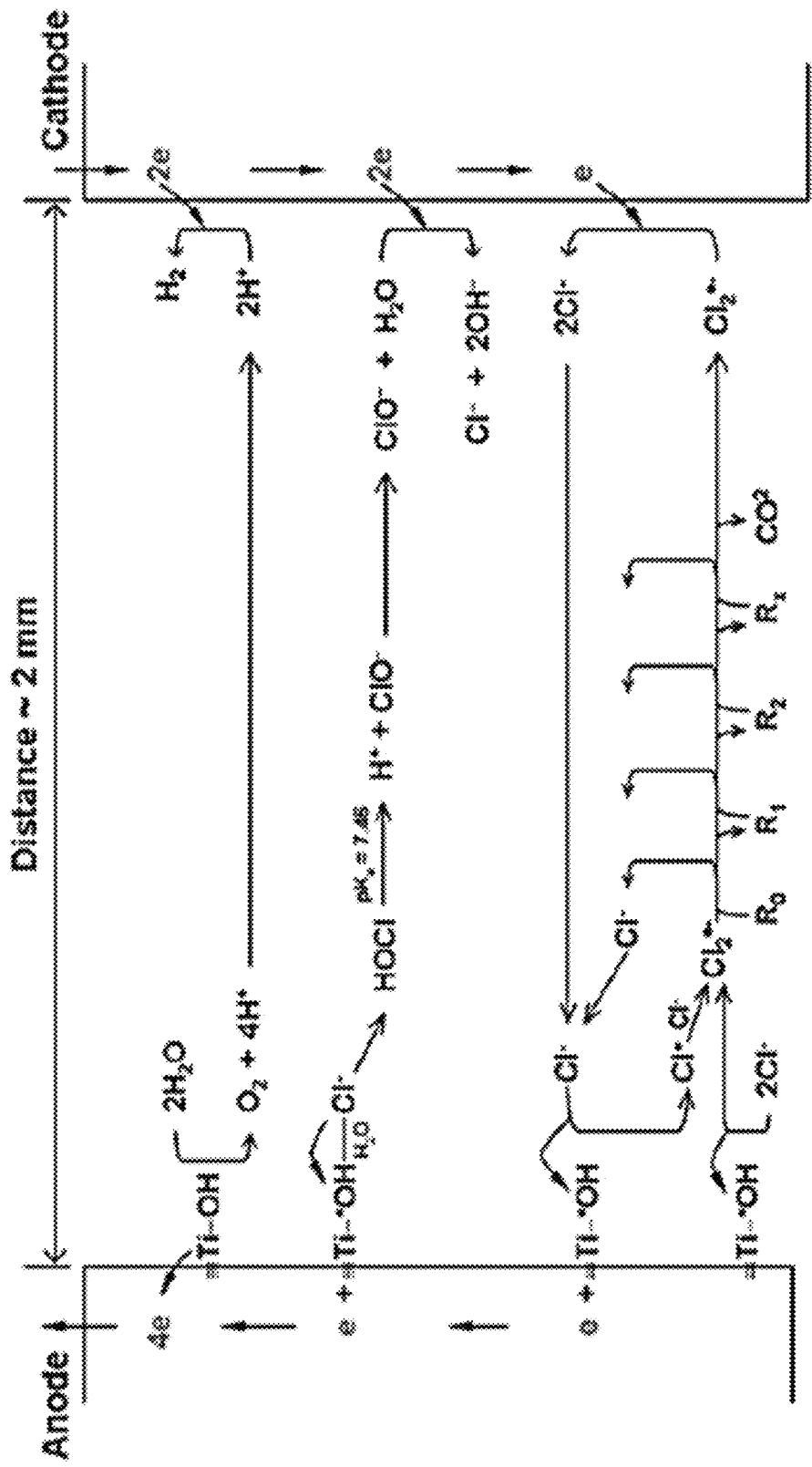
FIG. 12A is a diagram that illustrates the electrochemistry by which reactive chlorine species are produced between the anode and cathodes due to interfacial chloride oxidation.

FIG. 12A is a diagram that illustrates the electrochemistry by which reactive chlorine species (or chlorine-bearing moieties) are produced between the anodes and cathodes due to interfacial chloride oxidation. Reactive chlorine serves to disinfect the water and wastewater during treatment. Chloride is recycled via reduction of the reactive chlorine species at the bare metal anodes. FIG. 12A provides a chemical reaction network summary of the primary chemical reactions occurring between each anode-cathode sandwiched pair. Surface-bound hydroxide ion (denoted >TiOH) is oxidized to hydroxyl radical (.OH) which in turn leads to the formation of reactive chlorine species. The reactive chlorine species are subsequently recycled at the bare metal cathode.

Figure 12B:
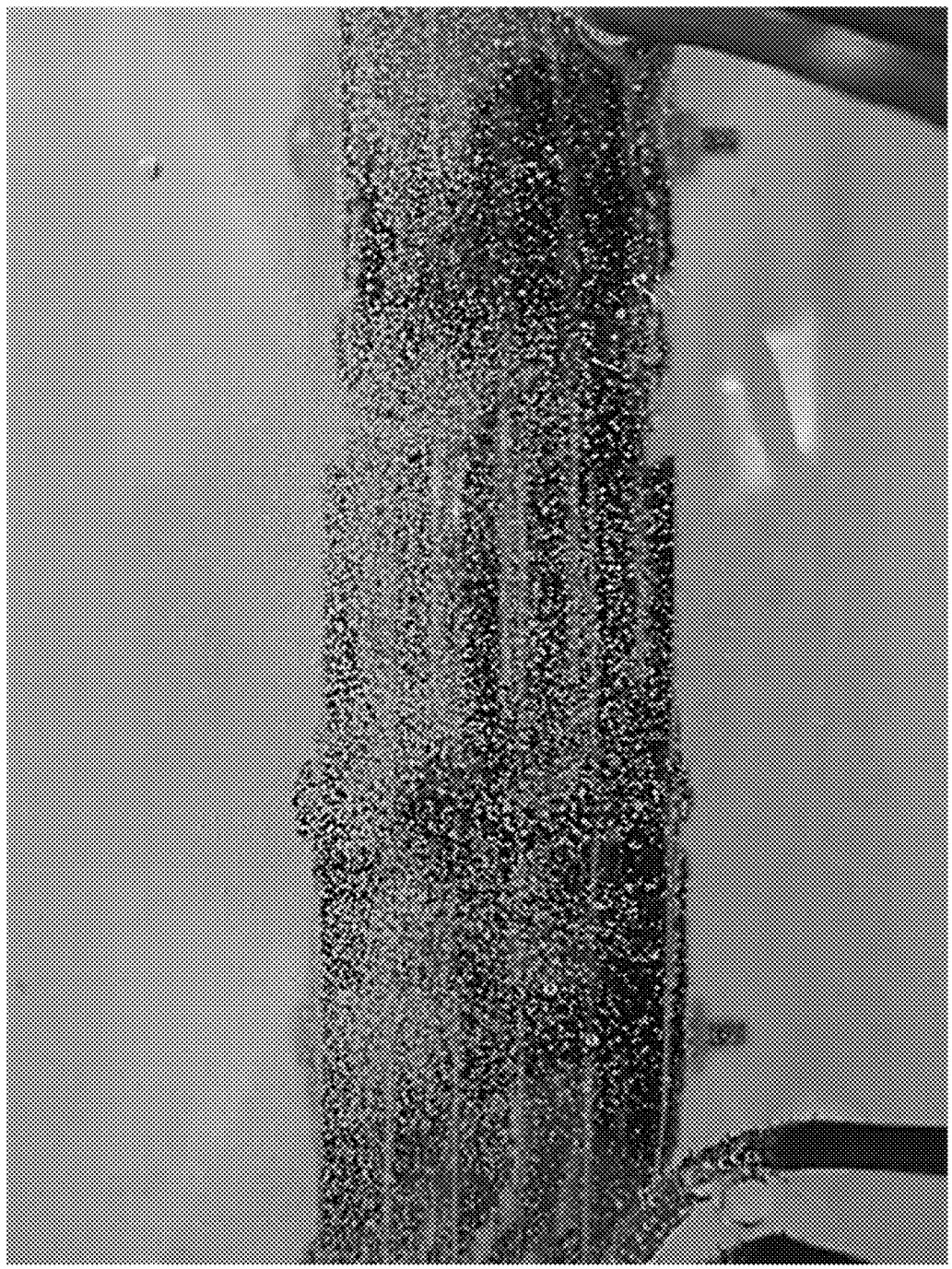
FIG. 12B is an image showing a top down view of the sandwiched electrodes (anode-cathode pairs) that illustrate the evolution of H$_2$ bubbles during oxidation.

FIG. 12B is an image showing a top.down view of the sandwiched electrodes (anode-cathode pairs) that illustrate the evolution of $H_2$ bubbles during oxidation.

In the electrochemical reactor, free chlorine species serve a dual role as a primary oxidant and as a potent disinfectant (i.e., HOCl).

Figure 13A:
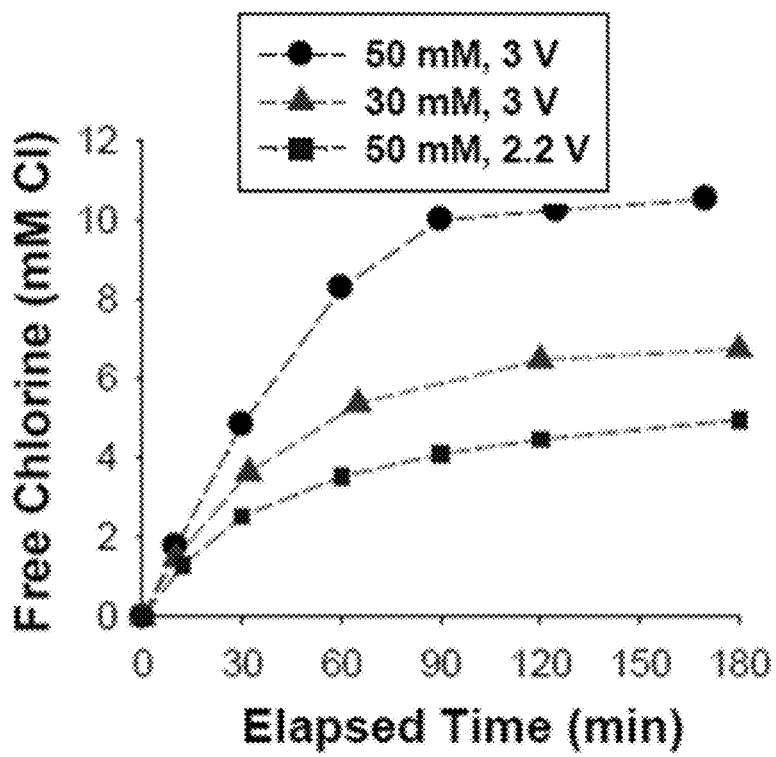
FIG. 13A is a graph that illustrates the evolution of free chlorine measured during electrolysis of NaCl solution as a function of time, [Cl$^-$] and the applied potential.

FIG. 13A is a graph that illustrates the evolution of free chlorine measured during electrolysis of NaCl solution as a function of time, chloride ion concentration ([Cl⁻]) and the applied potential.

Figure 13B:
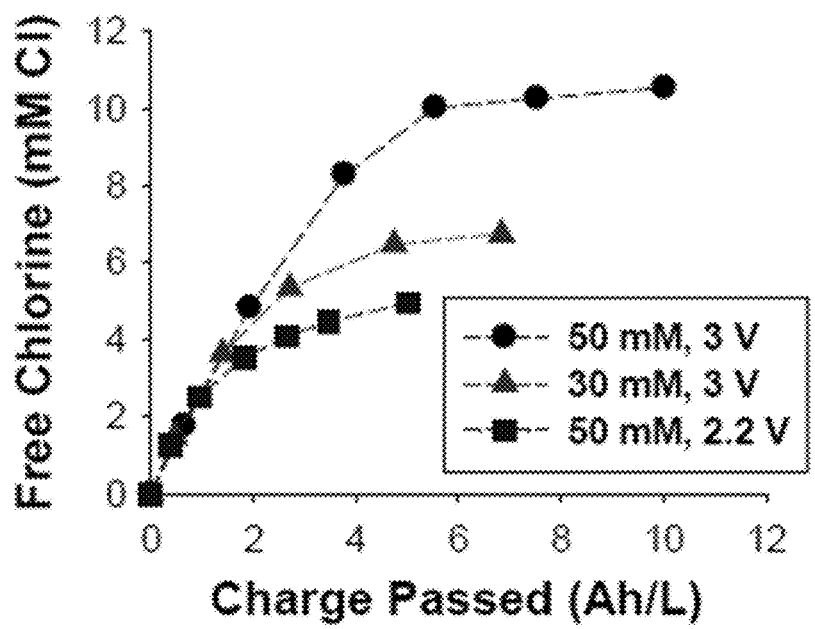
FIG. 13B is a graph that illustrates the evolution of free chlorine measured during electrolysis of NaCl solution as a function of charge passed through the cell, [Cl$^-$] and the applied potential.

FIG. 13B is a graph that illustrates the evolution of free chlorine measured during electrolysis of NaCl solution as a function of charge passed through the cell, [Cl⁻] and the applied potential. Free chlorine species serve a dual role as a primary oxidant and as a potent disinfectant (i.e., HOCl).

Chemical Oxygen Demand (or COD) is an indirect measure of the amount of organic compounds in water. Most applications of COD determine the amount of organic pollutants found in surface water (e.g. lakes and rivers) or wastewater, making COD a useful measure of water quality. It is expressed in milligrams per liter (mg/L) which indicates the mass of oxygen consumed per liter of solution. Since a liter of water weighs a kilogram, a milligram per liter can also be expressed as ppm (parts per million).

Figures 14A, 14B:
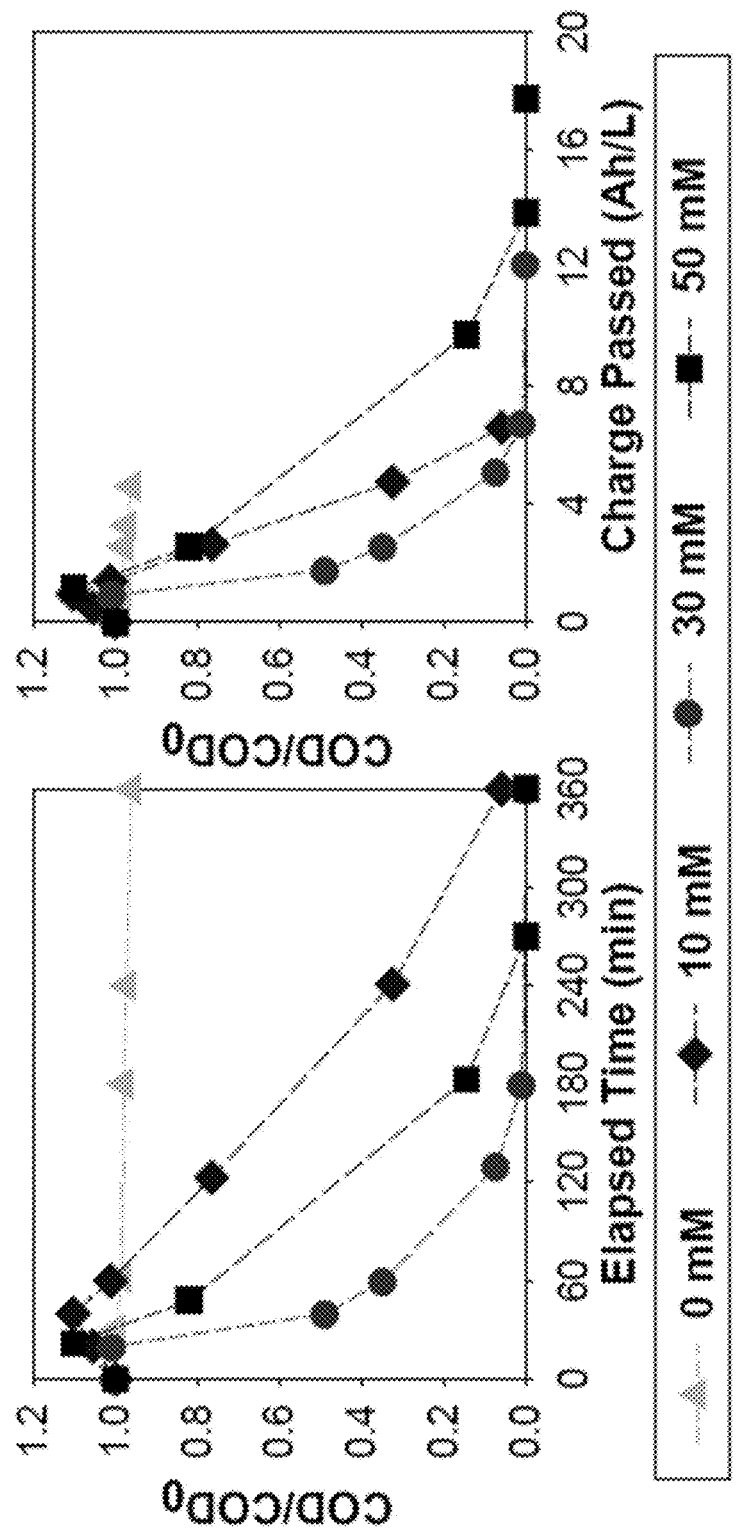
FIG. 14A is a graph that illustrates the evolution of Chemical Oxygen Demand (COD) in wastewater electrolysis as a function of time and chloride concentration (Applied anodic potential: 3 V NHE).
FIG. 14B is a graph that illustrates the evolution of Chemical Oxygen Demand (COD) in wastewater electrolysis as a function of specific passed charge and chloride concentration (Applied anodic potential: 3 V NHE).

FIG. 14A is a graph that illustrates the evolution of Chemical Oxygen Demand in wastewater electrolysis as a function of time and chloride concentration (Applied anodic potential: 3 V NHE).

FIG. 14B is a graph that illustrates the evolution of Chemical Oxygen Demand (COD) in wastewater electrolysis as a function of specific passed charge and chloride concentration (Applied anodic potential: 3 V NHE).

Figures 14C, 14D, 14E:
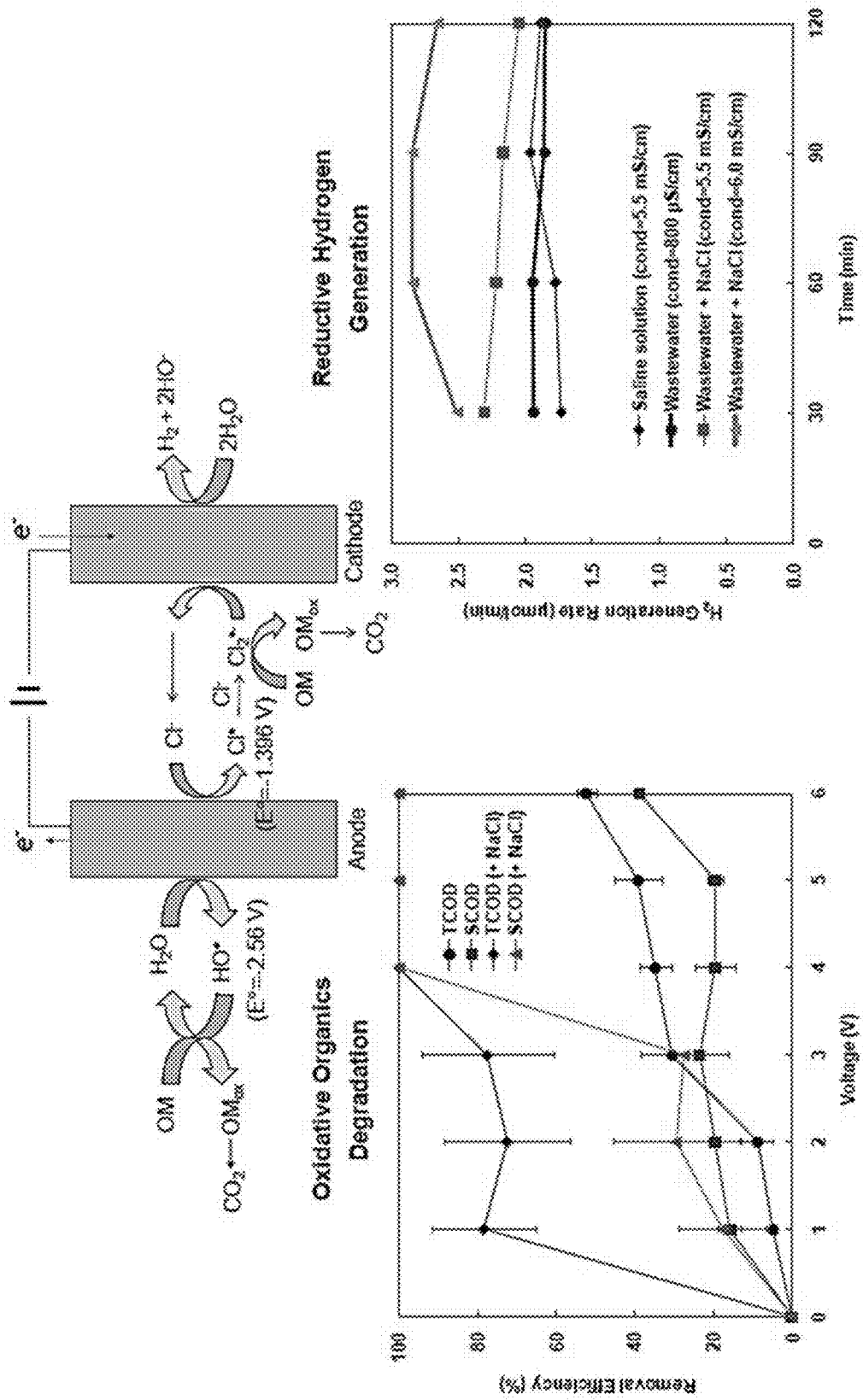
FIG. 14C is a schematic diagram showing the electrochemical processes that occur during electrochemical oxidation of municipal wastewater with simultaneous hydrogen generation.
FIG. 14D is a graph showing the COD removal efficiencies in municipal wastewater as a function of applied voltage and NaCl addition.
FIG. 14E is a graph showing the variation of hydrogen generation rates with time when saline solution and municipal wastewater with different electrical conductivities were treated under an applied voltage of 2 V.

FIG. 14C is a schematic diagram showing the electrochemical processes that occur during electrochemical oxidation of municipal wastewater with simultaneous hydrogen generation.

FIG. 14D is a graph showing the COD removal efficiencies in municipal wastewater as a function of applied voltage and NaCl addition.

FIG. 14E is a graph showing the variation of hydrogen generation rates with time when saline solution and municipal wastewater with different electrical conductivities were treated under an applied voltage of 2 V.

Figures 15A, 15B:
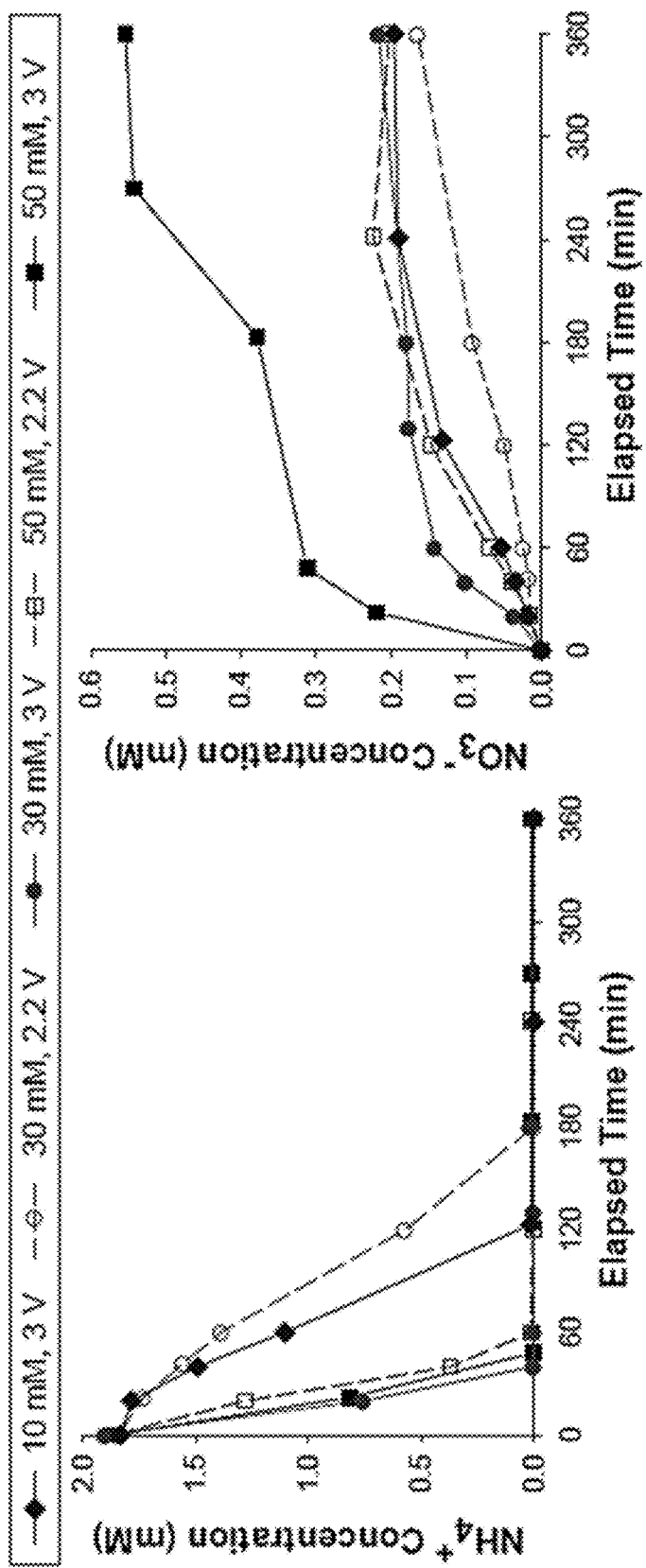
FIG. 15A is a graph that illustrates the time dependent change in the concentration of ammonium ion (NH$_4^+$) during the electrochemical treatment of wastewater in the bench-top reactor as junction of the chloride concentration, [Cl$^-$] and applied potential, $E_{cell}$.
FIG. 15B is a graph that illustrates the time dependent change in the concentration of nitrate (NO$_3^-$) ion during the electrochemical treatment of wastewater in the bench-top reactor as junction of the chloride concentration, [Cl$^-$] and applied potential, $E_{cell}$.

FIG. 15A is a graph that illustrates the time dependent change in the concentration of ammonium ion ($NH_4^+$) during the electrochemical treatment of wastewater in the bench-top reactor as junction of the chloride concentration, [$Cl^-$] and applied potential, $E_{cell}$.

FIG. 15B is a graph that illustrates the time dependent change in the concentration of nitrate ($NO_3^-$) ion during the electrochemical treatment of wastewater in the bench-top reactor as junction of the chloride concentration, [$Cl^-$] and applied potential, $E_{cell}$.

FIG. 16 is a graph that illustrates the hydrogen generation rate, gas generation rate, and volume fraction of hydrogen as a function of average current in wastewater electrolysis using an effective electrode area=5.4 $cm^2$.

FIG. 17A is an image of an electrolysis cell during the oxidation of undiluted fresh human urine. The electrolysis of actual urine was found to successfully operate along with simultaneous generation of $H_2$ even in the absence of externally added electrolytes. Urea and urine electrolysis are very promising processes in terms of a synergisitc hydrogen evolution from water and are technically viable even in the absence of externally added electrolytes. The electrolytic treatment of urea in the presence of sodium chloride electrolyte produced nitrate and ammonium as main products along with TOC removal.

FIG. 17B is an image of electrolysis in the same cell when the original sample was diluted by a factor of 4 in the bench-top electrochemical cell.

Figure 17C:
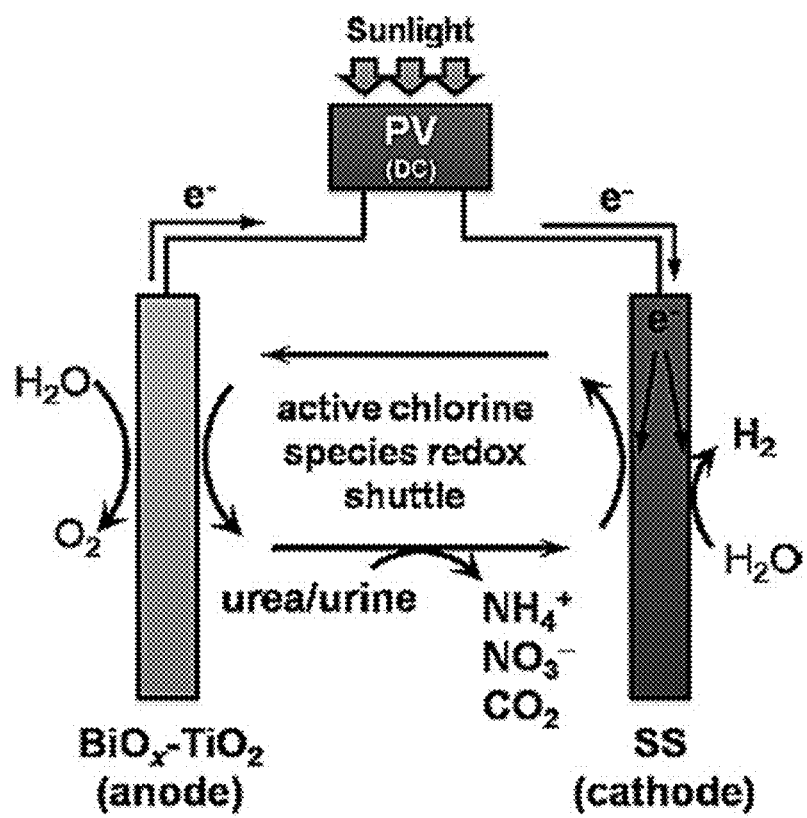
FIG. 17C is a schematic diagram showing the electrochemical processes that occur during the electrolysis of human urine.

FIG. 17C is a schematic diagram showing the electrochemical processes that occur during the electrolysis of human urine.

Figure 18A:
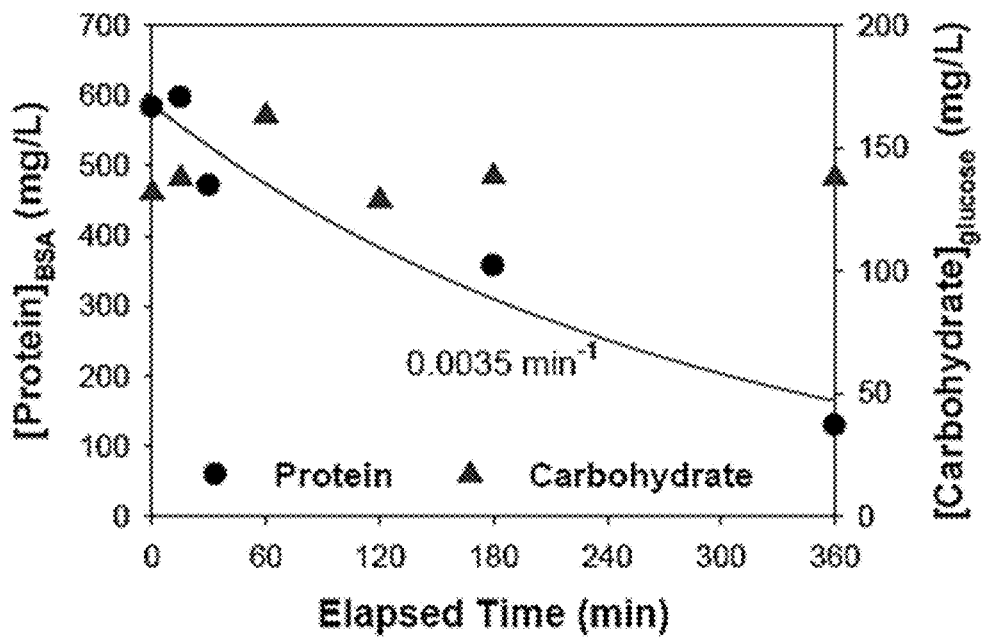
FIG. 18A is a graph that illustrates the variation of protein and carbohydrate concentration d during 6 hour electrolysis in diluted fresh urine (4-fold dilution) where the electrolyte Volume=55 ml, the effective electrode surface area of the anode was 5.4 cm$^2$ and the applied anodic potential was 3 V NHE.

FIG. 18A is a graph that illustrates the variation of protein and carbohydrate concentration d during 6 hour electrolysis in diluted fresh urine (4-fold dilution) where the electrolyte Volume=55 ml, the effective electrode surface area of the anode was 5.4 $cm^2$ and the applied anodic potential was 3 V NHE.

Figure 18B:
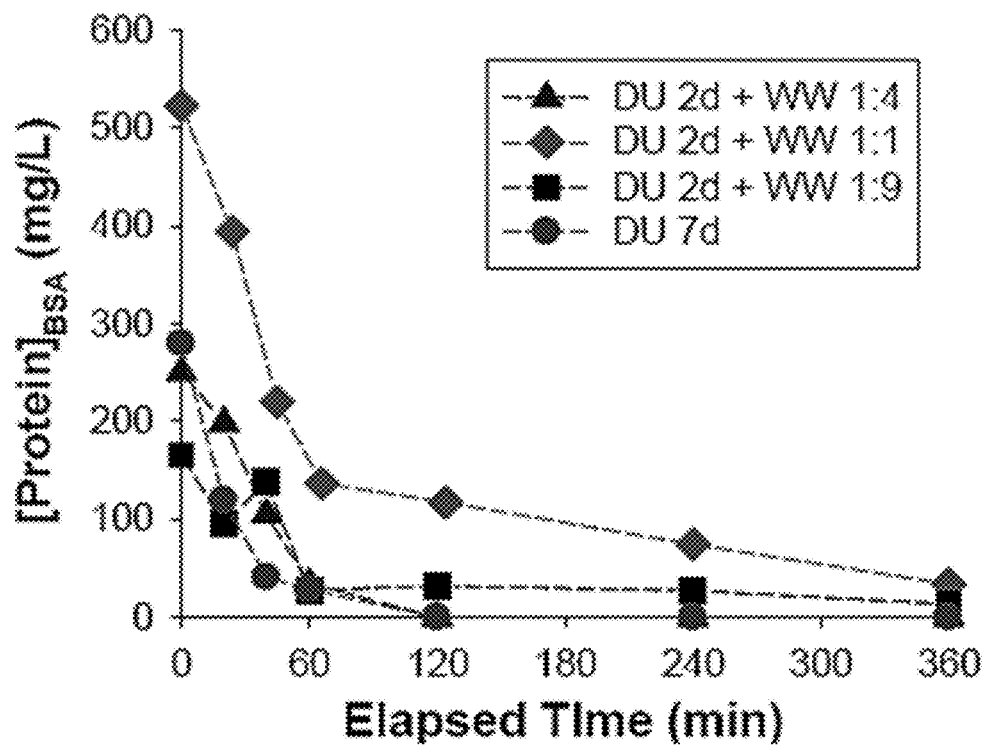
FIG. 18B is a graph that illustrates the degradation rate of protein during electrolysis in digested urine (i.e., septic tank) with variable dilution with wastewater and digestion period for the same operating conditions.

FIG. 18B is a graph that illustrates the degradation rate of protein during electrolysis in digested urine (i.e., septic tank) with variable dilution with wastewater and digestion period for the same operating conditions.

Figure 19A:
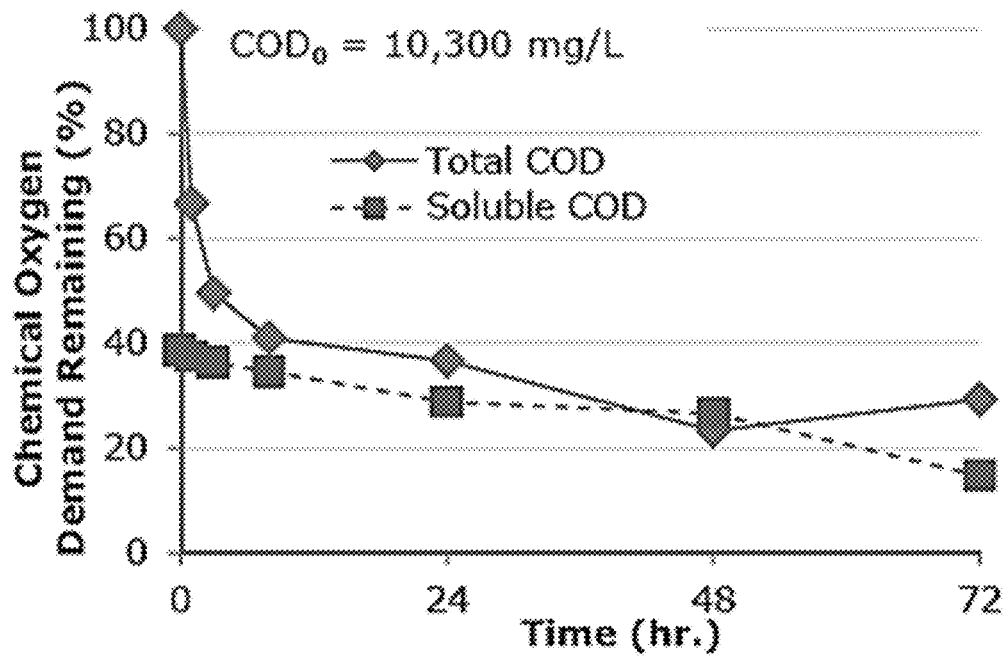
FIG. 19A is a graph that illustrates the reduction in COD after electrochemical treatment of the Caltech synthetic feces in the 20 L prototype reactor for 72 hours. 60% of the COD is eliminated within 6 hours; however, prolonged treatment in needed for the total elimination of all chemical oxygen demand (COD). The residual COD in carried mainly in smaller molecular weight organic acids such as formic and acetic acids.

FIG. 19A is a graph that illustrates the reduction in COD after electrochemical treatment of the Caltech synthetic feces in the 20 L prototype reactor for 72 hours. 60% of the COD is eliminated within 6 hours; however, prolonged treatment in needed for the total elimination of all chemical oxygen demand (COD). The residual COD in carried mainly in smaller molecular weight organic acids such as formic and acetic acids.

Figure 19B:
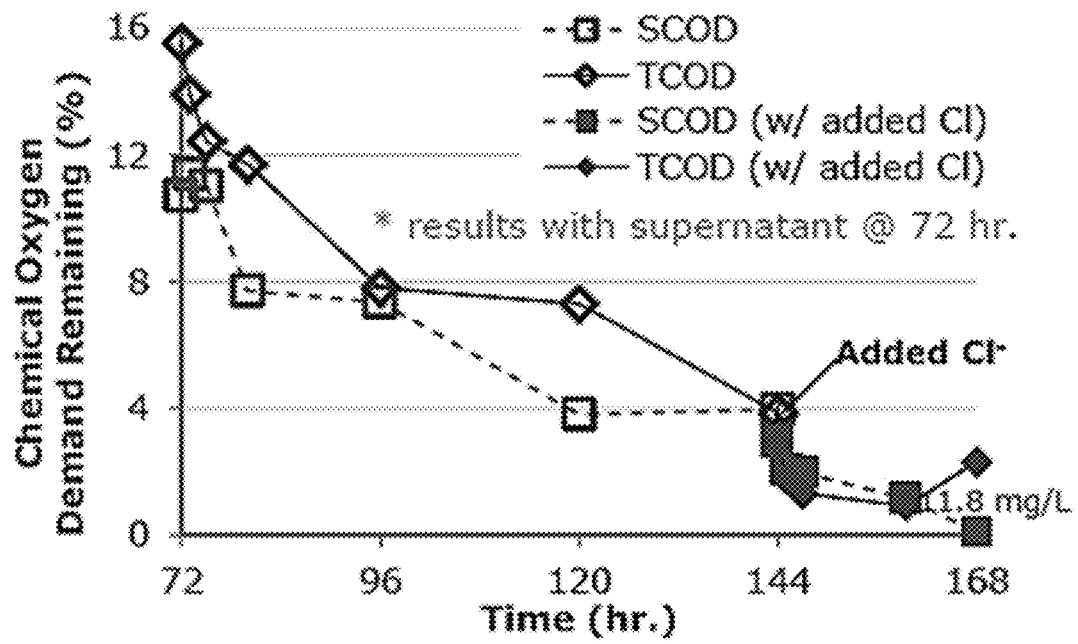
FIG. 19B is a graph that illustrates the reduction in COD after electrochemical treatment of the Caltech synthetic feces in the 20 L prototype reactor for 168 hours.

FIG. 19B is a graph that illustrates the reduction in COD after electrochemical treatment of the Caltech synthetic feces in the 20 L prototype reactor for 168 hours.

Table 5 shows the chemical composition of the Caltech synthetic feces.

TABLE 5

Caltech Synthetic Feces Chemical Composition

| Organic Components | Amount (wt. %) | COD (mg $L^{-1}$) | Molecular Wt. ($g_l$) | Notes |
|---|---|---|---|---|
| Yeast (active) | 30 | 2,960 | | *E. Coli* substitute |
| Cellulose | 15 | 1,240 | $10^6$-$10^7$ | Insoluble fiber |
| PEG400 | 15 | 2,088 | 400 (avg.) | Soluble fiber |
| Oleic Acid | 20 | 2,588 | 280 | Fatty acid |
| Soy Protein | 8 | 692 | ~$10^6$ | Undigested protein |
| Inorganics | 12 | 808 | | |
| SUM (Σ) | 100 | 10,736 | | |

| Salt Added | MW (g $mole^{-1}$) | Added (mg $g^{-1}$) |
|---|---|---|
| NaCl | 58.4 | 40 |
| KCl | 74.6 | 40 |
| $CaCl_2$ | 111 | 20 |
| $MgCl_2$ | 95.2 | 20 |
| $ZnCl_2$ | 136.3 | 0.8 |
| $FeCl_2$ | 126.8 | 0.6 |
| $MnCl_2$ | 125.8 | 0.3 |
| $CuCl_2$ | 134.5 | 0.1 |

Figure 19C:
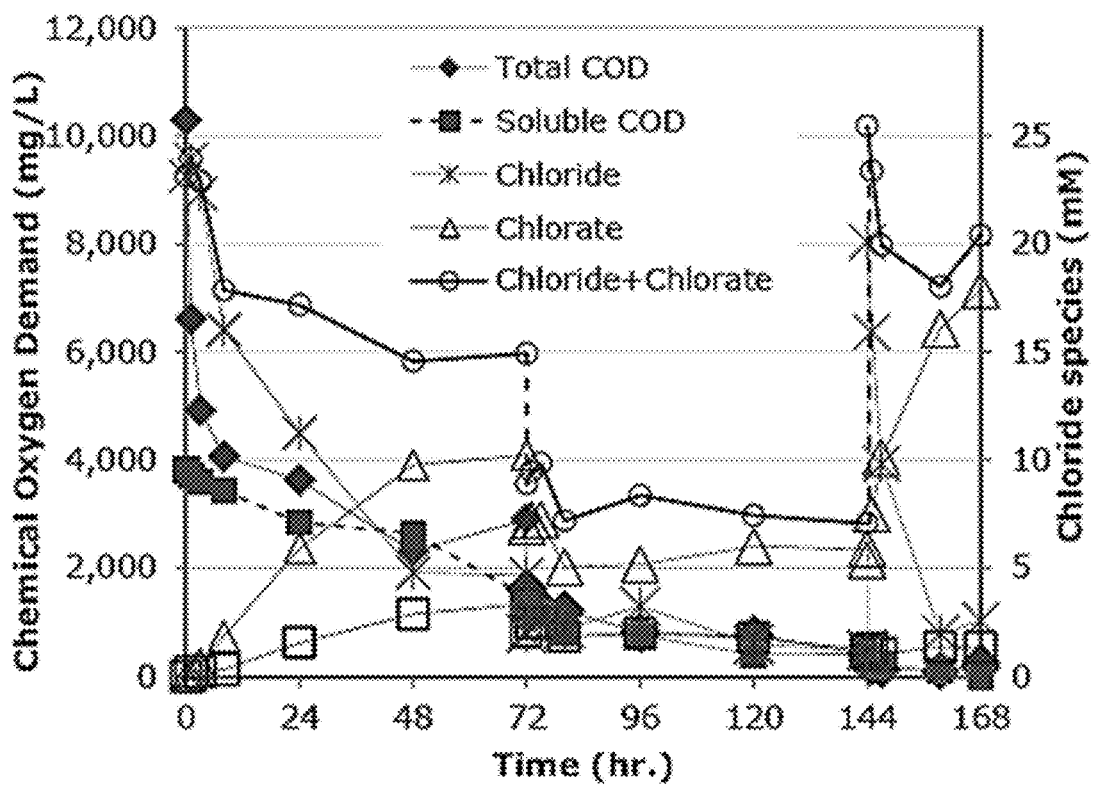
FIG. 19C is a graph that illustrates the COD and the chlorine species present over a period of 168 hours.

FIG. 19C is a graph that illustrates the COD and the chlorine species present over a period of 168 hours.

Figure 19D:
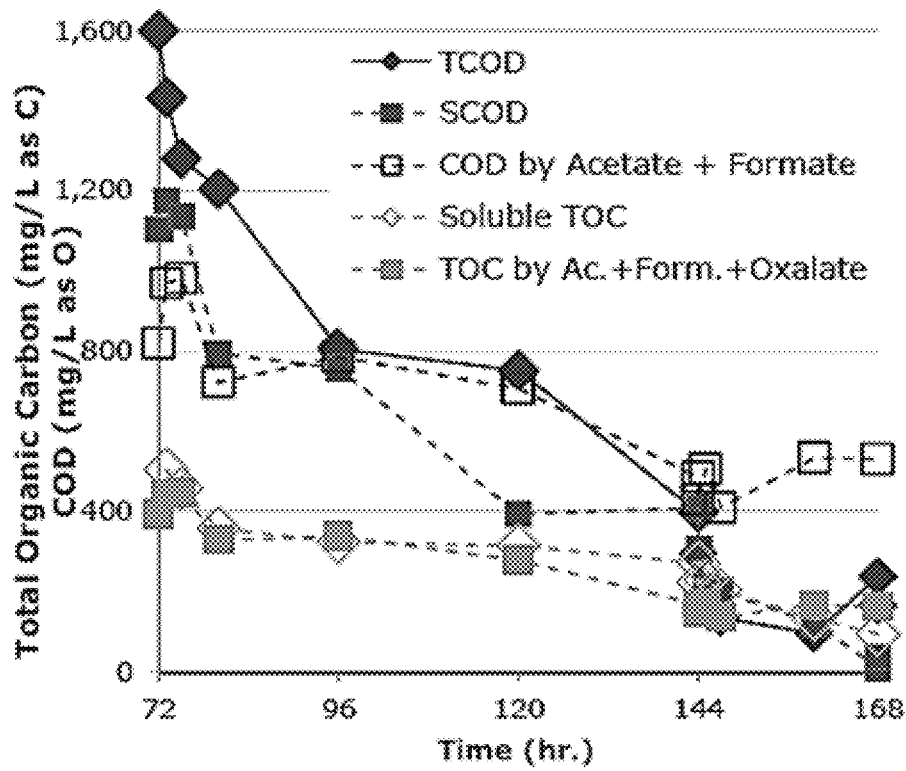
FIG. 19D is a graph that illustrates the total organic carbon present over a period of 168 hours.

FIG. 19D is a graph that illustrates the total organic carbon present over a period of 168 hours.

Figure 20A:
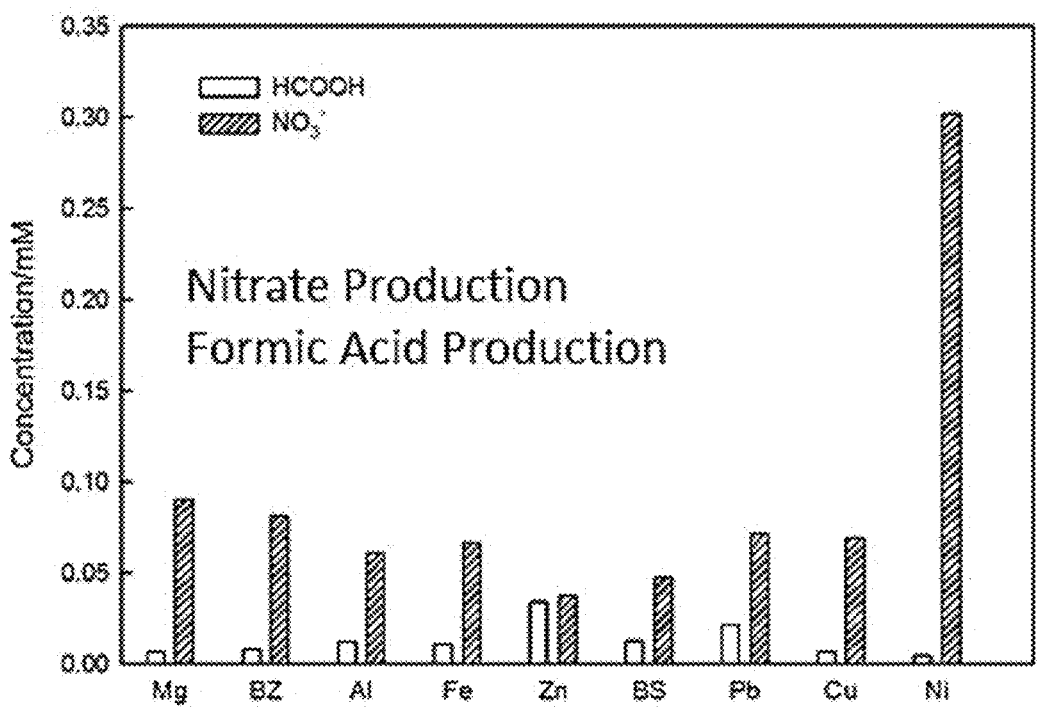
FIG. 20A is a graph that shows the nitrate and formic acid production levels at the end of the electrochemical urea degradation reaction where the standard BiOx-TiO$_2$ electrodes were paired with alternative metal cathodes including brass and bronze.

FIG. 20A is a graph that shows the nitrate and formic acid production levels at the end of the electrochemical urea degradation reaction where the standard BiOx-$TiO_2$ electrodes were paired with alternative metal cathodes including brass and bronze.

Figure 20B:
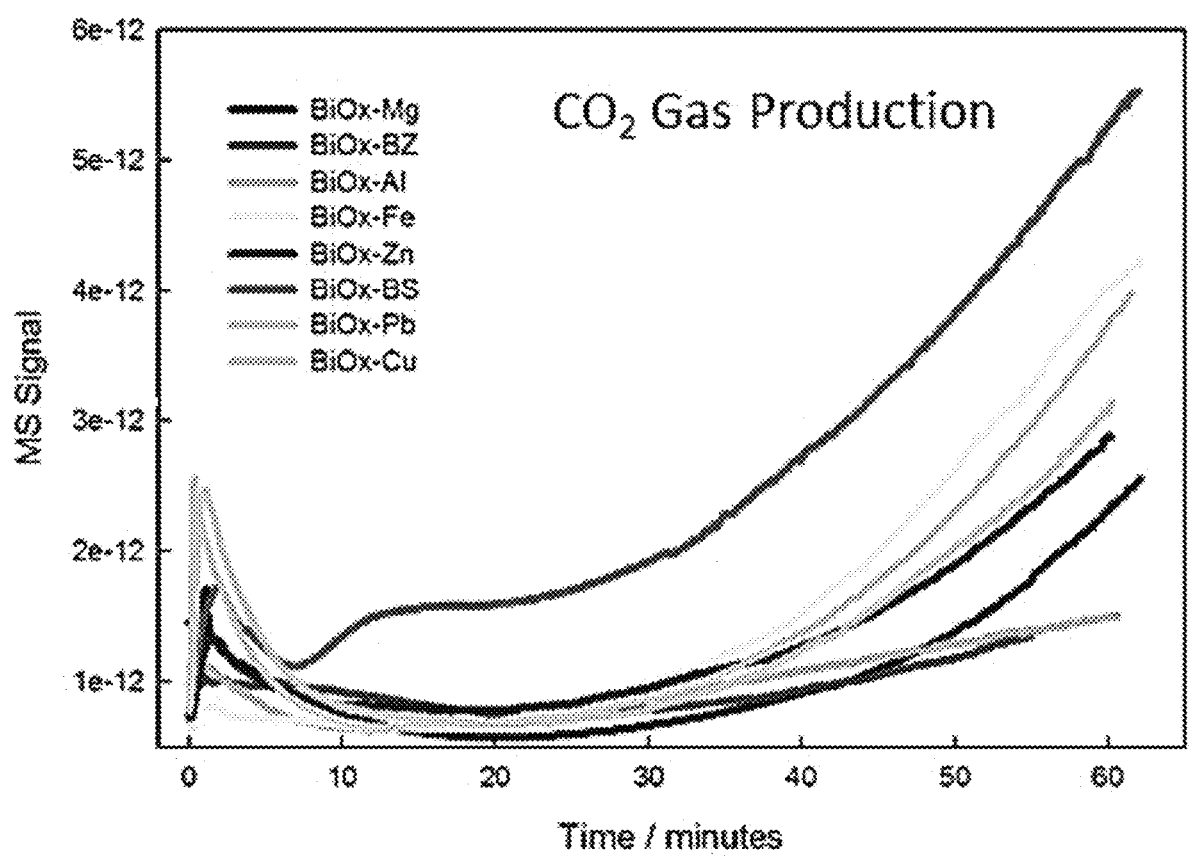
FIG. 20B is a graph that shows CO$_2$ production levels as measured in the head space of the reactor by quadrupole mass spectrometry.

FIG. 20B is a graph that shows $CO_2$ production levels as measured in the head space of the reactor by quadrupole mass spectrometry.

FIG. 20C is a graph that shows urea degradation rates and ammonium ion production levels as a function of the metal cathode composition.

FIG. 20D is a graph that shows $H_2$ gas production rates as a function of metal cathode composition as measured in the head space of the reactor by quadrupole mass spectrometry.

Photoelectrochemical System

Figure 21:
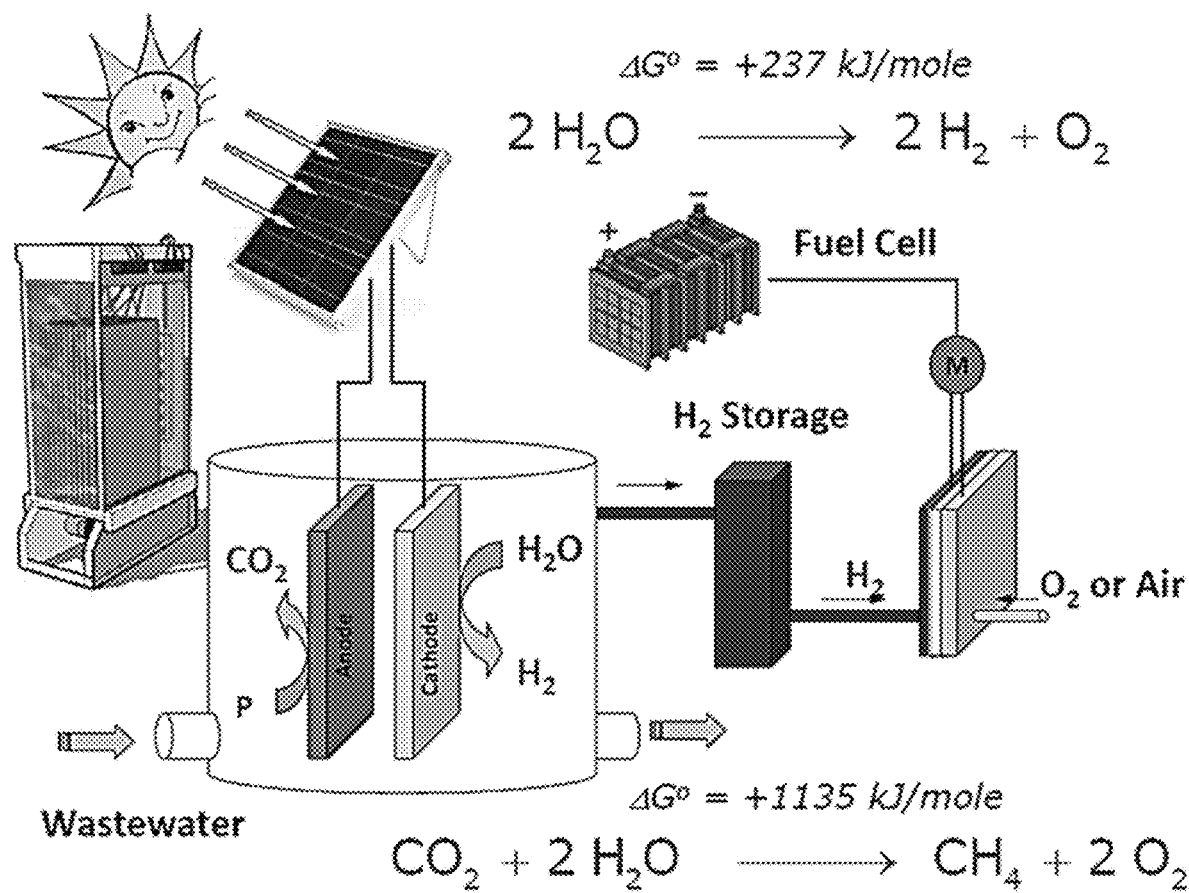
FIG. 21 is a schematic diagram illustrating some of the features of the invention.

FIG. 21 is a schematic diagram illustrating some of the features of the invention, including the use of photovoltaics as an electrical source, storage of $H_2$ as a product, and the use of $H_2$ in a fuel cell (such as a hydrogen-air fuel cell) to generate electricity which can be stored in a battery or used as needed. In particular, FIG. 21 makes note that the Gibbs free energy of formation of $2H_2+O_2$ from liquid water ($\Delta G^O=+237$ kJ/mole) and the Gibbs free energy of formation of $CH_4+2O_2$ from $CO_2$ and liquid water ($\Delta G^O=+1135$ kJ/mole). This demonstrates that it is much less favorable to try to generate a hydrocarbon and oxygen than to generate hydrogen as a fuel.

Figure 22A:
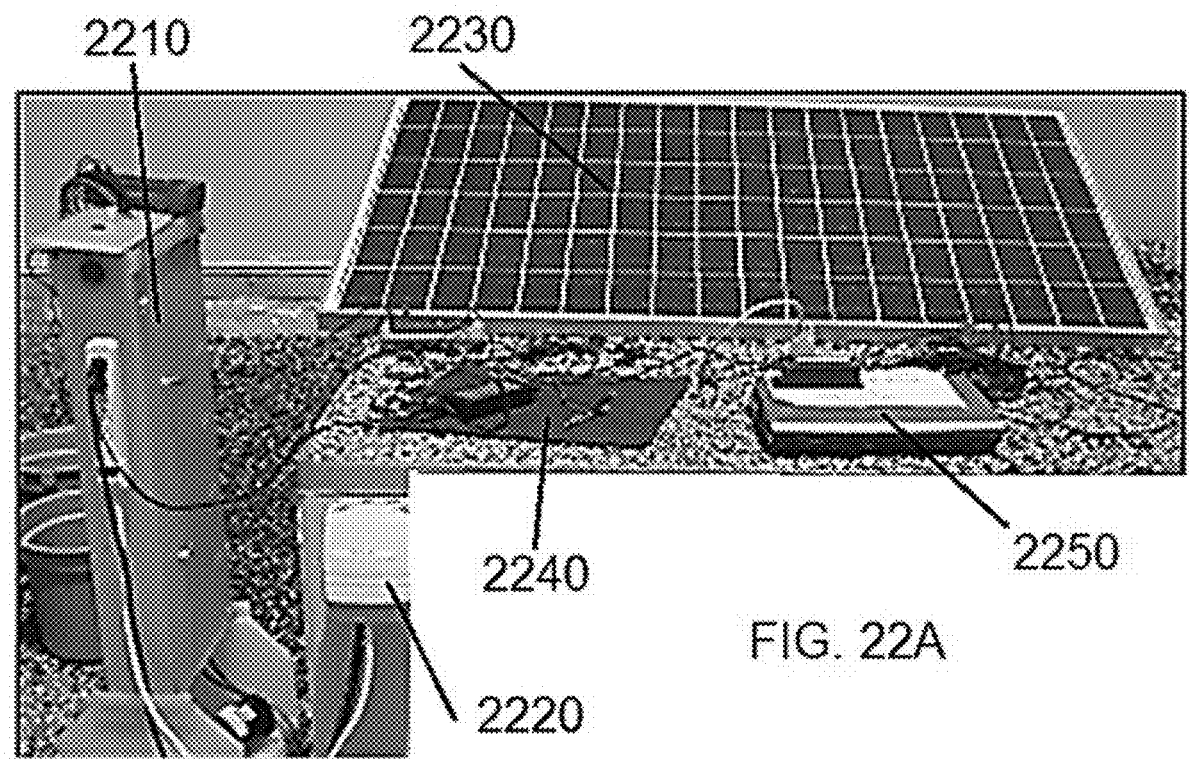
FIG. 22A is an image of an electrophotochemical reaction system.
Figure 22B:
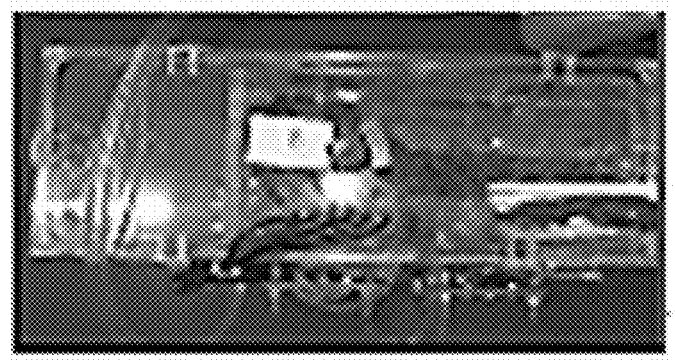
Figure 22C:
Figure 22D:
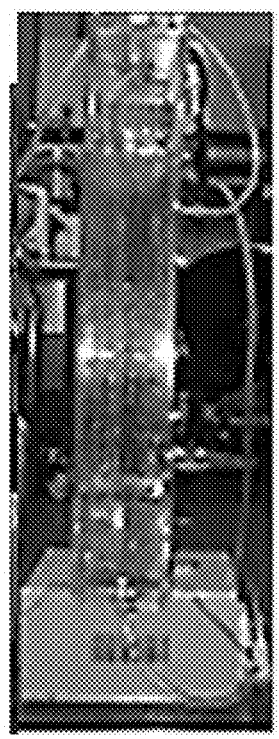

FIG. 22A is an image of an photoelectrochemical reaction system. In FIG. 22A there are shown a photoelectrochemical cell 2210 (which uses both electrical potential and direct illumination as inputs), a controller 2220 that controls power to the photoelectrochemical cell 2210, a photovoltaic module 2230 that generates electrical power, a multimeter 2240 that is used to observe the operating parameters of the electrochemical reactor 2210, and a pyranometer 2250 that is used to measure the amount of solar energy that is falling on the system so that efficiency calculations can be performed.

FIG. 22B, FIG. 22C, FIG. 22D and FIG. 22E are different views of the photoelectrochemical reaction chamber.

The $BiO_x$—$TiO_2$ anode is somewhat different from the conventional Bi-doped $TiO_2$ photocatalysts. For example, Bi-doped $TiO_2$ can be classified in several different ways. Three different Bi-doping types include: 1) $Bi_2O_3$—$TiO_2$, 2) $Bi_xTi_yO_{1-x-y}$ which also functions as a photocatalyst, or as 3) Bi-doped $TiO_2$ which functions likewise as a visible-light photocatalyst. The above materials were prepared with relatively small amounts of Bi (~1 mol %) with the primary purpose to develop new $TiO_2$ photocatalysts that function under visible-light excitation (i.e., not functional without light). However, the $BiO_x$—$TiO_2$ was prepared initially as an electrocatalyst intended specifically for water treatment applications. The Bi doping level of $TiO_2$ was designed to be as high as 25~33 mol % in the outermost electrode coat in order to increase conductivity. Thus, light irradiation to the $BiO_x$—$TiO_2$ without a DC power supply (i.e., no electrochemical bias) generates no measurable cell currents and or hydrogen. In the case of phenol oxidation, however, the $BiO_x$—$TiO_2$ particle arrays seem to have some photocatalytic activity toward phenol, and this activity is 3 to 4 times higher as those of the $TaO_x$—$IrO_2$ and $BiO_x$—$SnO_2$ electrodes. Since the $BiO_x$—$TiO_2$ has a high extinction coefficient in the range of $\lambda<395$ nm (FIG. 4), irradiation of the anode is likely in principle to create electron-hole pairs. However, most of excitons (electron-hole pairs) rapidly recombine in the absence of an external potential bias.

Photovoltaic System

FIG. 23A is an image of a higher efficiency, increased power output encased plastic laminated triple junction crystalline silicon solar panel that can be used as roofing material or siding for the prototype solar toilet.

FIG. 23B is an image of a polycrystalline convention PV-panel solar cell array that operates at lower solar collection efficiency.

Commercially available photovoltaic panels can be employed. In particular, as long as the amount of power is adequate, the precise nature of the photovoltaic panels is unimportant. That is to say that photovoltaic panels of any convenient type (e.g., crystalline silicon, amorphous silicon, thin-film, III-V, or other kinds of photovoltaic panels).

In other embodiments, other forms of renewable energy, such as wind energy, or solar thermal energy may be substituted for or used to augment the photovoltaic solar cell power supply. It is known to convert either wind energy or solar thermal energy into electrical energy, and the details of such energy conversion need not be expounded upon here. Any conventional wind to electric or solar thermal to electric system can in principle be employed as may be convenient.

Computer Control System

Figure 24:
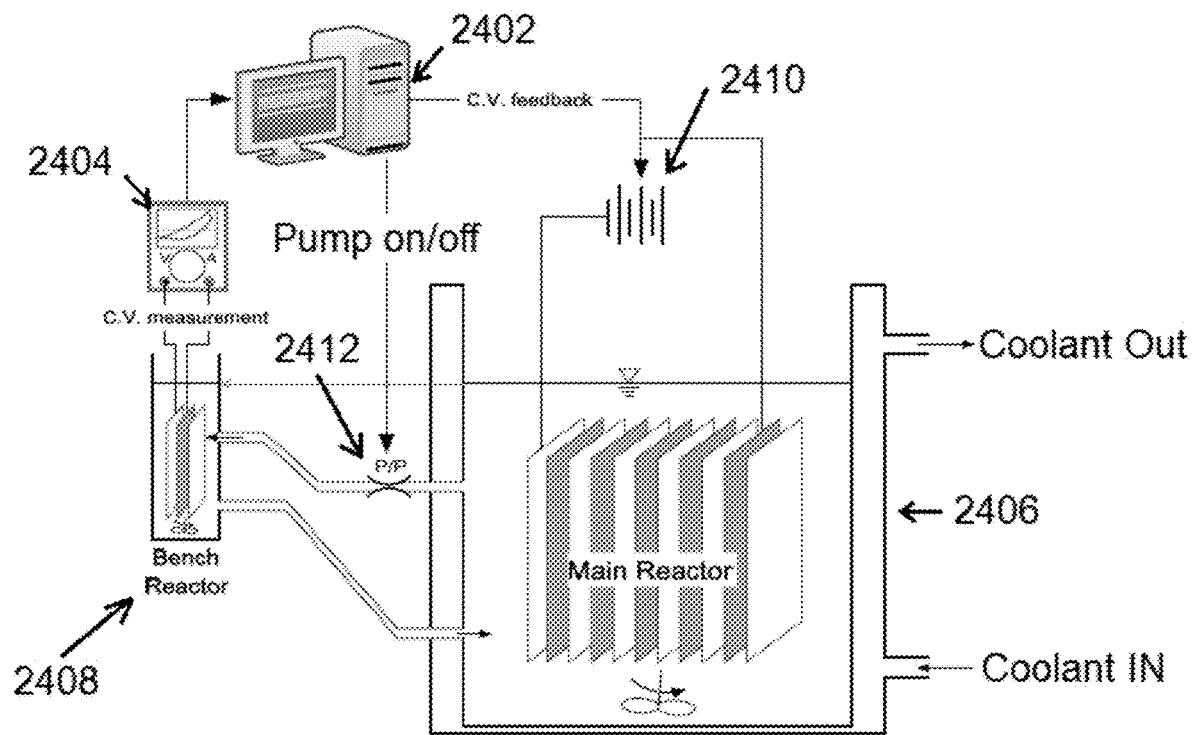
FIG. 24 is a schematic diagram showing a controller that employs a general purpose programmable computer operating under a set of instructions recorded on a machine-readable medium.

FIG. 24 is a schematic diagram showing a controller 2402 that employs a general purpose programmable computer operating under a set of instructions recorded on a machine-readable medium. The controller 2402 is connected to a measurement apparatus 2404, two reactors 2306, 2408, a battery 2410 and a pumping system 2412. In general the measurement apparatus is configured to measure operational parameters of the self-contained wastewater treatment system or of its components.

In one embodiment the controller is a personal computer. In other embodiments the controller is a microprocessor-based controller. In other embodiments, the controller is provided as multiple controllers, such as for example, a plurality of virtual machines operating on the general purpose programmable computer, each virtual machine handling one or more discrete control functions. In other embodiments, multiple discrete controllers can be used for different control purposes.

Liquid Waste Flow System

Flow-Controlled Batch Reactor

As shown in FIG. 40A through FIG. 40D, an improvement of the system uses gravity flow to empty a volume $V_1$ of wastewater from the septic tank 4002 into the electrochemical reactor 4004 of volume $V_2$ where it is treated according to steps 1 to 4. Once the limit is reached in the septic tank 4002, $V_1$ is quickly transferred to the electrochemical reactor 4004 by gravity flow (see step 2). Holding tank 4006 is provided and is connected to the flush tank 4008 by a pipe driven by pump 4012. During step 1, no flow occurs from the electrochemical reactor 4004 to the holding tank 4006. At the same time, the pump 4010 at the bottom of the reactor starts mixing the fluids in the electrochemical reactor 4004. By imposing $V_2>V_1$, the wastewater can be treated in the electrochemical reactor 4004 for a residence time of t hours, which is performed at step 3.

A hose from the flush tank 4008 can be connected to the electrochemical reactor 4004 to deliver the required flow q for the wastewater volume to reach $V_2=V_1+q\times t$. Once this volume is reached i.e., after t hours the treated water is rapidly transferred out of the electrochemical reactor 4004 by gravity flow to the holding tank 4012 as shown at step 4. The pump 4010 below the electrochemical reactor 4004 stops when the electrochemical reactor 4004 is emptied. Similarly to the original design the flush tank 4008 is also connected to the toilets for flushing and part of the water can be used for irrigation too.

$V_1$, $V_2$ and q can be easily adjusted to control the residence time t. For instance, for a residence time of 4 hours, with a flow of q=1 mL/min, the difference of volumes $V_2-V_1=240$ mL which is in the range of 1%-2% of the volume of wastewater that can be treated in one batch (~18 L).

Results of Operation of Exemplary Systems

In the work discussed herein, all laboratory glassware and tools that were used to study microbial growth were autoclaved at 121° C. for 20 min to achieve sterile conditions. In laboratory and prototype tests, previously cultured bacteria were often added to the wastewater to be treated. *Escherichia coli* (i.e., *E. coli*) were used as an important indicator of water and wastewater quality. For microbial testing experiments a strain of *E. coli* identified as DH5 alpha, with the genotype "F-Φ80lacZΔM15 A(lacZYA-argF) U169 recA1 endA1 hsdR17 (rK-, mK+) phoA supE44λ-thi-1 gyrA96 re1A1" was used. The cells do not bear any plasmids. LB agar plates to culture the stock strain of bacteria were used. Once the stationary growth phase was obtained, the cultured *E. coli* were added to electrochemical reactor containing 10 g/L sterilized synthetic feces. The concentration of *E. coli* reaches $10^6$ to $10^7$ CUF $mL^{-1}$ (colony forming units per milliliter), which approximates the concentration in raw wastewater.

Figures 33A, 33B, 33C, 33D, 33E, 33F:
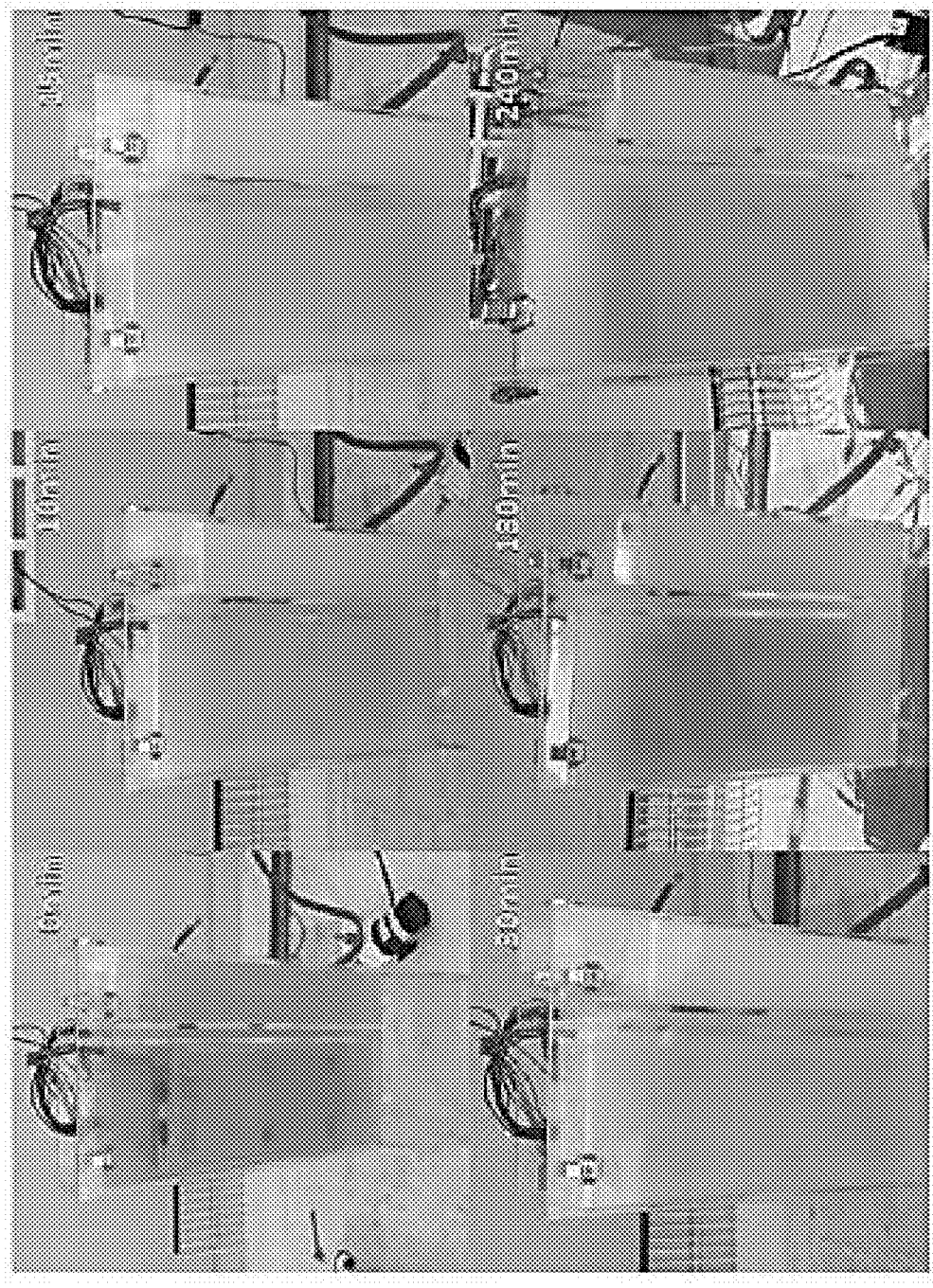
FIG. 33A through FIG. 33F is a sequence of images showing visible changes in color during solar wastewater treatment under ambient sunlight conditions at 0 minutes, 10 minutes, 15 minutes, 30 minutes, 180 minutes and 240 minutes, respectively.
Figure 33H:
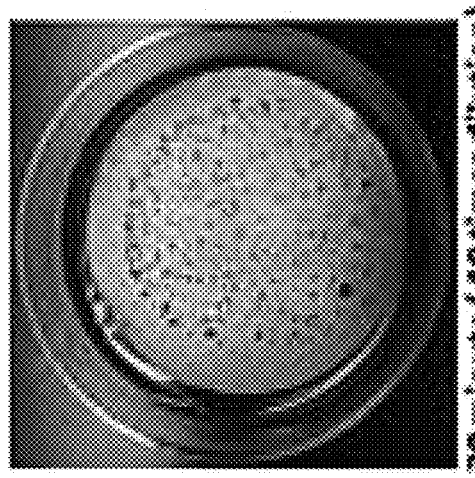
FIG. 33G through FIG. 33J is a sequence of images of the total fecal coliform colony forming units vs. time at 0 minutes, 30 minutes, 100 minutes and 180 minutes. After 180 minutes of treatment, no viable bacterial colonies can be cultured and thus total disinfection was achieved.
Figure 33J:
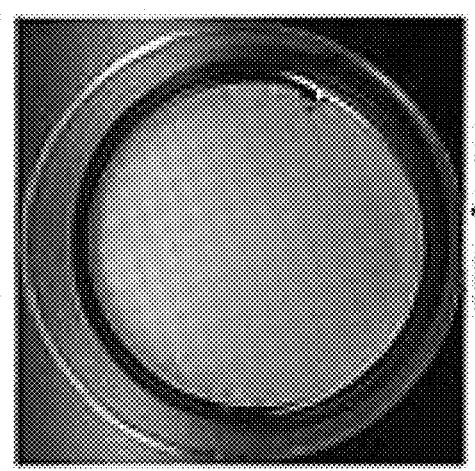
Figure 33G:
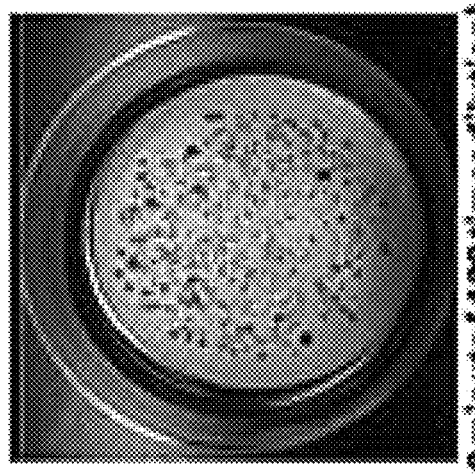
Figure 33I:
Figures 33K, 33L, 33M, 33N, 33O:
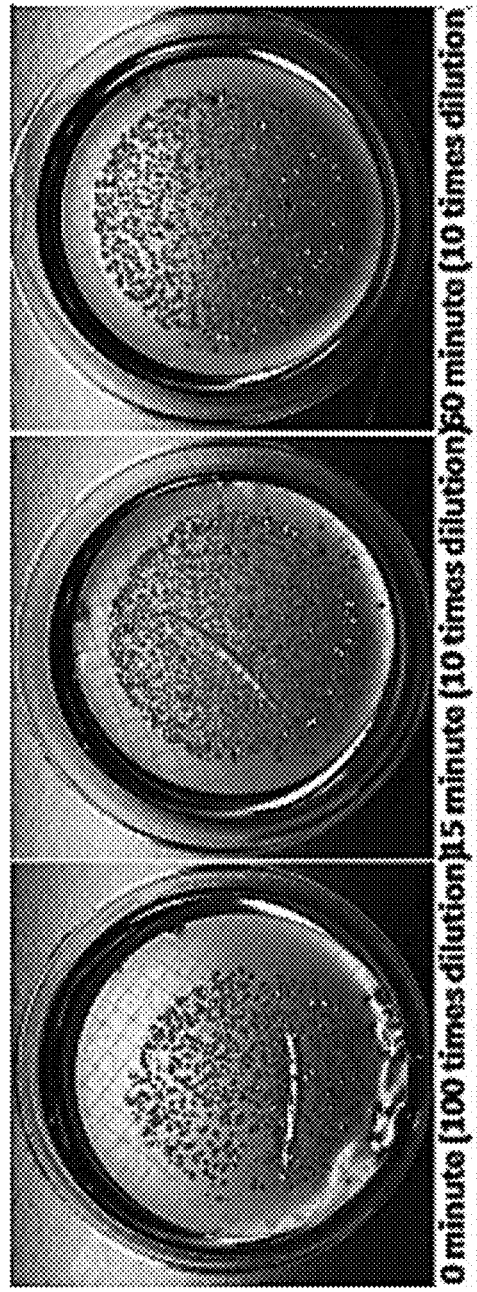
FIG. 33K through FIG. 33O is a sequence of images of the fecal coliform colony formation over time.
Figure 33U:
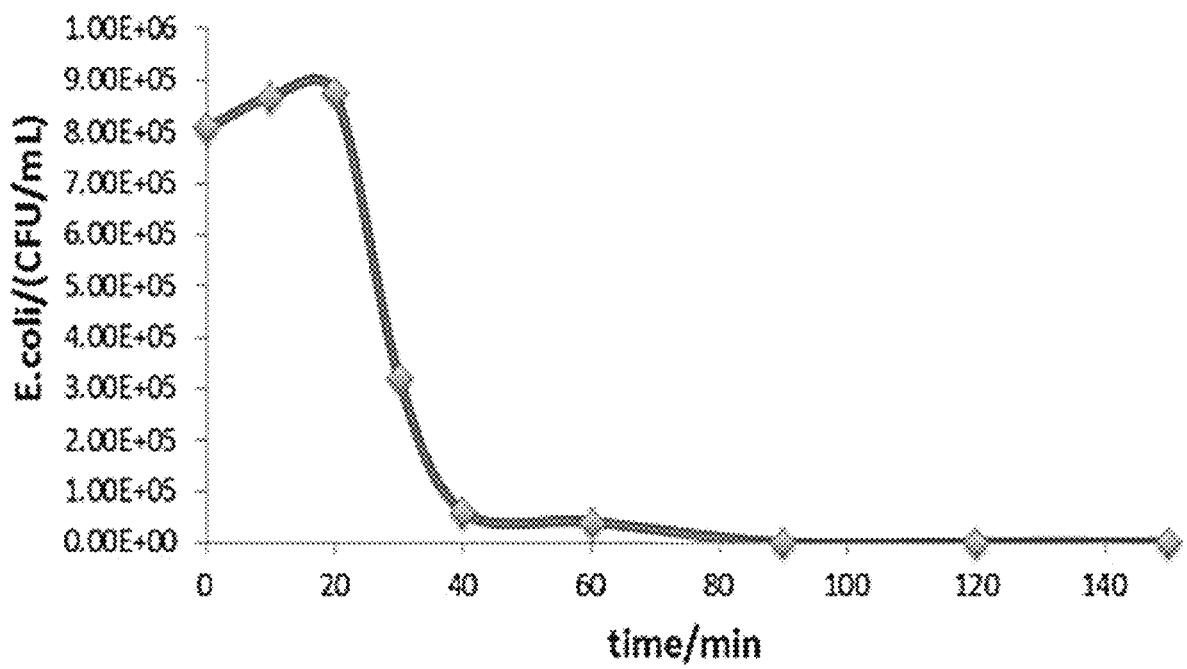
FIG. 33U is a graph of *E. Coli* disinfection kinetics during treatment of inoculated synthetic feces as a function of time.

The '6×6' drop plating method of Chen et al. to quantify the concentration of *E. coli* in wastewater was employed. The inactivation of *E. coli* vs. time is shown in FIG. 33U.

Photographs of microbial counting procedures show total disinfection of wastewater during electrochemical treatment. No bacteria can be cultured after 180 minutes of treatment.

Figure 25A:
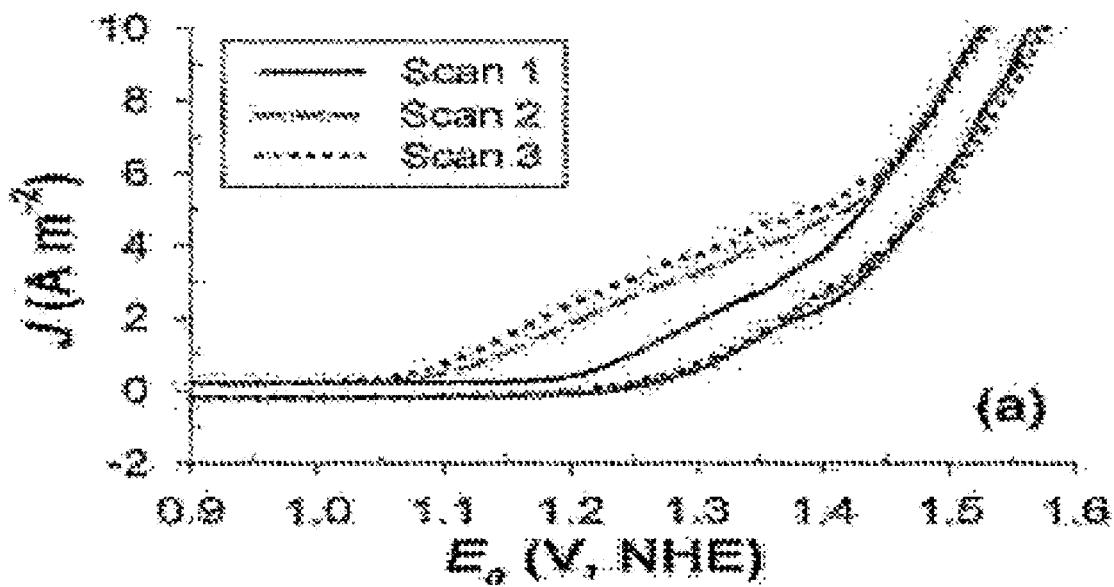
FIG. 25A is a graph of cyclic voltammetry in 30 mM NaCl solution with scan rate of 5 mV sec$^{-1}$ for a BiOx/TiO$_2$ anode.

FIG. 25A is a graph of cyclic voltammetry in 30 mM NaCl solution with scan rate of 5 mV $sec^{-1}$ for a $BiOx/TiO_2$ anode.

Figure 25B:
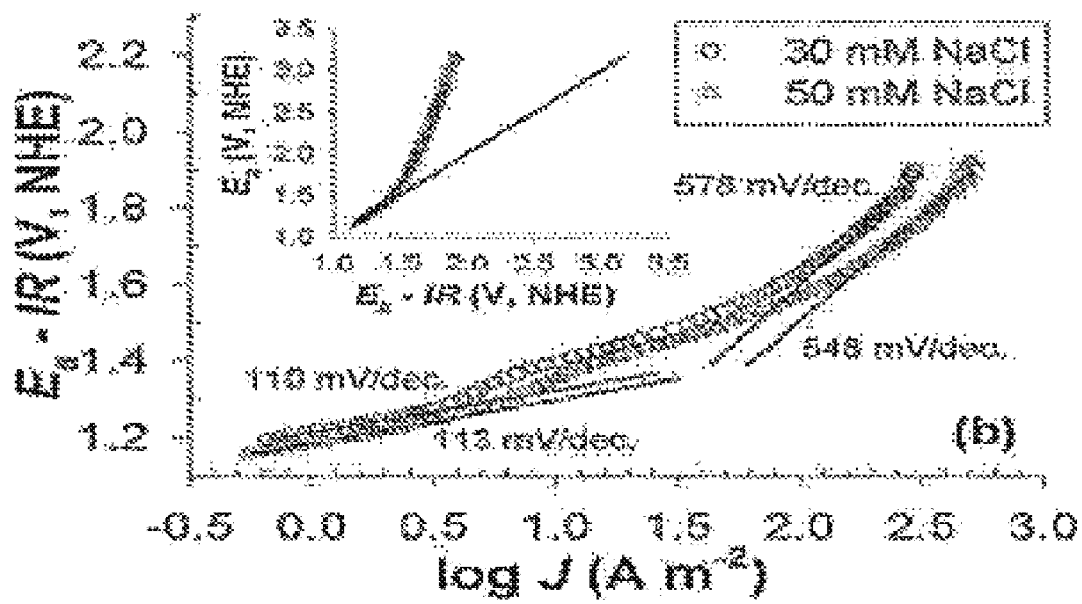
FIG. 25B is a quasi-stationary polarization curve in 30 mM and 50 mM NaCl solution using the BiOx/TiO$_2$ anode.

FIG. 25B is a quasi-stationary polarization curve in 30 mM and 50 mM NaCl solution using the $BiOx/TiO_2$ anode.

Figure 26:
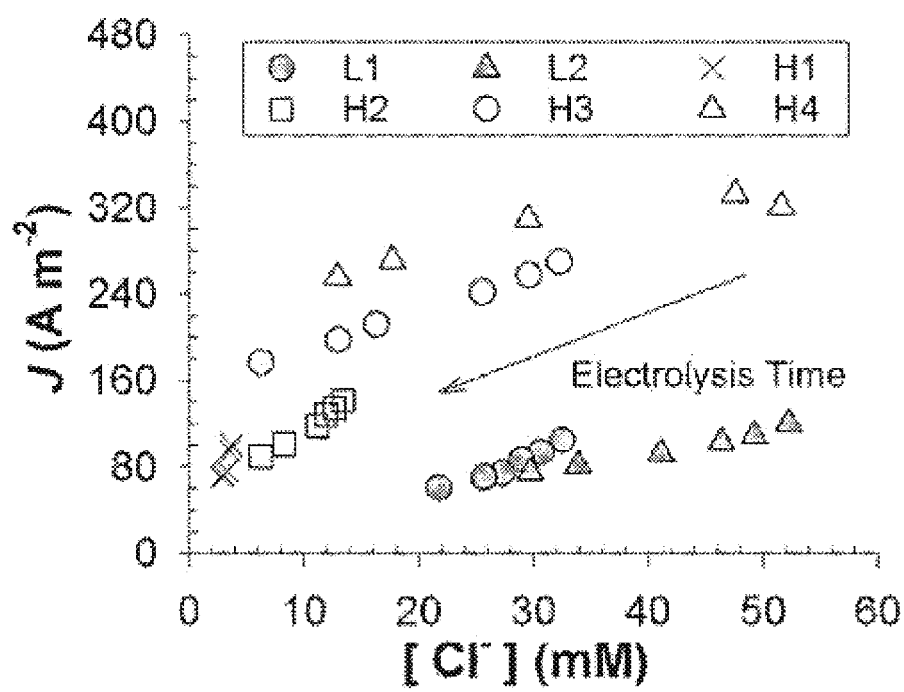
FIG. 26 is a graph that shows the evolution of current density along with variation in chloride concentration during potentiostatic wastewater electrolysis cell experiments with domestic wastewater.

FIG. 26 is a graph that shows the evolution of current density along with variation in chloride concentration during potentiostatic wastewater electrolysis cell experiments with domestic wastewater.

FIG. 27A is a graph that shows the effects of applied anodic potential on time profiles of COD concentration regressed with pseudo-first-order kinetic equations for potentiostatic wastewater electrolysis cell experiments with domestic wastewater.

FIG. 27B is a graph that shows the effects of external chloride concentration on time profiles of COD concentration regressed with pseudo-first-order kinetic equations for potentiostatic wastewater electrolysis cell experiments with domestic wastewater.

FIG. 28A is a graph that shows the evolution of reactive chlorine species with variation in COD concentration for potentiostatic wastewater electrolysis cell experiments with domestic wastewater as a function of time.

FIG. 28B is a graph that shows the evolution of chloride concentration variation in COD concentration for potentiostatic wastewater electrolysis cell experiments with domestic wastewater as a function of time.

FIG. 29 is a graph showing a time profile of chlorate concentration for potentiostatic wastewater electrolysis cell experiments with domestic wastewater. The inset figure shows linearly increasing regions of chlorate concentration with zero order rate constants for H2, H3 and H4.

FIG. 30A is a graph of the time profile of ammonium ion concentration for potentiostatic wastewater electrolysis cell experiments with domestic wastewater.

FIG. 30B is a graph of the time profile of nitrate concentration for potentiostatic wastewater electrolysis cell experiments with domestic wastewater.

Figure 31:
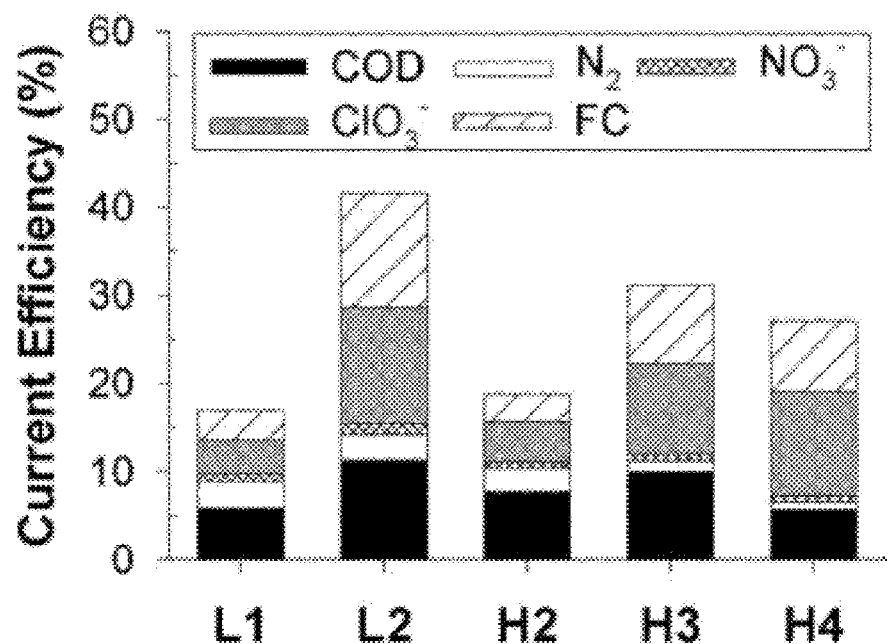
FIG. 31 is a graph showing the general current efficiency for anodic reactions including COD reduction and formation of gaseous nitrogen, nitrate, chlorate and free chlorine (FC) for potentiostatic wastewater electrolysis cell experiments with domestic wastewater.

FIG. 31 is a graph showing the general current efficiency for anodic reactions including COD reduction and formation of gaseous nitrogen, nitrate, chlorate and free chlorine (FC) for potentiostatic wastewater electrolysis cell experiments with domestic wastewater.

Figure 32:
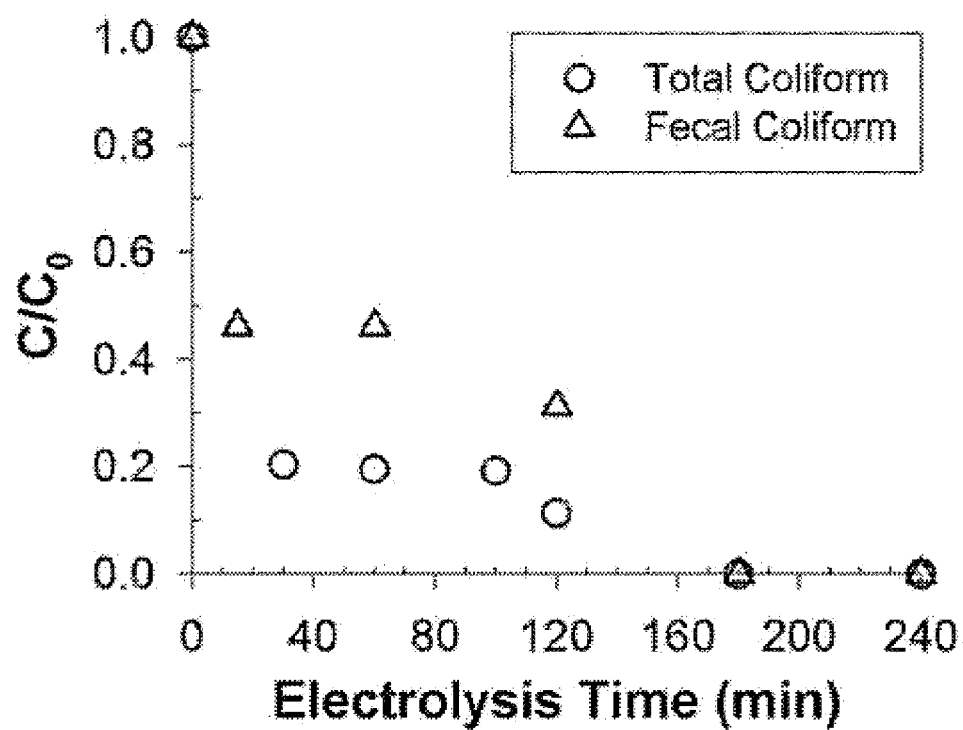
FIG. 32 is a graph showing time profiles for normalized concentration of total coliform and fecal coliform during photovoltaic-powered wastewater electrolysis cell experiment.

FIG. 32 is a graph showing time profiles for normalized concentration of total coliform and fecal coliform during photovoltaic-powered wastewater electrolysis cell experiment.

FIG. 33A through FIG. 33F is a sequence of images showing visible changes in color during solar wastewater treatment under ambient sunlight conditions at 0 minutes, 10 minutes, 15 minutes, 30 minutes, 180 minutes and 240 minutes, respectively.

FIG. 33G through FIG. 33J is a sequence of images of the total fecal coliform colony forming units vs. time at 0 minutes, 30 minutes, 100 minutes and 180 minutes. After 180 minutes of treatment, no viable bacterial colonies can be cultured and thus total disinfection was achieved.

An example of the time-dependent degree of treatment of actual domestic (human) wastewater can be seen in FIG. 33A through FIG. 33J. The test wastewater was obtained from a conventional wastewater treatment plant located in Los Angeles County. The total reaction time is 4 hours. During this timeframe, the wastewater was completely oxidized due to the action of hydroxyl radical generated at the anode surfaces; the key material at the electrode-water interface is bismuth-doped titanium dioxide. Generation of reactive chlorine species such as HOCl via the oxidation of chloride by hydroxyl radical leads to the total disinfection of *E. coli* bacteria, total coliform bacteria, and fecal coliform bacteria as shown in FIG. 33G through FIG. 33J.

FIG. 33K through FIG. 33O is a sequence of images of the fecal coliform colony formation over time.

FIG. 33P through FIG. 33T is a sequence of images of the *E. Coli* coliform colony formation over time.

FIG. 33U is a graph of *E. Coli* disinfection kinetics during treatment of inoculated synthetic feces as a function of time Chemical Oxygen Demand FIG. 34A is a graph of chemical oxidation demand (COD) in mixed urine and wastewater samples over 360 minutes of processing under varying chloride concentration and applied voltages using apparatus and methods according to principles of the invention. The COD appears to decrease most quickly when a chloride ion concentration of 30 mM is used with an applied potential of 3 V. Since the rate appears to depend on the background chloride concentration, it is useful to monitor that concentration and to add chloride in the form of NaCl salt as needed to maintain a value that is advantageous (e.g., control the chloride concentration).

FIG. 34B through FIG. 34G is a series of images showing the optical appearance of the liquid as time passes.

Simulated Septic Tank Effluent

The recognition that there will be a combination of different waste streams in a septic tank prompted an analysis of such combined waste streams. It was observed that combination in a septic tank can adjust the chloride concentration and pollutants composition for an efficient and economical treatment of toilet wastewater. The contents of a septic tank were simulated by combining 3 parts wastewater with one part human urine, and allowing the liquid to digest for several days (e.g., 2 to 7 days) at 35° C. under anaerobic conditions. The simulated septic tank effluent was then subjected to electrochemical reaction.

Figure 36:
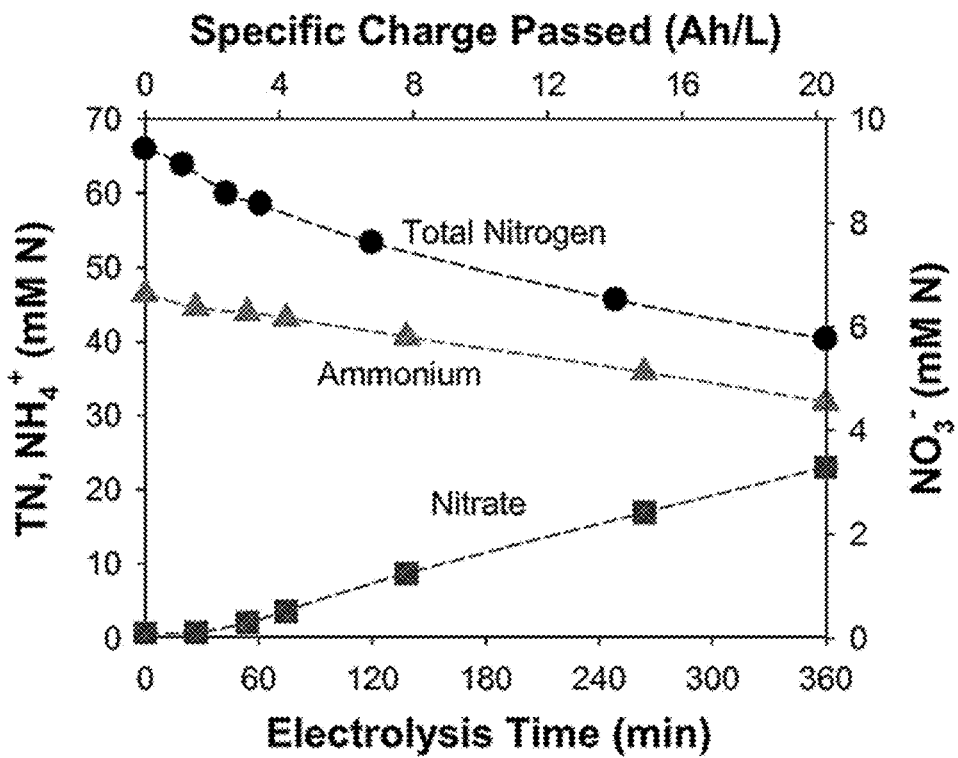
FIG. 36 shows the time evolution of total nitrogen (TN), nitrate and ammonium ion in simulated septic tank effluent.

FIG. 36 shows the time evolution of total nitrogen (TN), nitrate and ammonium ion in simulated septic tank effluent.

Figure 37:
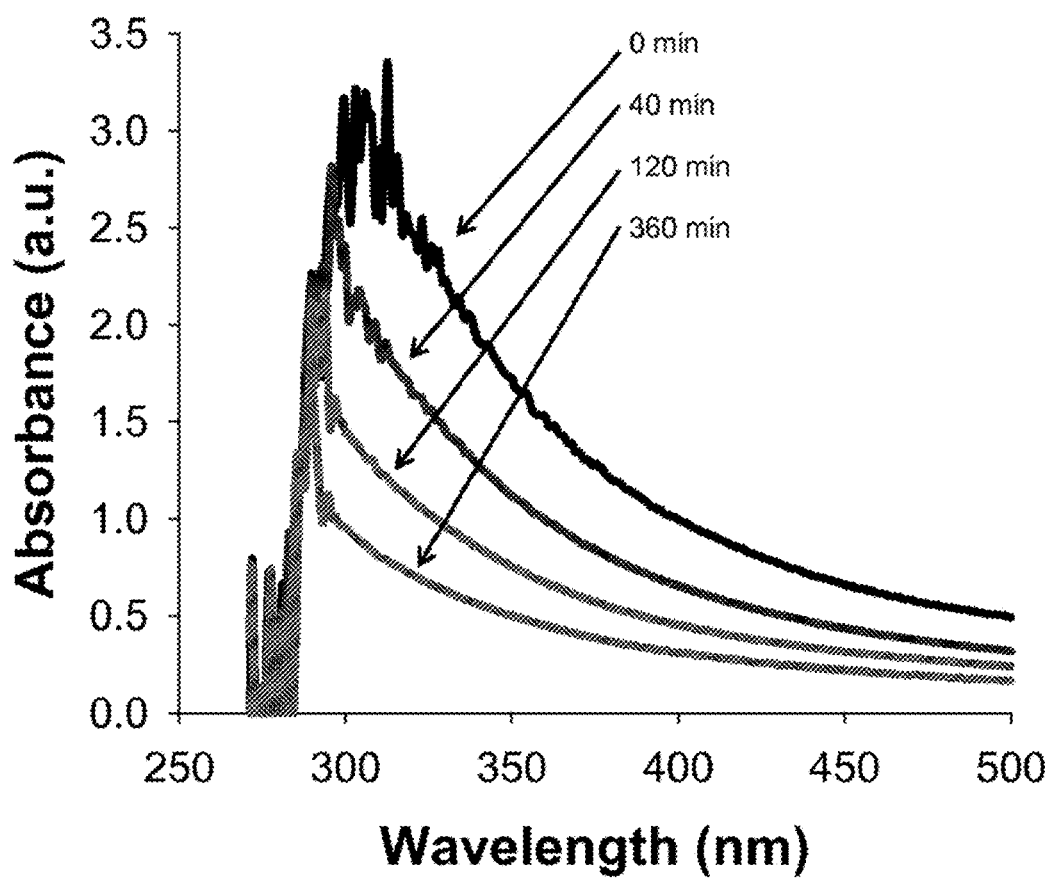
FIG. 37 shows the time evolution of the absorbance of simulated septic tank effluent as a function of electrolysis time.

FIG. 37 shows the time evolution of the absorbance of simulated septic tank effluent as a function of electrolysis time.

Figure 38:
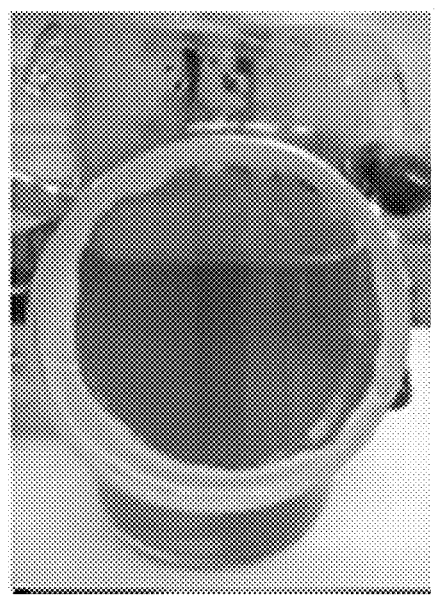
FIG. 38 is an image of the simulated septic tank effluent at the outset of the electrolysis.

FIG. 38 is an image of the simulated septic tank effluent at the outset of the electrolysis.

Figure 39:
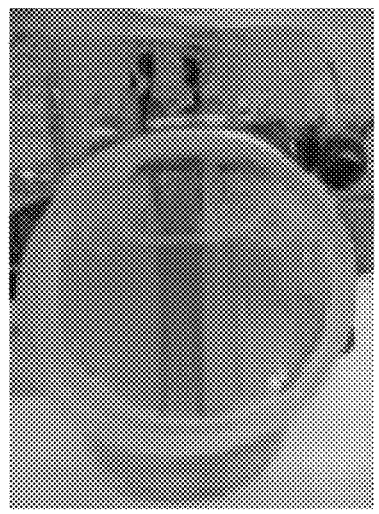
FIG. 39 is an image of the simulated septic tank effluent after 6 hours of electrolysis.
Figure 40A:
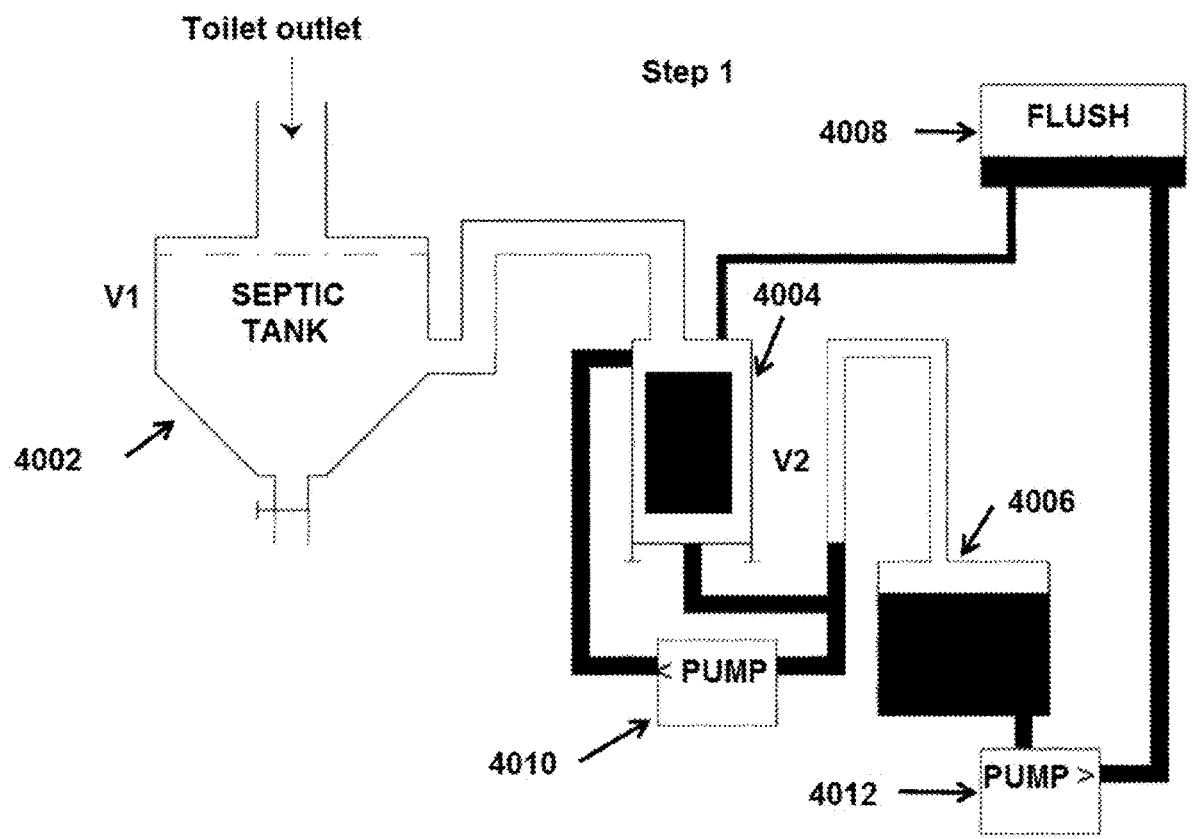
FIG. 40A is a schematic diagram that shows a first operating step of an improved flow controlled batch electrochemical reactor.
Figure 40B:
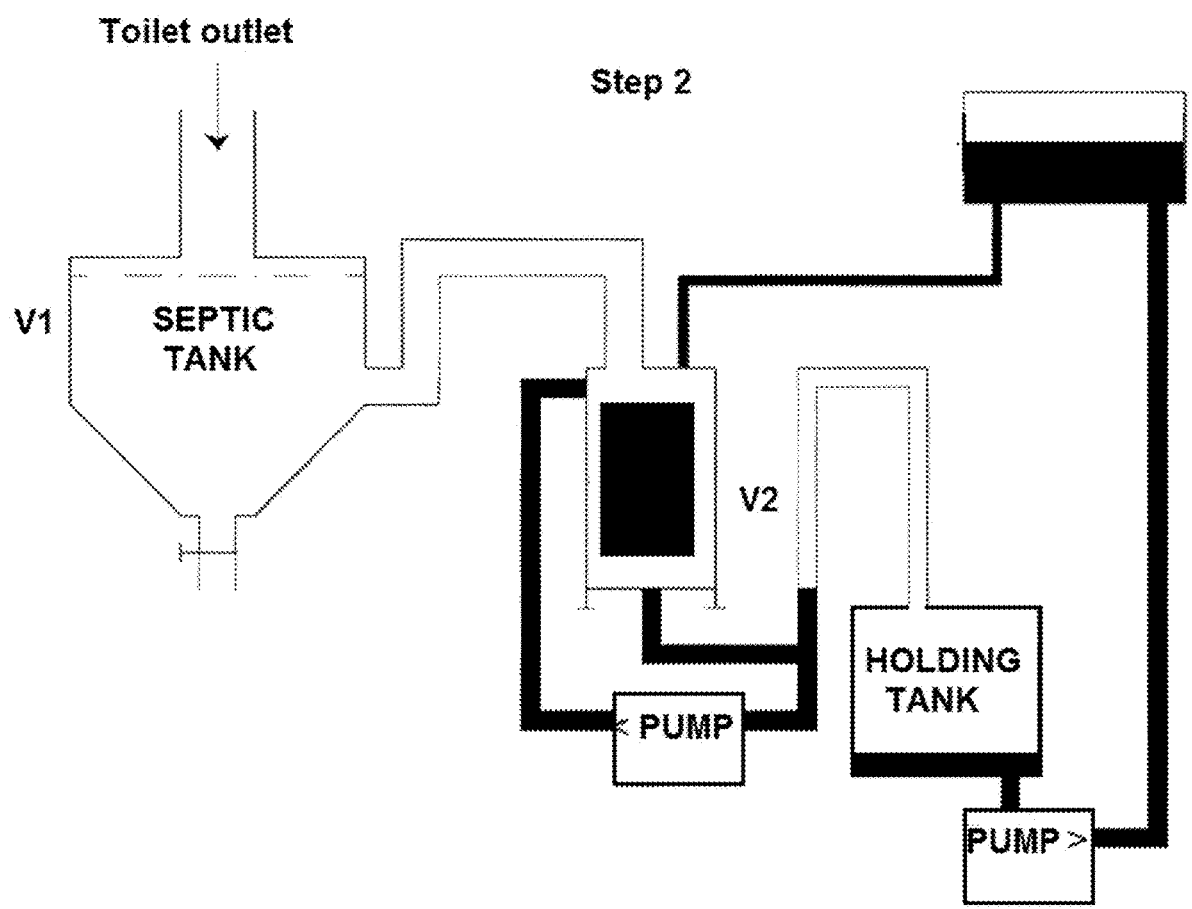
FIG. 40B is a schematic diagram that shows a second operating step of an improved flow controlled batch electrochemical reactor.
Figure 40C:
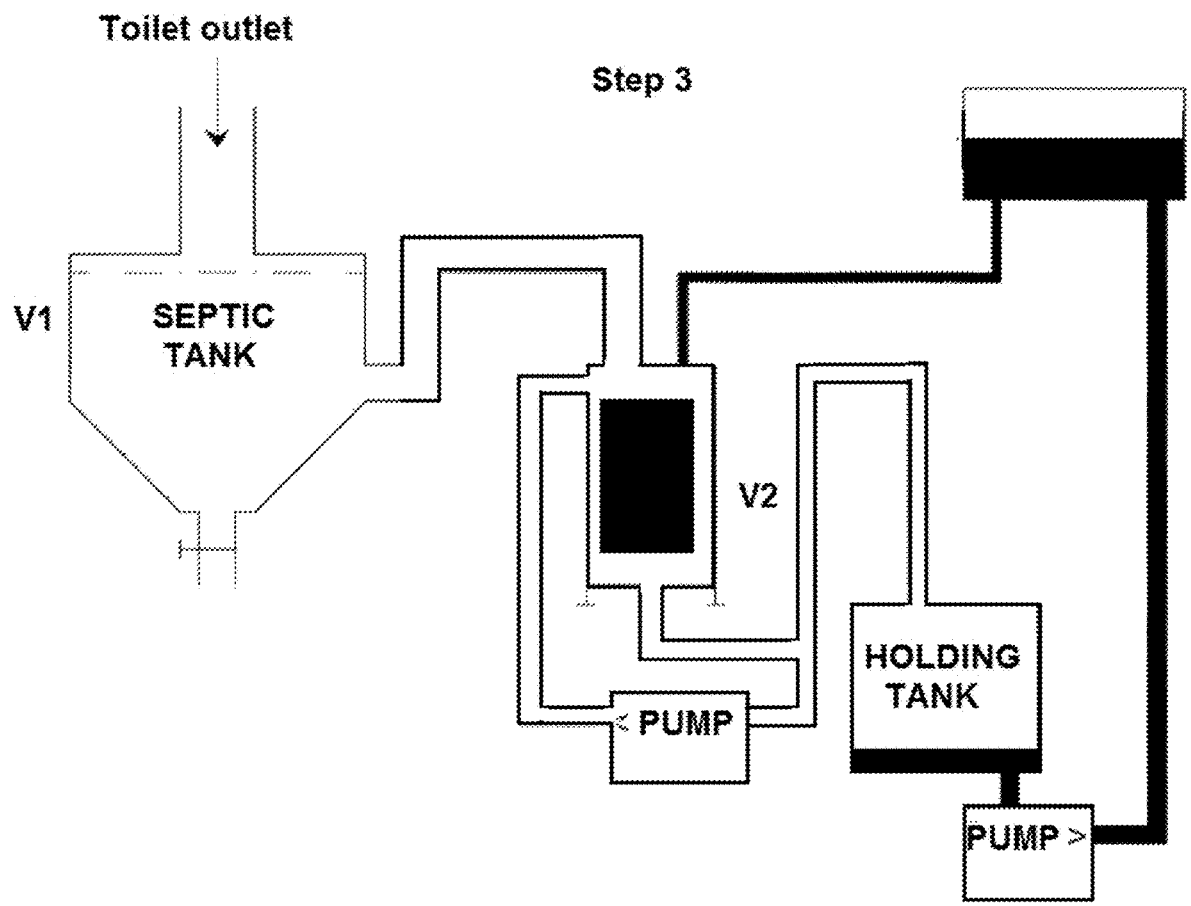
FIG. 40C is a schematic diagram that shows a third operating step of an improved flow controlled batch electrochemical reactor.
Figure 40D:
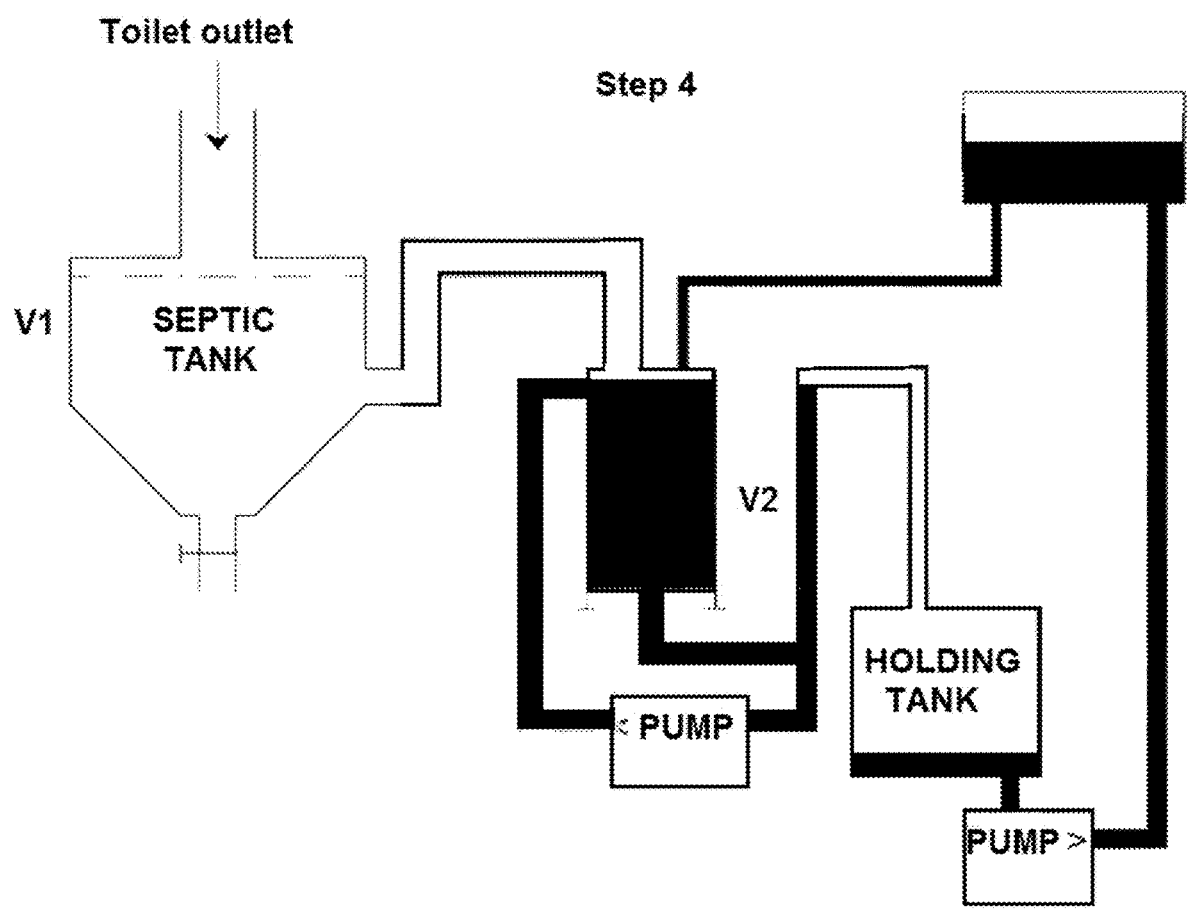
FIG. 40D is a schematic diagram that shows a fourth operating step of an improved flow controlled batch electrochemical reactor.

FIG. 39 is an image of the simulated septic tank effluent after 6 hours of electrolysis.

The almost complete removal of COD, protein and color after 6 hours of electrolysis demonstrates the feasibility of treated water to be reused as flushing water. The results show that urine can be a chloride source for reactive chlorine species generation. Products obtained from the electrochemical reactor include inorganic-nitrogen-rich liquid, phosphorus-rich solids, and hydrogen-rich gas.

The analytical methods that were used to determine values for various targets of interest, including COD, organic acid concentration, protein content, nitrogen compound content, total nitrogen, color, and hydrogen gas in the simulated septic tank effluent are listed in Table 6.

TABLE 6

| Target of Analysis | Analytical Methods |
| --- | --- |
| COD (Chemical Oxygen Demand) | Chromic Acid Digestion |
| Organic Acids (Formate, Oxalate, Acetate) | Ion Chromatography |
| Protein | Lowry Method (STD: Bovine Serum Albumin) |
| $NH_4^+$, $NO_3^-$ | Ion Chromatography |
| TN (Total Nitrogen) | Persulfate Digestion |
| Color | UV-VIS Spectrometer |
| Hydrogen | Gas Chromatography/ Thermal Conductivity Detector |

The parameters used for electrolysis of the simulated septic tank effluent and their average values are shown in Table 7.

TABLE 7

| | Average for 6 hr. Electrolysis (55 mL volume) |
| --- | --- |
| Potential | Anodic: 3.0 V (NHE), Total: 5.65 V |
| Current | 185.9 ± 24.7 mA (340 A/m$^2$) |
| Power Consumption | 1.05 W |
| H$_2$ Production | 65.7 μmol/min |

The time evolutions of various constituents of the simulated septic tank effluent are shown in Table 8.

TABLE 8

| Constituent | Raw Wastewater | After Septic Tank | After EC reactor (6 hr.) |
| --- | --- | --- | --- |
| COD (mg/L) | 1,200 | 459 | N.D. (Not Detectable) |
| Protein (mg/L) | 635 | 279 | N.D. |
| Organic Acids (mM) | 0.12 | 0.09 | 0.82 |
| TN (mM N) | 55.3 | 65.9 | 40.3 |
| Ammonium (mM) | 4.23 | 46.5 | 31.7 |
| Nitrate (mM) | 0.08 | 0.11 | 3.29 |
| Phosphate (mM) | 15.1 | N.D. | N.D. |
| Chloride (mM) | 32.4 | 32.5 | 17.5 |
| Chlorate (mM) | N.D. | N.D. | 13.6 |

Hydrogen Processing and Storage

With respect to hydrogen gas generation, it is expected that the head-space gases will be passed through an appropriate ceramic membrane filter (e.g., HP-MOLSIEVE column 19091P-MS4, Agilent, USA) that allows the selective passage of $H_2$ gas, while effectively blocking the transport of water, ammonia, oxygen, and other vapors that may be present in the head space volume of the reactor. This partially purified gas stream will then be compressed and stored in an appropriate higher pressure metal storage tank (or a gas accumulation device) for eventual use as either or both of a cooking fuel or a feedstock to a PEM $H_2$ fuel cell in order to provide a backup electricity source.

Separate Stream Processing

Figure 41:
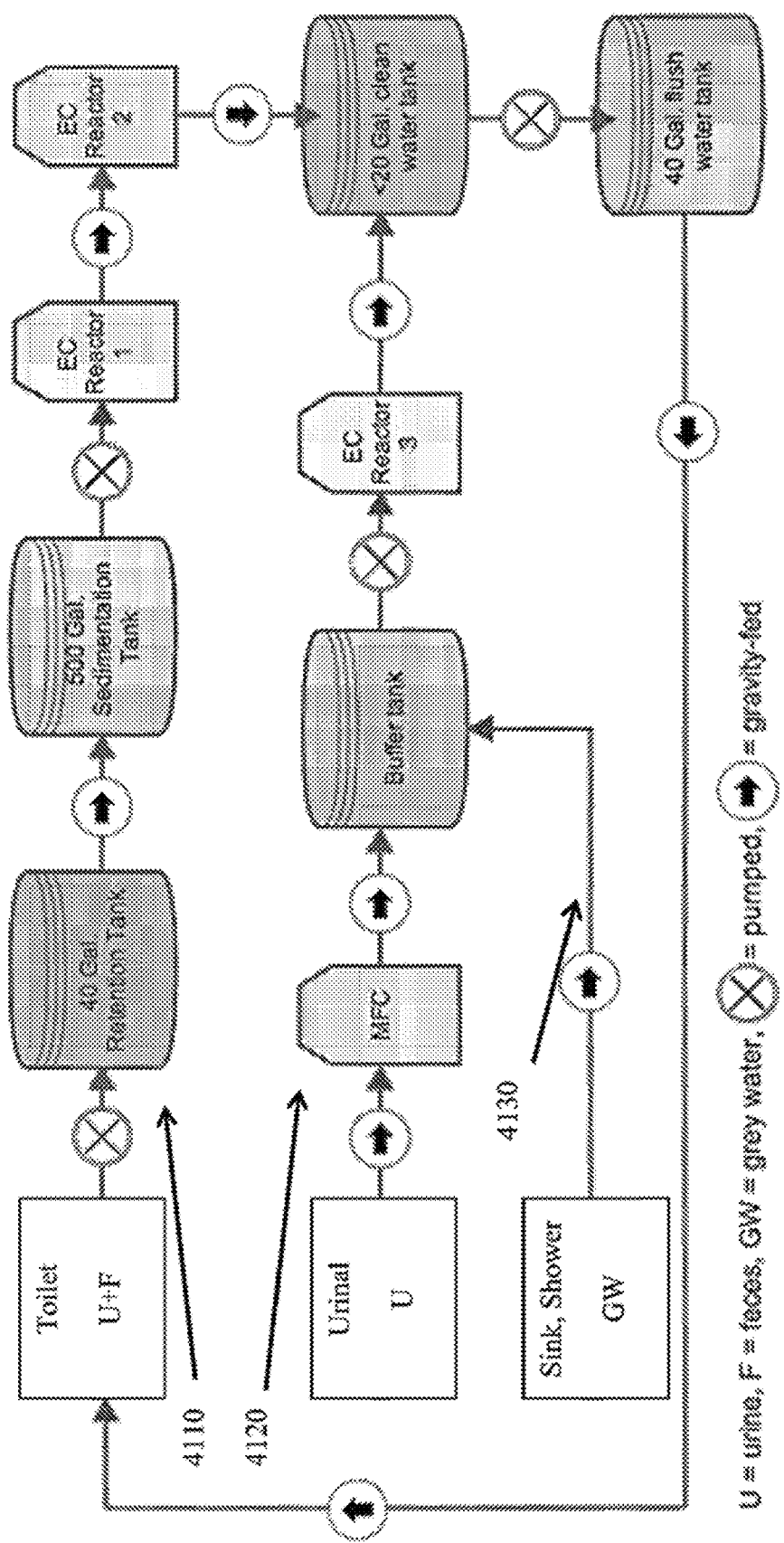
FIG. 41 is a flow diagram in which separate treatment of urine and feces is performed. In one embodiment, such treatment is provided in the units built into the shipping container of FIG. 3A, FIG. 3B and FIG. 3C.

FIG. 41 is a flow diagram in which separate treatment of urine and feces is performed. In one embodiment, such treatment is provided in the units built into the shipping container of FIG. 3A, FIG. 3B and FIG. 3C.

In one embodiment, in the process shown on line 4110 of FIG. 41, the outflow from the toilet is connected to the 40 gallon retention tank. The retention tank is connected to a 500 gallon sedimentation tank for separation of higher molecular weight solids from supernatant as well as anaerobic digestion. The outflow from the sedimentation tank is connected to at least two electrochemical reactors EC1 and EC2. As shown in FIG. 41 EC1 and EC2 are in series connection, but they can also be connected in parallel or, if more than two reactors are present, in a combination of parallel and series configurations for sequential batch reactors. The outflow from the last reactor in the connection is directed into a holding tank. The outflow from the last treatment reactor will have reduced-enough COD to be pumped up to the reservoir for flushing.

In a parallel treatment process which has possibility of water recovery for hand washing, the outflow from the urinal shown on line 4120 is expected to be initially treated in an optional microbial fuel cell (MFC) and is expected to be connected to the outflow from the sink (or shower, or other source of grey water) shown on line 4130 for treatment in an individual electrochemical reactor EC3. The treated water which does not contain the possible residual solids has potential for use in hand washing or directly can be connected to the reservoir from the first process for the next flushing.

DEFINITIONS

As used herein, the term "wastewater" is intended to describe in general domestic manmade waste, or a stream of waste material that can include human body wastes such as urine and feces as well as other waste from domestic operations such as one or more of effluent from bathing and hygiene, food preparation, washing clothing, and washing other possessions. In general, the term "wastewater" can also include any other manmade waste material that would be found in a municipal wastewater treatment system.

Unless otherwise explicitly recited herein, any reference to an electronic signal or an electromagnetic signal (or their equivalents) is to be understood as referring to a non-transitory electronic signal or a non-transitory electromagnetic signal.

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A self-contained wastewater treatment system lacking a connection to a municipal wastewater treatment system, comprising:
    a controller having
        at least one controller input port to receive input signals representing one or more of data and instructions and
        one controller output port to provide control signals as output;
    an electrochemical cell comprising
        at least one anode,
        at least one cathode,
        a liquid input port that receives treated input in liquid form,
        a liquid output port that delivers output in liquid form, and
        a gas output port that delivers output in a gaseous form,
        wherein the electrochemical cell further comprises
            an anode electrical terminal and
            a cathode electrical terminal, and
            wherein the operating voltage of the electrochemical cell is controlled by using the controller;
    a gas storage tank that receives and stores gaseous output from the electrochemical cell;
    a liquid holding tank that receives and stores liquid output from the electrochemical cell;
    an electrical power source that is not connected to an electrical grid, wherein the electrical power source provides electrical power to the electrochemical cell via the anode electrical terminal and the cathode electrical terminal, and wherein the electrical power source comprises at least one input terminal that can receive control signals from the controller;
    at least one input port which comprises
        a toilet that can receive an input of manmade waste, wherein the manmade waste comprises urine and/or feces; and
    a septic holding tank having
        a controlled output connection to the liquid input port of the electrochemical cell, wherein the septic holding tank receives the input from the toilet, and holds the received input for treatment by anaerobic digestion, wherein the septic holding tank further comprises
a settling tank which allows for the collection of solids, wherein a portion of the treated input can be transferred to the electrochemical cell via the liquid input port of the electrochemical cell;
wherein the controller is in communication with and can control the electrochemical cell, the gas storage tank, the liquid holding tank the electrical power source and the septic holding tank.

2. The self-contained wastewater treatment system of claim 1, wherein the electrochemical cell is a photoelectrochemical cell.

3. The self-contained wastewater treatment system of claim 1, wherein the electrical power source comprises a storage battery.

4. The self-contained wastewater treatment system of claim 1, wherein the gas storage tank stores hydrogen gas generated by the electrochemical cell.

5. The self-contained wastewater treatment system of claim 4, further comprising a hydrogen-air fuel cell, wherein the hydrogen-air fuel cell receives hydrogen gas from the gas storage tank and supplies electricity to the electrical power source.

6. The self-contained wastewater treatment system of claim 1, wherein the controller is a general purpose programmable computer operating under a set of instructions recorded on a machine-readable medium.

7. The self-contained wastewater treatment system of claim 1, wherein the treatment system further comprises a measurement apparatus that measures operational parameters of the self-contained wastewater treatment system or of its components.

8. The wastewater treatment system of claim 1, wherein the system further comprises:
a microfiltration unit that purifies the liquid output from the electrochemical cell.

9. The wastewater treatment system of claim 1, wherein the system further comprises:
a flush-water holding tank that is in fluid connection with the toilet and the liquid holding tank; and
a pump that moves the liquid output from the liquid holding tank to the flush-water holding tank, wherein the liquid output is stored in the flush-water tank;
wherein at least a portion of the liquid output stored in the flush-water holding tank is released into the toilet when the toilet is flushed.

10. The self-contained wastewater treatment system of claim 1, wherein the toilet is fluidly connected to the liquid holding tank and can receive liquid output stored in the liquid holding tank.

11. A wastewater treatment process, comprising the steps of:
providing a self-contained wastewater treatment system of claim 1;
receiving into the septic tank an input of wastewater comprising manmade waste from the toilet, wherein the manmade waste comprises urine and/or feces;
treating the wastewater in the septic tank by settling and anaerobically digesting the manmade waste in the wastewater to produce treated wastewater;
transferring a portion of the treated wastewater to the electrochemical cell so that the treated wastewater is in contact with the at least one anode and the at least one cathode of the electrochemical cell;
disinfecting the treated wastewater with reactive chlorine species generated from the electrochemical cell; and
recovering the disinfected treated wastewater in the liquid holding tank, and/or recovering a gaseous product generated from the electrochemical cell in the gas storage tank.

12. The wastewater treatment process of claim 11, wherein the reactive chlorine species is one or more of $Cl_2$, $HOCl$, $ClO^-$, chlorine radical $Cl.$, and chlorine radical $Cl_2.$.

13. The wastewater treatment process of claim 11, wherein the gaseous product is hydrogen gas.

14. The wastewater treatment process of claim 13, wherein the hydrogen gas is consumed in a hydrogen-air fuel cell that supplies electricity to the electrical power source.

15. The wastewater treatment process of claim 11, wherein the treated input is disinfected for 3 to 4 hours with the reactive choline species generated from the electrochemical cell.

16. The wastewater treatment process of claim 11, wherein gravity flow is used to transfer the portion of the treated input from the septic holding tank to the electrochemical cell.

17. A self-contained wastewater treatment system lacking a connection to a municipal wastewater treatment system, comprising:
a controller having at least one controller input port to receive input signals representing one or more of data and instructions and one controller output port to provide control signals as output;
a photoelectrochemical cell comprising at least one anode, at least one cathode, a liquid input port that receives treated input in liquid form, a liquid output port that delivers output in liquid form, and a gas output port that delivers output in a gaseous form, wherein the photoelectrochemical cell further comprises an anode electrical terminal and a cathode electrical terminal, and wherein the operating voltage of the photoelectrochemical cell is controlled by using the controller;
an electrical power source that is not connected to an electrical grid, wherein the electrical power source provides electrical power to the system, and wherein the electrical power source comprises at least one input terminal configured to receive control signals from the controller;
a gas storage tank that receives and stores gaseous output from the photoelectrochemical cell;
a hydrogen-air fuel cell that receives hydrogen gas from the gas storage tank and supplies electricity to the electrical power source;
a liquid holding tank that receives and stores liquid output from the photoelectrochemical cell;
at least one input port which comprises a toilet that can receive an input of manmade waste, wherein the manmade waste comprises urine and/or feces;
a septic holding tank having a controlled output connection to the liquid input port of the photoelectrochemical cell, wherein the septic holding tank receives the input from said toilet, and holds the received input for treatment by anaerobic digestion, wherein the septic holding tank further comprises a settling tank which allows for the collection of solids, wherein a portion of the treated input can be transferred to the photoelectrochemical cell via the liquid input port of the photoelectrochemical cell; and
wherein the controller is in communication with and can control the photoelectrochemical cell, the gas storage tank, the liquid holding tank, the electrical power source and the septic holding tank.

18. A self-contained wastewater treatment system lacking a connection to a municipal wastewater treatment system, comprising:
  a controller having at least one controller input port to receive input signals representing one or more of data and instructions and one controller output port to provide control signals as output;
  an electrochemical cell comprising at least one anode, at least one cathode, a liquid input port that receives treated input in liquid form, a liquid output port that delivers output in liquid form, and a gas output port that delivers output in a gaseous form, wherein the electrochemical cell further comprises an anode electrical terminal and a cathode electrical terminal, and wherein the operating voltage of the electrochemical cell is controlled by using the controller;
  a gas storage tank that receives and to stores gaseous output from said the electrochemical cell;
  a liquid holding tank that receives and stores liquid output from the electrochemical cell;
  a photovoltaic panel that provides electrical power to the electrochemical cell via the anode electrical terminal and the cathode electrical terminal, wherein the photovoltaic panel comprises at least one input terminal that can receive control signals from the controller;
  at least one input port which comprises a toilet that can receive an input of manmade waste, wherein the manmade waste comprises urine and/or feces; and
  a septic holding tank having a controlled output connection to the liquid input port of the electrochemical cell, wherein the septic holding tank receives the input from the toilet, and holds the received input for treatment by anaerobic digestion, wherein the septic holding tank further comprises a settling tank which allows for the collection of solids, wherein a portion of the treated input can be transferred to the electrochemical cell via the liquid input port of the electrochemical cell;
  wherein the controller in communication with and can control the electrochemical cell, the gas storage tank, the liquid holding tank, the photovoltaic panel and the septic holding tank.

19. The self-contained wastewater treatment system of claim 18, wherein each of the at least one anodes comprise $BiO_x$—$TiO_2$.

20. The self-contained wastewater treatment system of claim 19, wherein each of the at least one anodes comprise an anode support substrate of Ti metal.

21. The self-contained wastewater treatment system of claim 20, wherein the at least one cathode comprises stainless steel.

22. The wastewater treatment system of claim 18, wherein the photovoltaic panel is a global positioning satellite tracking photovoltaic panel and wherein the photovoltaic panel comprises a silicon triple-junction laminated solar collector.

* * * * *